United States Patent
Lazarev

(10) Patent No.: US 11,092,142 B2
(45) Date of Patent: Aug. 17, 2021

(54) PLASMA ELECTRIC PROPULSION DEVICE

(71) Applicant: Capacitor Sciences Incorporated, Menlo Park, CA (US)

(72) Inventor: Pavel Ivan Lazarev, Menlo Park, CA (US)

(73) Assignee: CAPACITOR SCIENCES INCORPORATED, Menlo Park, CA (US)

( * ) Notice: Subject to any disclaimer, the term of this patent is extended or adjusted under 35 U.S.C. 154(b) by 736 days.

(21) Appl. No.: 15/818,474

(22) Filed: Nov. 20, 2017

(65) Prior Publication Data

US 2019/0154013 A1    May 23, 2019

(51) Int. Cl.
*F03H 1/00* (2006.01)
*H05H 1/24* (2006.01)
*H01G 4/00* (2006.01)

(52) U.S. Cl.
CPC ......... *F03H 1/0018* (2013.01); *F03H 1/0037* (2013.01); *F03H 1/0081* (2013.01); *F03H 1/0093* (2013.01); *H01G 4/00* (2013.01); *H05H 1/2406* (2013.01); *H05H 2001/2412* (2013.01); *H05H 2001/2437* (2013.01)

(58) Field of Classification Search
CPC ........ F03H 1/0018; F03H 1/00; F03H 1/0037; F03H 1/0093; F03H 1/0081; H01G 4/00; H01G 4/14; H01G 4/40
See application file for complete search history.

(56) References Cited

U.S. PATENT DOCUMENTS

2016/0020027 A1*  1/2016  Lazarev ............... H01L 28/40
                                                    361/303
2016/0207642 A1*  7/2016  Longmier ............ F03H 1/0018

OTHER PUBLICATIONS

Shimizu "Super-capacitor energy storage for micro-satellites: Feasibility and potential mission applications" (Year: 2013).*

* cited by examiner

*Primary Examiner* — Gerald L Sung
*Assistant Examiner* — William L Breazeal
(74) *Attorney, Agent, or Firm* — BCF LLP

(57) ABSTRACT

The present disclosure provides a plasma electric propulsion device comprising a capacitive energy storage device as a power source for an engine configured to heat and/or ionize and/or accelerate a propellant due to action of an electric field and/or magnetic field. The energy storage device comprises: a first electrically conductive electrode, a second electrically conductive electrode; and at least one metadielectric layer located between the first and second conductive electrodes. The metadielectric layer comprises at least one organic compound with at least one electrically resistive substituent and at least one polarizable unit. The polarizable unit is selected from intramolecular and intermolecular polarizable units. The organic compound is selected from the list comprising compounds with rigid electro-polarizable organic units, composite organic polarizable compounds, composite electro-polarizable organic compounds, composite non-linear electro-polarizable compounds, Sharp polymers, Furuta co-polymers, para-Furuta polymers, YanLi polymers, and any combination thereof.

21 Claims, 8 Drawing Sheets

PLASMA ELECTRIC PROPULSION DEVICE

INCORPORATION BY REFERENCE

All publications, patents, and patent applications mentioned in this specification are herein incorporated by reference to the same extent as if each individual publication, patent, or patent application was specifically and individually indicated to be incorporated by reference.

Said organic compound may incorporate Sharp polymers (as described in U.S. patent application Ser. Nos. 15/043,247 and 14/919,337), YanLi Polymers (as described in U.S. patent application Ser. Nos. 15/449,587 and 15/710,587, Furuta polymers (as described in U.S. patent application Ser. No. 15/043,186), para-Furuta polymers (as described in U.S. patent application Ser. No. 15/043,209), Non-Linear Static Dielectrics (as described in U.S. patent application Ser. Nos. 15/090,509 and 15/163,595), Electro-Polarizable compounds (as described in U.S. patent application Ser. No. 15/469,126), or any combination thereof; which are incorporated herein by reference, describe exemplary composite polarizable organic compounds commonly used in metadielectric layers, which are herein referred to as polarizable materials.

FIELD OF THE INVENTION

The present invention relates generally to a plasma electric propulsion device and more particularly to the plasma electric propulsion device comprising a capacitive energy storage device as a power source.

BACKGROUND

Plasma electric propulsion devices open the way to deep space, which becomes possible only if engines can be created that at least ten times more effective than current chemical rocket engines. The near future of the far manned space flight is associated with electric jet engines that will allow for ten times more speed of the spacecraft with the same amount of fuel. Although all varieties of such so-called electric propulsion are greatly inferior to chemical rocket engines in terms of maximum thrust (grams vs kilograms and tons), they dramatically exceed them in fuel efficiency (fuel consumption per unit mass of thrust per second). And the efficiency (specific impulse) is directly proportional to the speed of the ejected jet. The efficiency of the latter is 70% against 1% in chemical rocket engines. Plasma electric propulsion devices of this kind are designed also to move satellites from one orbit to another, stabilizing satellites in orbit, and for other purposes. Electric propulsion is a technology aimed at achieving thrust with high exhaust velocities, which results in a reduction in the amount of propellant required for a given space mission or application compared to other conventional propulsion methods. Reduced propellant mass can significantly decrease the launch mass of a spacecraft or satellite, leading to lower costs from the use of smaller launch vehicles to deliver a desired mass into a given orbit or to a deep-space target. In general, electric propulsion (EP) encompasses any propulsion technology in which electricity is used to increase the propellant exhaust velocity. Electric thrusters typically use much less propellant than chemical rockets because they have a higher exhaust speed (operate at a higher specific impulse) than chemical rockets. Due to limited electric power the thrust is much weaker compared to chemical rockets, but electric propulsion can provide a small thrust for a long time. Electric propulsion can achieve high speeds over long periods and thus can work better than chemical rockets for some deep space missions. The power source can be any source of electrical power, but at present time solar and nuclear are the primary options. A solar electric propulsion system uses sunlight and solar cells for power generation. A nuclear electric propulsion system uses a nuclear heat source coupled to an electric generator. Unfortunately, the efficiency of solar panels significantly decreases as the distance from the light source is increased. The nuclear electric propulsion system considerably increases starting weight of the space rocket.

A short review of the status of electric propulsion (EP) is presented in greater detail in Vatsal Sheth, "Spacecraft Electric Propulsion—A review", INTERNATIONAL JOURNAL OF RESEARCH IN AERONAUTICAL AND MECHANICAL ENGINEERING, Vol. 2, Issue. 9, September 2014, pp: 43-55. The principles of operation and the several types of thrusters that are either operational or in advanced development are discussed. The stimulus for development of electrically driven space propulsion systems is nothing less fundamental than Newton's laws of dynamics. Since a rocket propelled spacecraft in free flight derives its only acceleration from discharge of propellant mass, its equation of motion follows directly from conservation of the total momentum of the spacecraft and its exhaust stream. This paper has provided a condensed overview of the electric propulsion field, at a time when it is undergoing a very rapid transition from the laboratory to actual flight application. Inevitably, this means that many of the points made here will become obsolete in a short time. In the domain of interplanetary flight, however, EP offers much more substantial advantages over chemical systems, which extend in several important cases to enabling missions that simply could not be performed by means of any other reasonably projected propulsion technology. These include heavy cargo and/or piloted missions to Mars and the outer planets and many unpiloted probes beyond the solar system and out of the ecliptic plane. Finally, before any such ambitious EP missions can seriously be contemplated, non-solar alternatives for high-power sources in space must be developed. For mostly political reasons, plans for deployment of nuclear high-power sources in space have so far failed to materialize, and consequently the use of electric thrusters for primary propulsion in energetic missions has had a cyclical history of false starts and disappointments. Indeed, the recent vigorous rejuvenation of the field of electric propulsion can be attributed, at least in part, to a conscious shift in emphasis away from the high-power missions envisaged during the 1960s and 1970s toward the less ambitious but more realistic power-limited small satellites of today. Now that many EP systems have entered the mainstream of astronautic technology, their role in helping to expand human ambition beyond the inner part of the solar system, although still dependent on the hitherto unrealized development of high-power sources, is perhaps on more credible ground.

The science and technology of electric propulsion (EP) encompasses, as Robert G. Jahn and Edgar Y. Choueiri describe, a broad variety of strategies for achieving very high exhaust velocities in order to reduce the total propellant burden and corresponding launch mass of present and future space transportation systems ("Electric Propulsion", Encyclopedia of Physical Science and Technology, Third Edition, Volume 5, pp. 125-141, Copyright C_2002 by Academic Press). These techniques group broadly into three categories: electrothermal propulsion, wherein the propellant is electrically heated, then expanded thermodynamically through a nozzle; electrostatic propulsion, wherein ionized propellant particles are accelerated through an electric field; and electromagnetic propulsion, wherein current driven through propellant plasma interacts with an internal or external magnetic field to provide a stream-wise body force. Such systems can produce a range of exhaust velocities and payload mass fractions an order of magnitude higher than that of the most advanced chemical rockets, which can thereby enable or substantially enhance many attractive space missions.

The Institute of Space Systems, University at Stuttgart, launched a "Small Satellite Program in" 2002 (see, D. Bock, G. Herdrich, et. al., "ELECTRIC PROPULSION SYSTEMS FOR SMALL SATELLITES: THE LOW EARTH ORBIT MISSION PERSEUS", *Progress in Propulsion Physics* 2 (2011), pp. 629-638). The first two of the four planned small satellites, Flying Laptop and PERSEUS, are both Low Earth Orbit (LEO) missions. The third mission Cermit is a reentry satellite and the last of the small satellites—Lunar Mission BW1—is a mission to the Moon. For this purpose, different propulsion systems are mandatory. The propulsion system for Lunar Mission BW1 will consist of two different types of thruster systems: a cluster of pulsed magnetoplasmadynamic (MPD) thrusters (SIMP-LEX) using solid polytetrafluoroethylene (PTFE) as propellant and a thermal arc-jet thruster (TALOS) using gaseous ammonia as propellant. Both thruster systems are currently under development at IRS. They are planned to be tested on board the small satellite mission PERSEUS, one of the precursor missions of Lunar Mission BW1. The thruster systems have been investigated intensely in the past and, furthermore, optimization of the thrusters with respect to the mission requirements of Lunar Mission BW1 has been started. The test procedures for the technology demonstration on the PERSEUS satellite are under development at present.

Further, B. Göksel, I. Mashek, et al. describe a novel concept for a plasma jet propulsion for stratospheric flight of aerodynamic platforms at altitudes up to 30 km and more to offering opportunities closed to satellite performance, but without the high cost and risk of space flight ("Novel Air-Breathing Plasma Jet Propulsion for Solar Powered High Altitude Flight Platforms", See discussions, stats, and author profiles for this publication at: https://www.researchgate.net/publication/288807703).

A research on electric propulsion is presented in A. Hemant Kumar Yadav 1 et. al., "A Study and Brief Research On Electric Propulsion Of Spacecraft and Rockets", International Journal of Application or Innovation in Engineering & Management (IJAIEM), Volume 3, Issue 12, December 2014. The principles of operation and the several types of thrusters that are either operational or in advanced development are discussed. The stimulus for development of electrically driven space propulsion systems is nothing less fundamental than Newton's laws of dynamics. Since a rocket propelled spacecraft in free flight derives its only acceleration from discharge of propellant mass, its equation of motion follows directly from conservation of the total momentum of the spacecraft and its exhaust stream.

Energy storage is a crucial component of a large number and variety of electronic devices. Energy storage devices can be based on a variety of physical effects. For example, electric fields can be employed to store energy in capacitors, and chemical reactions (involving ion motion) can be employed to store energy in batteries. However, energy storage in a capacitor can be limited by the geometry of current devices (e.g., 2-D capacitor plates having limited surface areas) and either a low permittivity or low dielectric breakdown voltage, and batteries can have a slow response time due to the relatively slow ion motion inherent in electrochemical reactions.

There are limitations associated with current batteries. For example, current batteries can have low storage densities due to the relatively low voltage (<5V) resulting from the electrochemical reactions of the ions. In addition, the low mobility of ions in current batteries can lead to slow charge and discharge performance. Furthermore, the reliance of existing batteries on ionic transport causes high degradation rates of the batteries. The performance of battery powered devices, such as hybrid or electric vehicles, can be limited by the low energy stored per weight of batteries used in such vehicles.

An important characteristic of a dielectric material is its dielectric permittivity. Different types of dielectric materials are used for capacitors and include ceramics, polymer film, paper, and electrolytic capacitors of different kinds. The most widely used polymer film materials are polypropylene and polyester. Increasing dielectric permittivity allows for increasing volumetric energy density, which makes it an important technical task.

Hyper-electronic polarization of organic compounds is described in greater detail in Roger D. Hartman and Herbert A. Pohl, "Hyper-electronic Polarization in Macromolecular Solids", Journal of Polymer Science: Part A-1 Vol. 6, pp. 1135-1152 (1968). Hyper-electronic polarization may be viewed as the electrical polarization external fields due to the pliant interaction with the charge pairs of excitons, in which the charges are molecularly separated and range over molecularly limited domains. In this article four polyacene quinone radical polymers were investigated. These polymers at 100 Hz had dielectric constants of 1800-2400, decreasing to about 58-100 at 100,000 Hz. Essential drawback of the described method of production of material is use of a high pressure (up to 20 kbars) for forming the samples intended for measurement of dielectric constants.

Copolymers of methyl methacrylate with a methacrylate containing a rigid group with two azo bonds (3RM) were prepared and their photoinduced birefringence levels and rates studied in X. Meng, A. Natansohn and P. Rochon, "Azo polymers for reversible optical storage: 13. Photo orientation of rigid side groups containing two azo bonds", *Polymer* Vol. 38 No. 11, pp. 2677-2682, (1997). Birefringence levels of 0.11 for the copolymer with 11.6 mol % azo structural units and 0.13 for the copolymer with 30.0 mol % azo structural units were found; this is higher than the birefringence inducible in a typical azo homopolymer containing a chromophore with only one azo group, poly{4'-[(2-(acryloyloxy) ethyl) ethylamino]-4-nitroazobenzene} [poly (DR1A)]. The birefringence per azo structural unit for a copolymer containing 11.6 mol % 3RM is about five times that for a DR1A copolymer with similar azo content, because of the intrinsic structural properties of 3RM (high length/diameter ratio). Dichroism in both ultraviolet (UV) and visible regions of the spectrum contribute to the overall photoinduced birefringence. The rate of inducing birefringence in the 3RM copolymers is lower than in poly(DR1A) and the birefringence stability (91-96% of the induced birefringence is maintained after the writing laser is off) is much better than that for poly(DR1A) (about 80%). The good stability and slow birefringence growth rate are due to the lesser mobility of the larger side group.

Novel polymers with azobenzene moiety with alkyl spacer and different substituents units are presented in Vitaliy Smokal, Oksana Krupka Agnesa Sinugina, and Vladimir Syromyatnikov, "Synthesis, Characterization, and Study of Novel Push-Pull Azobenzene Polymers", *Mol. Cryst. Liq. Cryst.*, Vol. 590: pp. 105-110, (2014). Azopolymers were obtained by a two-step synthetic approach. This includes the preparation of a methacrylic monomers and their polymerization. Their photo-physical and photochemical properties have been investigated. Polymers were characterized and evaluated by 1HNMR, IR, UV spectroscopy. Thermal stability was characterized by DSC method. The synthesized polymers exhibited glass-transition temperatures in the range of 110-140° C.

The synthesis of side chain methacrylic polymers functionalized with azobenzene chromophores is described in greater detail in Oksana Krupka et. al., "ELECTRO-OPTICAL PROPERTIES IN THIN FILMS OF NEW AZOBENZENE POLYMERS", *CHEMISTRY & CHEMICAL TECHNOLOGY*, Vol. 9, No. 2, pp. 137-141, (2015). A reversible change of thin film absorption is observed when illuminating it with monochromatic, linearly polarized light under the applied external DC field. The amount of change depends on the angle between the light polarization and the DC electric field direction.

It is known that energy storage device based on capacitor have well-known advantages versus with electrochemical energy storage device, e.g. a battery. However, an ordinary energy storage device based on capacitor often do not store energy in small volume or weight as in case of a battery, or at low energy storage cost, which makes capacitors impractical for some applications, for example electric vehicles. Compared to batteries, disclosed solid state energy storage device is able to store energy with very high-power density, i.e. charge/recharge rates, have long shelf life with little degradation, and can be charged and discharged (cycled) hundreds of thousands or millions of times.

SUMMARY

The present disclosure provides a plasma electric propulsion device comprising a capacitive energy storage device as a power source, intended for heating and/or ionization of a propellant due to action of electric field and for creation of magnetic field. The energy storage device comprises a first electrically conductive electrode, a second electrically conductive electrode; and at least one metadielectric layer located between the first and second conductive electrodes. The metadielectric layer comprises at least one organic compound with at least one electrically resistive substituent and at least one polarizable unit. The polarizable unit may be independently selected from intramolecular and intermolecular polarizable units. The organic compound may be selected from the list comprising compounds with rigid electro-polarizable organic units, composite organic polarizable compounds, composite electro-polarizable organic compounds, composite non-linear electro-polarizable compounds, Sharp polymers, Furuta co-polymers, para-Furuta polymers, YanLi polymers, and any combination thereof. The composite electro-polarizable organic compounds and composite non-linear electro-polarizable organic compounds are comprised of an aromatic ring system in conjugation with at least one electron donor group and at least one electron withdrawing group.

BRIEF DESCRIPTION OF THE DRAWING

A more complete assessment of the present invention and its advantages will be readily achieved as the same becomes better understood by reference to the following detailed description, considered in connection with the accompanying drawings and detailed specification, all of which forms a part of the disclosure. Embodiments of the invention are illustrated, by way of example only, in the following Figures, of which.

DETAILED DESCRIPTION

Figure 1A:
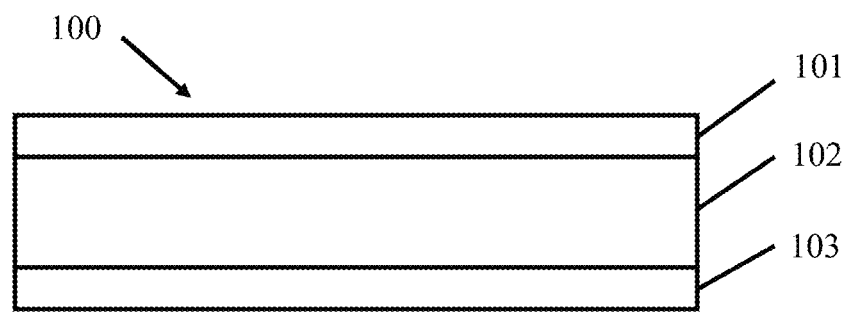
FIG. 1a schematically shows the disclosed energy storage device with flat and planar electrodes.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The present disclosure provides the plasma electric propulsion device as disclosed above. In one embodiment of the present invention, the plasma electric propulsion device is electro-thermal propulsion in which an electric power of AC and/or DC is used to generate plasma and to increase the temperature of the propellant, and wherein the propellant is expanded through a suitable nozzle. In another embodiment of the present disclosure, the plasma electric propulsion device is electrostatic propulsion in which the propellant is accelerated by direct application of electrostatic electric field to ionized particles. In yet another embodiment of the present disclosure, the plasma electric propulsion device is electromagnetic propulsion, in which the propellant is accelerated under the combined action of electric and magnetic fields. In still another embodiment of the plasma electric propulsion device, the aromatic ring system is selected from chromophores, tictiods, anisometric conjugated aromatic ring systems, rylene fragments, phenyl groups, naphthyl groups, anthryl groups, and any combination thereof. In one embodiment of the plasma electric propulsion device, the organic compound of the metadielectric layer comprises domain structures selected from any combination of nematic structures, chematic structures, chiral nematic structures, and lyotropic type structures (e.g. lamellar and micelle structures). In some embodiments of the plasma electric propulsion device, the metadielectric layer may have an effective breakdown strength between about 0.1 V/nm and about 1.0 V/nm. In some embodiments of the plasma electric propulsion device, the metadielectric layer may have an effective breakdown strength is more than 1.0V/nm. In yet another embodiment of the plasma electric propulsion device, the polarizable unit of the organic compound is rigid, wherein the polarizable unit is selected from an aromatic polycyclic conjugated molecule and an electro-conductive oligomer, wherein electrically resistive substituents are present. In still another embodiment of the plasma electric propulsion device, the distribution of the intramolecular or intermolecular rigid polarizable units of the organic compound in the metadielectric layer at least partially compensates the electric field applied between electrodes. In one embodiment of the plasma electric propulsion device, the organic compounds form supramolecular structures selected from the list comprising two-dimensional flat form, rod-like, column-like, disc-like forms, and any combination thereof; and wherein the polarizable units are oriented in the metadielectric layer such that poles of the polarizable units are oriented more or less perpendicular to the electrodes of the energy storage device. In another embodiment of the plasma electric propulsion device, the capacitance of the energy storage device varies non-linearly with voltage. In yet another embodiment of the plasma electric propulsion device, the energy storage device further comprises one or more intermediate layers independently located in following positions: between metadielectric layers, between the metadielectric layer and the first electrode, between the metadielectric layer and the second electrode, wherein the intermediate layer has a permittivity greater than a permittivity of the metadielectric layer and a resistivity less than a resistivity of the metadielectric layer. In still another embodiment of the plasma electric propulsion device, the energy storage device further comprises at least one tunnel barrier layer independently located between the metadielectric layer and at least one intermediate layer located near the one of electrode, wherein the permittivity of the tunnel barrier layer is lower than the permittivity of the intermediate layer, and the breakdown voltage of the tunnel barrier layer is higher than the breakdown voltage of the intermediate layer. In one embodiment of the plasma electric propulsion device, the electrically resistive substituent is selected from the group of alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the aryl group is selected from substituted and unsubstituted phenyl, benzyl and naphthyl groups or siloxane, and/or polyethylene glycol as linear or branched chains and wherein the electrically resistive substituent may be $C_xQ_{2X+1}$, where X≥1 and each instance of Q is selected from hydrogen (H), fluorine (F), or chlorine (Cl), and wherein the at least one electrically resistive substituent is selected from the group consisting of single chain, branched chain, and polycyclic species. In another embodiment of the plasma electric propulsion device, the electron withdrawing (acceptors) and electron donating groups (donors) present numbers 1, 2, 3, 4, 5, 6, 7, 8, 9, 10 and each instance of the acceptor and donor groups are independently selected, and wherein the acceptors are independently selected from —$NO_2$, —$NH_3^+$ and —$NR_3^+$ (quaternary nitrogen salts), counterion $Cl^-$ or $Br^-$, —CHO (aldehyde), —CRO (keto group), —$SO_3H$ (sulfonic acids), —$SO_3R$ (sulfonates), —$SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, —$CCl_3$, —CN; and wherein the donors are independently selected from —$O^-$ (phenoxides, like —ONa or —OK), —$NH_2$, —NHR, —$NR_2$, —OH, —OR (ethers), —NHCOR (amides, from amine side), —OCOR (esters, from alcohol side), alkyls, —$C_6H_5$, vinyls, wherein each instance of R is a radical independently selected from the list comprising alkyl (e.g. methyl, ethyl, isopropyl, tert-butyl, neopentyl, cyclohexyl etc.), allyl (e.g. —CH2-CH=CH2), benzyl (e.g. —CH2C6H5) groups, phenyl (including substituted phenyl) and other aryl (aromatic) groups, and wherein the polarizable unit form an anisometric molecular structure. In yet another embodiment of the plasma electric propulsion device, the metadielectric layer comprises a material having a high breakdown field ($E_{bd}$) in at least one high-field regions where a breakdown field strength ($E_{bd}$) is greater than about 1 V/nm and areas of the high-field regions are less than about 1 $\mu m^2$ and/or has volumes less than about 1 $\mu m^3$, and wherein the high-field regions independently comprise composite organic compounds forming nematic crystals, chematic crystals, chiral nematic crystals, lamellar structures, micelle structures, and any combination thereof. In still another embodiment of the plasma electric propulsion device, the intramolecular or intermolecular polarizable units are substantially evenly dispersed in a matrix formed by electrically resistive substituents, wherein the polarizable units may form a substantially crystalline lattice located in the matrix and wherein the matrix further comprises compounds selected from alkyl chains, alkyne chains, polymers, polymers with linear chains, polymers with branched chains, cross-linked polymers of all listed above types, the compounds with cross-linked chains of all listed above types, fluorinated polymers of all listed above types, the compounds with fluorinated chains of all listed above types and the matrix further substantially electrically insulates the intramolecular and intermolecular polarizable units and increases the metadielectric layer's mechanical elasticity during compression and decompression from applying and removing strong electric fields, and wherein the matrix may further comprise a material having an electron effective mass greater than about 0.01 times the free electron mass. In one embodiment of the plasma electric propulsion device, the matrix has a first permittivity under an applied electric field below a critical electric field ($E_c$) and a second permittivity under an applied electric field above $E_c$, wherein the first permittivity is lower than the second permittivity and the second permittivity is greater than or equal to 10,000. In some embodiments of the plasma electric propulsion device, the permittivity of the matrix varies non-linearly under an applied electric field with a maximum relative permittivity of at least 80,000 achieved below its breakdown voltage. Additionally, the resistivity of the matrix is at least $10^{15}$ Ohm-cm. In another embodiment of the plasma electric propulsion device, the matrix further comprises antiferroelectric material and comprises cross-linked substituents attached to the rigid polarizable units of the organic compound and/or comprises inclusions which have a permanent dipole moment. In yet another embodiment of the present invention, the plasma electric propulsion device further comprises at least one conductive layer located between two next metadielectric layers, wherein the breakdown field ($E_{bd}$) of the device is at least 0.9 V/nm. In still another embodiment of the present invention, the metadielectric layer comprised of at least one non-ionic plasticizer configured to increase supramolecular order of the metadielectric layer for increased resistivity and flexibility of the metadielectric layer. In one embodiment of the present invention, the specific energy of the capacitive energy storage device satisfies the following expression $0.5 \cdot C \cdot V_{max}^2/m \geq 250$, Wh/kg, where C is the capacitance of the energy storage device, $V_{max}$ the maximum voltage achieved before breakdown voltage, and m is the device mass of the energy storage device.

In some implementations said capacitive energy storage devices may have a specific energy density more than or equal to about 250 Wh/kg and a specific power density of 2.5 W/kg at 10 mA, 12.5 W/kg at 50 mA, 25 W/kg at 100 mA, 62.5 W/kg at 250 mA, 125 W/kg at 500 mA, 250 W/kg at 1 A, 500 W/kg at 2 A, 1.25 kW/kg at 5 A, 2.5 kW/kg at 10 A, 5 kW/kg at 20 A.

In some implementations said capacitive energy storage devices may have a specific energy density more than or equal to about 500 Wh/kg and a specific power density of 5 W/kg at 10 mA, 25 W/kg at 50 mA, 50 W/kg at 100 mA, 125 W/kg at 250 mA, 250 W/kg at 500 mA, 500 W/kg at 1 A, 1000 W/kg at 2 A, 2.5 kW/kg at 5 A, 5.0 kW/kg at 10 A, 10 kW/kg at 20 A.

In some implementations said capacitive energy storage devices have a specific energy density more than or equal to about 750 Wh/kg and a specific power density of 7.5 W/kg at 10 mA, 37.5 W/kg at 50 mA, 75 W/kg at 100 mA, 187.5 W/kg at 250 mA, 375 W/kg at 500 mA, 750 W/kg at 1 A, 1500 W/kg at 2 A, 3.0 kW/kg at 5 A, 6.0 kW/kg at 10 A, 12 kW/kg at 20 A.

In some implementations said capacitive energy storage devices have a specific energy density more than or equal to about 1250 Wh/kg and a specific power density of 12.5 W/kg at 10 mA, 62.5 W/kg at 50 mA, 125 W/kg at 100 mA, 312.5 W/kg at 250 mA, 625 W/kg at 500 mA, 1250 W/kg at 1 A, 2.5 kW/kg at 2 A, 6.25 kW/kg at 5 A, 12.5 kW/kg at 10 A, 25 kW/kg at 20 A.

In some implementations said capacitive energy storage devices may have a specific energy density more than or equal to about 2.5 kWh/kg and a specific power density of 25 W/kg at 10 mA, 125 W/kg at 50 mA, 250 W/kg at 100 mA, 625 W/kg at 250 mA, 1250 W/kg at 500 mA, 2.5 kW/kg at 1 A, 5.0 kW/kg at 2 A, 12.5 kW/kg at 5 A, 25 kW/kg at 10 A, 50 kW/kg at 20 A.

The metadielectric layers may be produced from the disclosed organic compound by the Cascade Crystallization. Cascade Crystallization process involves a chemical modification step and four steps of ordering during the crystal dielectric layer formation. The chemical modification step introduces hydrophilic groups on the periphery of the molecule of the disclosed organic compound in order to impart amphiphilic properties to the molecule. Amphiphilic molecules stack together into supramolecular structures, which is the first step of ordering. At certain concentration, supramolecular structures are converted into a liquid-crystalline state to form a lyotropic liquid crystal, which is the second step of ordering. The lyotropic liquid crystal may be deposited under the action of a shear force (or meniscus force) onto a substrate based on a Mayer Rod shearing technique, so that the shear force (or the meniscus force) direction determines the crystal axis direction in the resulting solid crystal layer. The external alignment upon the lyotropic liquid crystal, can be produced using any other means, for example by applying an external electric field at normal or elevated temperature, with or without additional illumination, magnetic field, or optical field (e.g., coherent photovoltaic effect); the degree of the external alignment should be sufficient to impart necessary orientation to the supramolecular structures of the lyotropic liquid crystal and form a structure, which serves as a base of the crystal lattice of the metadielectric layer. This directional deposition is a third step of ordering, representing the global ordering of the crystalline or polycrystalline structure on the substrate surface. The last fourth step of the Cascade Crystallization process is drying/crystallization, which converts the lyotropic liquid crystal into a metadielectric layer. The term Cascade Crystallization process is used to refer to the chemical modification and four ordering steps as a combination process.

The aforementioned Cascade Crystallization process may be used to produce thin metadielectric layers. Metadielectric layers produced by the Cascade Crystallization process have a global order, which means that a direction of the crystallographic axis of the layer over the entire substrate surface is controlled by the deposition process. Molecules of the deposited material are packed into supramolecular structures with a limited freedom of diffusion or motion. Such thin metadielectric layers may be characterized by an interplanar spacing of 3.4±0.3 Å in the direction of one of the optical axes.

In order that aspects of the present disclosure may be more readily understood, reference is made to the following Figures, which is intended to be illustrative of the invention, but is not intended to be limiting in scope.

FIG. 1a schematically illustrates a solid-state energy storage device 100, in accordance with an embodiment of the invention. The solid-state energy storage device 100 includes a first electrically conductive electrode 101, a metadielectric layer 102, and a second electrically conductive electrode 103. The first and second electrodes 101 and 103 can be formed of an electrically conductive ("conductive") material. The metadielectric layer 102 comprises at least one organic compound with at least one electrically resistive substituent and at least one polarizable unit. In another aspect of the invention, an energy storage device having a plurality of metadielectric layers is provided. In another embodiment, the electrically conductive electrodes 101 and 103 can be formed of any metal, metallic or metal-containing material, such as one or more of Au, Pt, W, Al, Cu, Ag, Ti, Se, Ge, Pd, Ni, Co, Rh, Ir and Os.

The electrodes 101 and 103 may be flat and planar and positioned parallel to each other. Alternatively, the electrodes may be planar and parallel, but not necessarily flat, they may be coiled, rolled, bent, folded, or otherwise shaped to reduce the overall form factor of the capacitor. It is also possible for the electrodes to be non-flat, non-planar, or non-parallel or some combination of two or more of these. By way of example and not by way of limitation, a spacing d between the electrodes 101 and 103 may range from about 100 nm to about 10 000 μm. The maximum voltage $V_{bd}$ between the electrodes 101 and 103 is approximately the product of the breakdown field $E_{bd}$ and the electrode spacing d. If $E_{bd}$=0.1 V/nm and the spacing d between the electrodes 101 and 103 is 10,000 microns (100,000 nm), the maximum voltage $V_{bd}$ would be 100,000 volts.

The electrodes 101 and 103 may have the same shape as each other, the same dimensions, and the same area A. By way of example, and not by way of limitation, the area A of each electrode 101 and 103 may range from about 0.01 m² to about 1000 m². These ranges are non-limiting. Other ranges of the electrode spacing d and area A are within the scope of the aspects of the present disclosure.

Figure 1B:
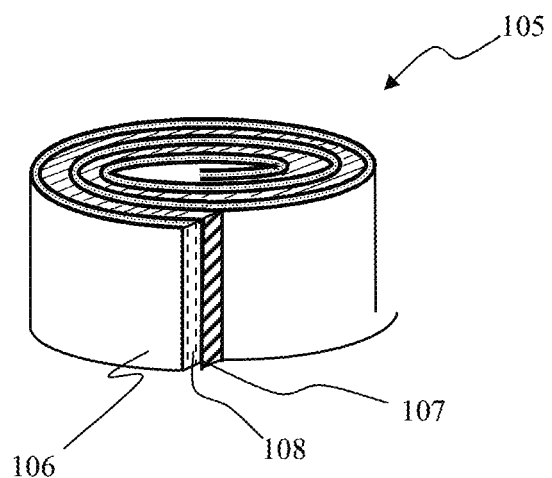
FIG. 1b schematically shows the disclosed capacitor with rolled (circular) electrodes.

The present disclosure includes non-linear capacitors that are coiled, e.g., as depicted in FIG. 1b. In this example, a capacitor 105 comprises a first electrode 106, a second electrode 107, and a metadielectric layer 108 of the type described hereinabove disposed between said first and second electrodes. The electrodes 106 and 107 may be made of a metal, such as copper, zinc, or aluminum or other conductive material and are generally planar in shape. In one implementation, the electrodes and metadielectric layer 108 are in the form of long strips of material that are sandwiched together and wound into a coil along with an insulating material, e.g., a plastic film such as polypropylene or polyester to prevent electrical shorting between the electrodes 106 and 107.

Figure 2:
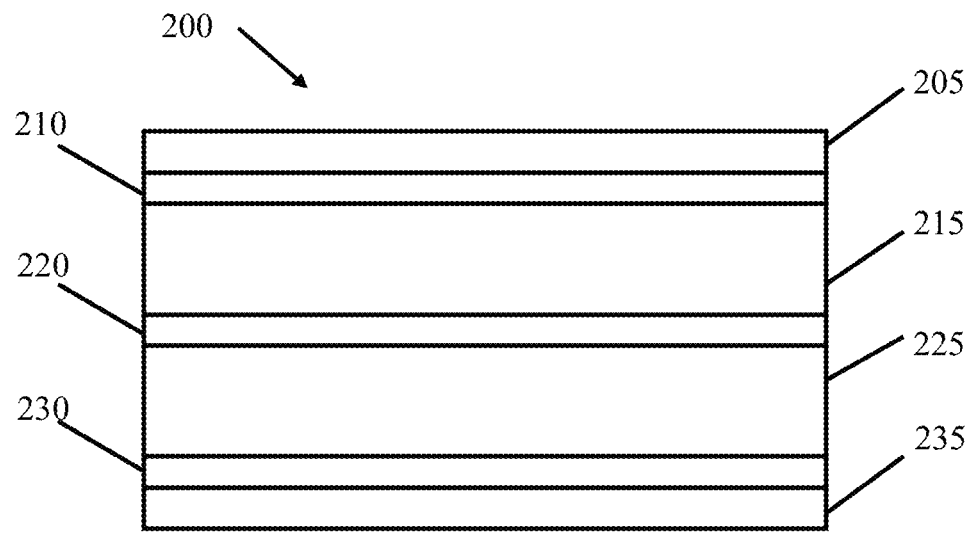
FIG. 2 schematically illustrates the disclosed solid-state energy storage device comprising intermediate layers, in according to present disclosure.

FIG. 2 schematically illustrates a solid-state energy storage device 200, in accordance with another embodiment of the invention. The solid-state energy storage device 200 includes a first electrically conductive electrode 205, a first intermediate layer of first type 210, a first metadielectric layer 215, a second intermediate layer of first type 220, a second metadielectric layer 225, a third intermediate layer of first type 230, and a second electrically conductive electrode 235. The intermediate layer of first type comprise material a permittivity of which is higher than a permittivity of the metadielectric layer and smoothes interfacial surfaces between the metadielectric layer and the electrically conductive electrode. In an alternative embodiment, the first intermediate layer of first type 210 can be omitted. In another embodiment, the second intermediate layer of first type 220 can be omitted. In yet another embodiment, the third intermediate layer of first type 230 can be omitted. In another embodiment, the first and second intermediate layers of first type 210 and 220 can be omitted. In still another embodiment, the first and third intermediate layers of first type 210 and 230 can be omitted. In another embodiment, the second and third intermediate layers of first type 220 and 230 can be omitted. In another embodiment, the electrically conductive electrodes 205 and 235 can be formed of any metal, metallic or metal-containing material, such as one or more of Au, Pt, W, Al, Cu, Ag, Ti, Se, Ge, Pd, Ni, Co, Rh, Ir and Os.

Figure 3:
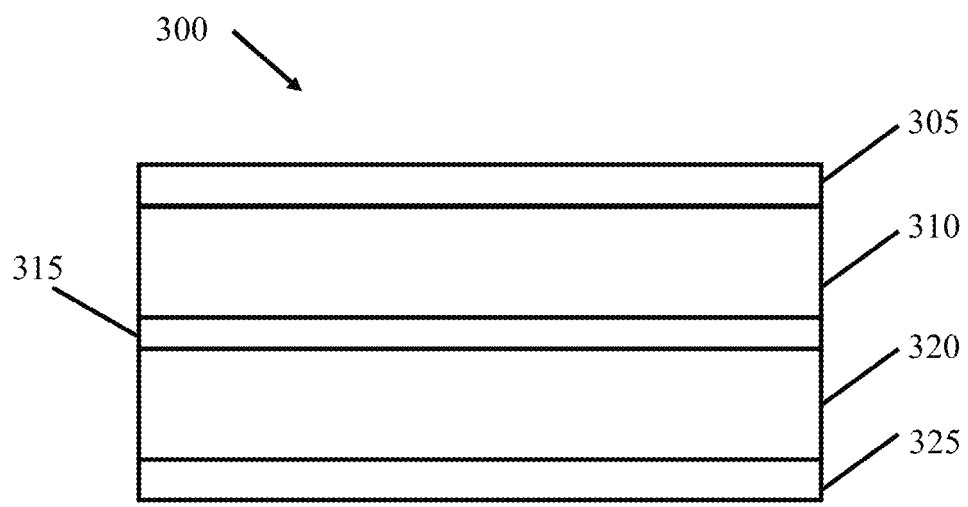
FIG. 3 schematically illustrates the disclosed solid-state energy storage device comprising electrically conductive layers, in according to present disclosure.

FIG. 3 schematically illustrates a solid-state energy storage device 300, in accordance with yet another embodiment of the invention. The energy storage device 300 includes a first electrically conductive electrode 305, a first metadielectric layer 310, an electrically conductive layer 315, a second metadielectric layer 320, and a second electrically conductive electrode 325. In another embodiment, the electrically conductive layers can be formed of any metal, metallic or metal-containing material, such as one or more of Au, Pt, W, Al, Cu, Ag, Ti, Se, Ge, Pd, Ni, Co, Rh, Ir and Os. In another embodiment, the electrically conductive layers can be formed of an organic semiconducting material, such as a doped organic semiconducting material. In another embodiment, the electrically conductive layers can be formed of carbon (e.g., diamond, graphite), such as a carbon thin film.

In an embodiment, the plurality of electrically conductive layers can include up to and including 10 electrically conductive layers, or up to and including 20 electrically conductive layers, or up to and including 40 electrically conductive layers, or up to and including 80 electrically conductive layers, or up to and including 100 electrically conductive layers, or up to and including 200 electrically conductive layers, or up to and including 300 electrically conductive layers, or up to and including 400 electrically conductive layers, or up to and including or up to an including 500 electrically conductive layers, or up to and including 1,000 electrically conductive layers, or up to and including 10,000 electrically conductive layers. In an embodiment, the solid state energy storage device can include up to an including 10 metadielectric layers, or up to an including 20 metadielectric layers, or up to an including 40 metadielectric layers, or up to an including 80 metadielectric layers, or up to an including 100 metadielectric layers, or up to an including 200 metadielectric layers, or up to and including 300 metadielectric layers, or up to an including 400 metadielectric layers, or up to an including or up to an including 500 metadielectric layers, or up to an including 1,000 metadielectric layers, or up to and including 10,000.

In an embodiment, the number of active layers (m) is one higher than the number of the electrically conductive layers (n), i.e., m=n+1. In another embodiment, the number of active layers is two higher than the number of the electrically conductive layers, i.e., m=n+2. In another embodiment, the number of active layers is three higher than the number of electrically conductive layers, i.e., m=n+3. In another embodiment, the number of active layers is four higher than the number of electrically conductive layers, i.e., m=n+4. In another embodiment, the number of active layers is five higher than the number of the electrically conductive layers, i.e., m=n+5. In another embodiment, m=n+1, or m=n+2, or m=n+3, or m=n+4, or m=n+5, or m=n+6, or m=n+7, or m=n+8, or m=n+9, or m=n+10, or m=n+11, or m=n+12, or m=n+13, or m=n+14, or m=n+15, or m=n+16, or m=n+17, or m=n+18, or m=n+19, or m=n+20, or m=n+21, or m=n+22, or m=n+23, or m=n+24, or m=n+25, or m=n+26, or m=n+27, or m=n+28, or m=n+29, or m=n+30. In an embodiment, the electrically conductive layers and active layers are disposed one after another or sequentially.

In an embodiment, each of the metadielectric layers can have a thickness between about 0.1 nm and 500 μm, or between about 0.3 nm and 300 μm. In another embodiment, each of the metadielectric layers can have a thickness up to and including about 0.1 nm, or 0.2 nm, or 0.3 nm, or 0.4 nm, or 0.5 nm, or 0.6 nm, or 0.7 nm, or 0.8 nm, or 0.9 nm, or 1 nm, or 10 nm, or 20 nm, or 30 nm, or 40 nm, or 50 nm, or 100 nm, or 200 nm, or 300 nm, or 400 nm, or 500 nm, or 1,000 nm, or 5,000 nm, or 10,000 nm, or 50,000 nm, or 100,000 nm, or 200,000 nm, or 300,000 nm, or 500,000 nm. In an embodiment, the metadielectric layers are of the same width (or thickness). In another embodiment, a thicker metadielectric layer is disposed in-between a plurality of thinner active layers.

In an embodiment, each of the electrically conductive layers can have a thickness between about 0.1 nm and 500 μm, or between about 0.3 nm and 300 μm. In another embodiment, each of the electrically conductive layers can have a thickness up to an including about 0.1 nm, or 0.2 nm, or 0.3 nm, or 0.4 nm, or 0.5 nm, or 0.6 nm, or 0.7 nm, or 0.8 nm, or 0.9 nm, or 1 nm, or 10 nm, or 20 nm, or 30 nm, or 40 nm, or 50 nm, or 100 nm, or 200 nm, or 300 nm, or 400 nm, or 500 nm, or 1,000 nm, or 5,000 nm, or 10,000 nm, or 50,000 nm, or 100,000 nm, or 200,000 nm, or 300,000 nm, or 500,000 nm. In an embodiment, the electrically conductive layers are of the same width (or thickness). In another embodiment, the electrically conductive layers have varying thicknesses.

Figure 4:
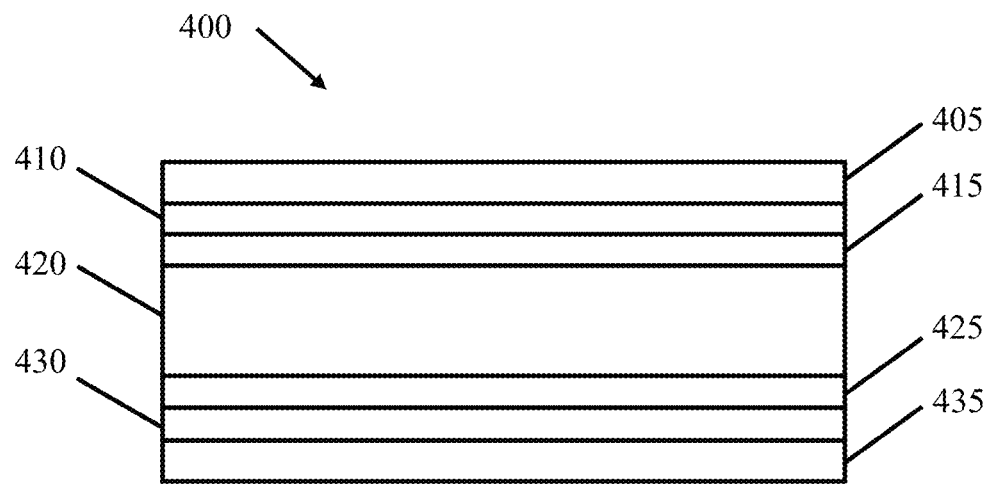
FIG. 4 schematically illustrates the disclosed solid-state energy storage device comprising tunnel barrier layers, in according to present disclosure.

FIG. 4 schematically illustrates an energy storage device 400, in accordance with an embodiment of the invention. The energy storage device 400 includes a first electrically conductive electrode 405, a first intermediate layer 410, a first tunnel barrier layer 415, a metadielectric layer 120, a second tunnel barrier layer 425, a second intermediate layer 430, and a second electrically conductive electrode 435. In an alternative embodiment, the first tunnel barrier layer of first type 415 can be omitted. In another embodiment, the second tunnel barrier layer of first type 425 can be omitted. The first tunnel barrier layers are made of wide-bandgap materials through which a transport (carrying over) of mobile carriers of a charges (electrons and holes) by means of tunneling is carried out. Exemplary tunnel barrier layers comprise, without limitation, silicon dioxide ($SiO_2$).

According to aspects of the present disclosure energy storage devices of the types described above with respect to FIG. 1, FIG. 2, FIG. 3, and FIG. 4 may be used in plasma electric propulsion devices. In general, a plasma electric propulsion device in accordance with aspects of the present disclosure may include an engine configured to an engine configured to heat and/or ionize and/or accelerate a propellant due to action of an electric field and/or magnetic field and a capacitive energy storage device coupled to the engine as a power source for the engine. By way of example, and not by way of limitation, the engine may be an electro-thermal propulsion engine configured to use AC and/or DC electric power to generate plasma and to increase a temperature of the propellant and expand the propellant through a suitable nozzle. By way of alternative example, and not by way of limitation, the engine may be an electrostatic propulsion engine configured to accelerate propellant by direct application of electrostatic electric field to ionized particles. By way of further example, and not by way of limitation, the engine may be an electromagnetic propulsion engine configured to accelerate the propellant under the combined action of electric and magnetic fields.

In an electro-thermal propulsion device the electromagnetic powers of alternating current (AC) and/or direct current (DC) are used to generate plasma to increase the temperature of the bulk propellant. The thermal energy imparted to the propellant gas is then converted into kinetic energy by a nozzle. Low molecular weight gases (e.g. hydrogen, helium, ammonia) are preferred propellants for this kind of system. An electro-thermal propulsion device uses a nozzle to convert the heat of a gas into the linear motion of its molecules, so it is a true rocket even though the energy producing the heat comes from an external source. There are two types of such devices: 1) propulsion device which uses a resistive heater (resisto-jet) and 2) propulsion device which uses an electrical discharge (arc-jet).

Figure 5:
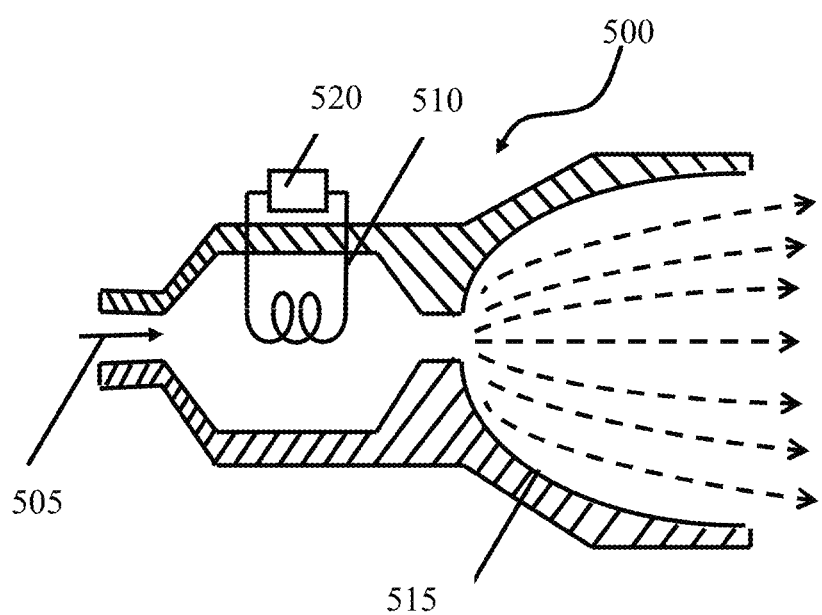
FIG. 5 schematically shows the disclosed electro-thermal propulsion device of the resisto-jet type.

FIG. 5 schematically illustrates an example of a disclosed electro-thermal propulsion device of the resisto-jet type 500. The resisto-jet is the electro-thermal propulsion device in which a thrust is provided by heating a (typically nonreactive) gaseous propellant 505. Heating is usually achieved by sending an electrical current through a resistive filament 510. Then the heated gas is expelled (removed) through a conventional nozzle 515. As power source the disclosed energy storage device 520 is used.

Figure 6:
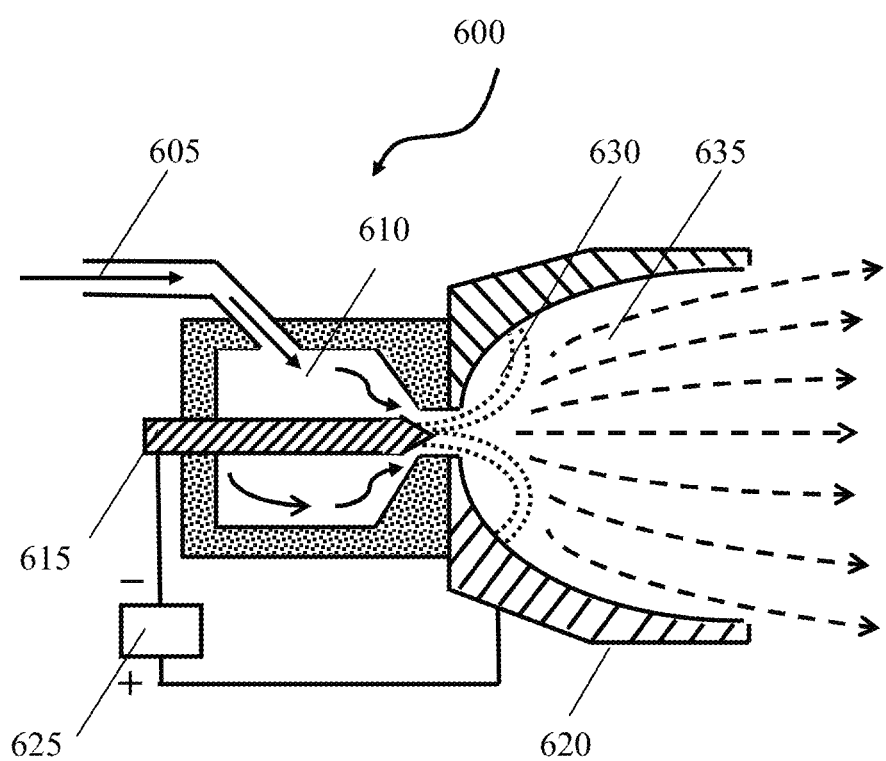
FIG. 6 schematically shows the disclosed electro-thermal propulsion device of the arc-jet type.

Arc-jets are a form of electrically powered spacecraft propulsion, in which an electrical discharge (arc) is created in a flow of propellant (typically hydrazine or ammonia). FIG. 6 schematically illustrates the disclosed electro-thermal propulsion device of the arc jet type 600. As it is shown in FIG. 6 a gaseous propellant 605 arrives in the chamber 610. Electric power is applied between a cathode 615 and an annular anode 620. As a power source the disclosed energy storage device 625 is used. An electrical discharge (arc) 630 is formed between the cathode tip and the annular region of the anode. Then the ionized and heated gas is expelled (removed) through a conventional nozzle 635.

If the acceleration is caused mainly by the Coulomb force the device is considered as electrostatic propulsion, wherein the propellant is accelerated by direct application of electrostatic electric field to ionized particles. There are two types of such devices: 1) electrostatic ion thrusters and 2) colloid ion thrusters. Its key principle is that a voltage difference between two conductors sets up an electrostatic potential difference that can accelerate ions to produce thrust. The ions must be neutralized by electrons emitted from neutralizers (hot filaments). In the electrostatic propulsion device are carried out three main stages: ion production, acceleration, and neutralization.

Figure 7:
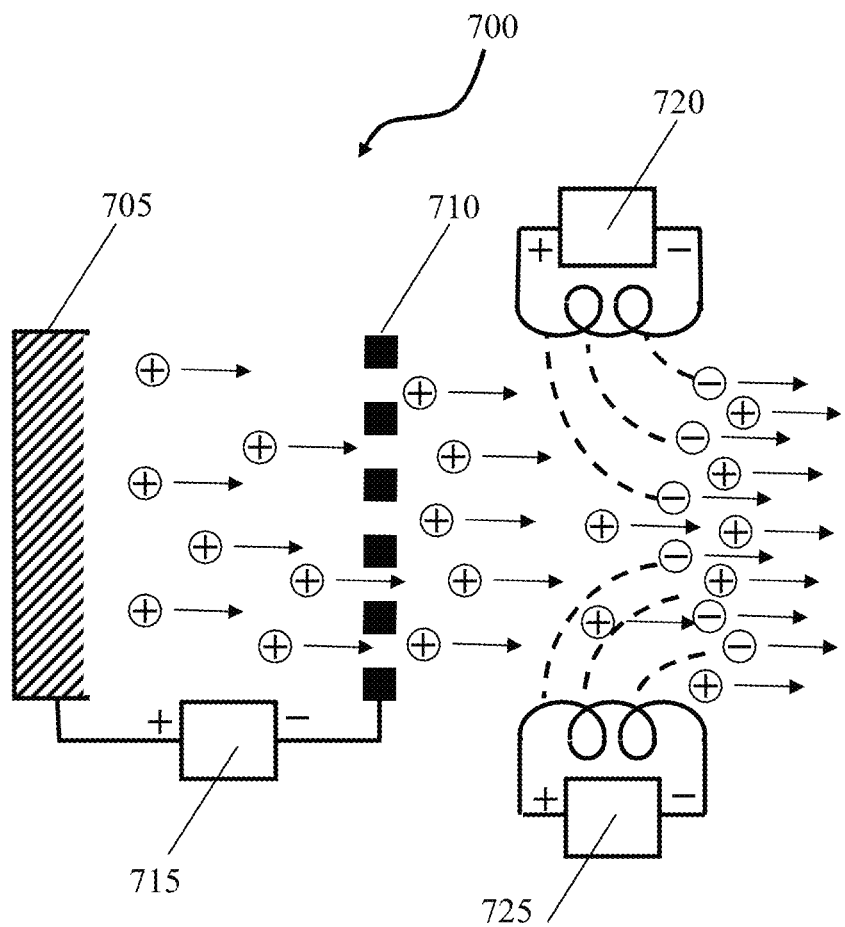
FIG. 7 schematically shows the disclosed electrostatic propulsion device of the electrostatic ion thruster type.

FIG. 7 schematically illustrates a disclosed electrostatic propulsion device of the electrostatic ion thruster type 700. This device comprises a source of ions 705, an electrode for accelerating positive ions 710, and neutralizers which contain the disclosed energy storage devices 720 and 725. Electric power is applied also between source of ions 705 and the electrode of accelerating positive ions 710. As power source the disclosed energy storage device 715 is used.

A colloid thruster is a type of thruster which uses electrostatic acceleration of charged liquid droplets for propulsion. It is closely related to electro-spray ionization and other hydrodynamic spraying processes. In a colloid thruster charged liquid droplets are produced by an electro-spray process and then accelerated by a static electric field.

Figure 8:
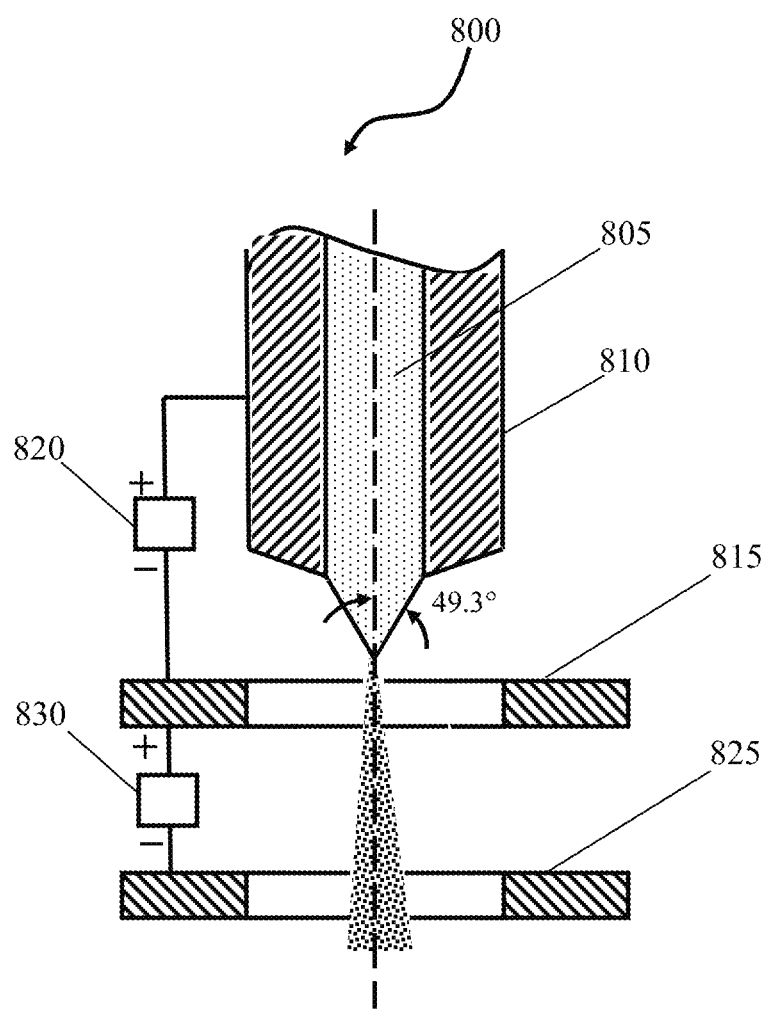
FIG. 8 schematically shows the disclosed electrostatic propulsion device of the colloid thruster type.

FIG. 8 schematically illustrates a disclosed electrostatic propulsion device of the colloid thruster type 800. As it is shown in FIG. 8, a propellant 805 is extracted out from the emitter 810 under the influence of the electric power applied between the emitter and an extractor 815. As power source for extraction the disclosed energy storage device 820 is used. Then the charged drops of the extracted propellant are accelerated under action of the electric power applied between the extractor 815 and an accelerator 825. As power source for acceleration the disclosed energy storage device 630 is used.

If ions are accelerated under the combined action of electric and magnetic fields where the electric field is directed not in the direction of the acceleration, the device is considered as electromagnetic propulsion device. There are three types of such devices: 1) Hall Effect Thruster, 2) Magnetoplasmadynamic (MPD) thruster, and 3) Pulsed Plasma Thruster. Such electromagnetic propulsion devices can produce exhaust speeds considerably higher than those of the electrothermal devices, and thrust densities much larger than those of the electrostatic thrusters, but are more complex than either of these alternatives. The essence of an electromagnetic propulsion device consists that electrically conducting propellant, usually a highly ionized gas, is subjected to an electric field E and a magnetic field B, perpendicular to each other and to the fluid velocity u. The current density j driven by the electric field interacts with B to provide a force $f=j \times B$ that accelerates the propellant along the channel.

In the Hall Effect thruster, the propellant is accelerated by an electric field. Hall Effect thrusters trap (catch) electrons in a magnetic field and then use the electrons to ionize propellant, efficiently accelerate the ions to produce thrust, and neutralize the ions. Electrons from the cathode enter the chamber and are subjected to an azimuthal drift in the crossed radial magnetic and axial electric fields, wherein they undergo ionizing collisions with the neutral propellant atoms (typically xenon) injected through the anode. While the magnetic field strength is sufficient to lock the electrons in an azimuthal drift, it does not significantly affect the trajectory of the ions, which are directly accelerated by the axial electric field. An axial electron flux equal to that of the ions reaches the anode and the same flux of electrons is available from the cathode to neutralize the exhausted ions. Quasi-neutrality is thus maintained throughout the chamber and exhaust beam. As power sources for formations of the radial magnetic field and the axial electric field the disclosed energy storage devices are used.

Figure 9:
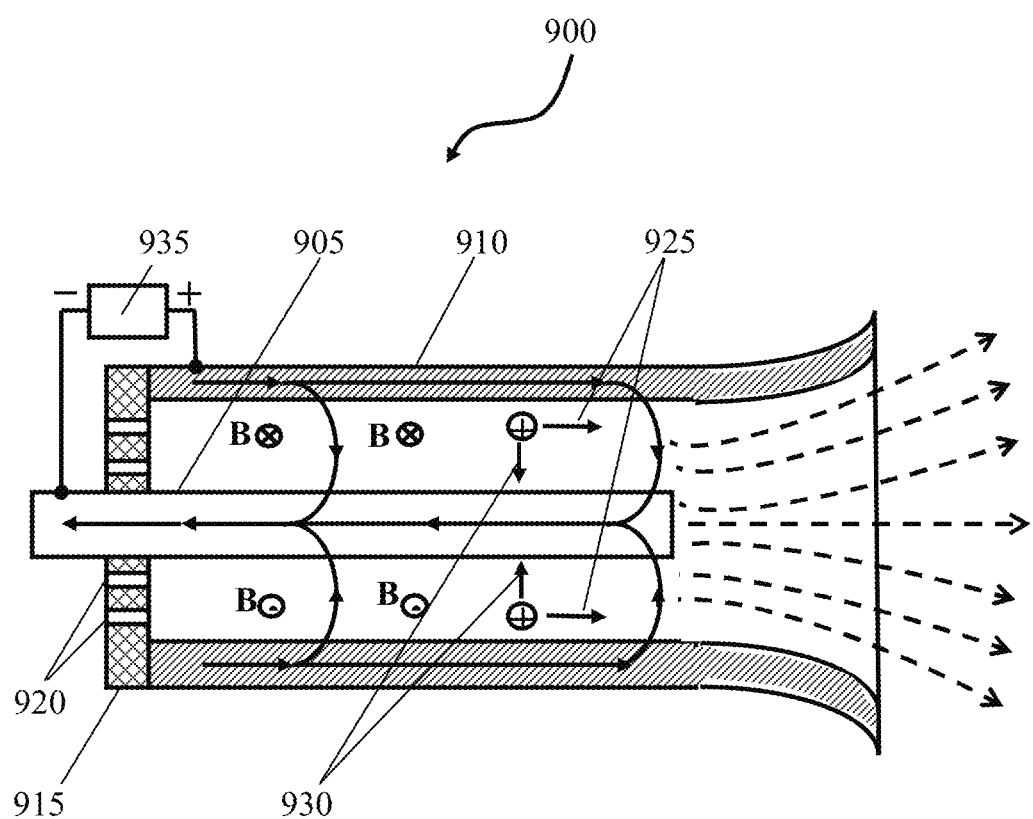
FIG. 9 schematically shows the disclosed electromagnetic propulsion device of the magnetoplasmadynamic (MPD) type.

FIG. 9 schematically illustrates the disclosed electromagnetic propulsion device of the magnetoplasmadynamic (MPD) type 900. The MPD thruster is characterized by a coaxial geometry constituted by a central cathode 905, an annular anode 910, and an inter-electrode insulator 915. Gaseous propellants are introduced into the channel through propellant inlets 920, whereafter they are ionized by passage through an intense, azimuthally uniform electric arc standing in the interelectrode gap. If the arc current is high enough, its associated azimuthal magnetic field is sufficient to exert the desired axial 925 and radial 930 forces on the propellant flow, directly accelerating it downstream and compressing it toward the centerline into extremely hot plasma just beyond the cathode tip. Subsequent expansion of this plasma, along with the direct axial acceleration, yields the requisite exhaust velocity. Electric power is applied between the cathode 905 and the annular anode 910. As power source the disclosed energy storage device 935 is used.

Figure 10:
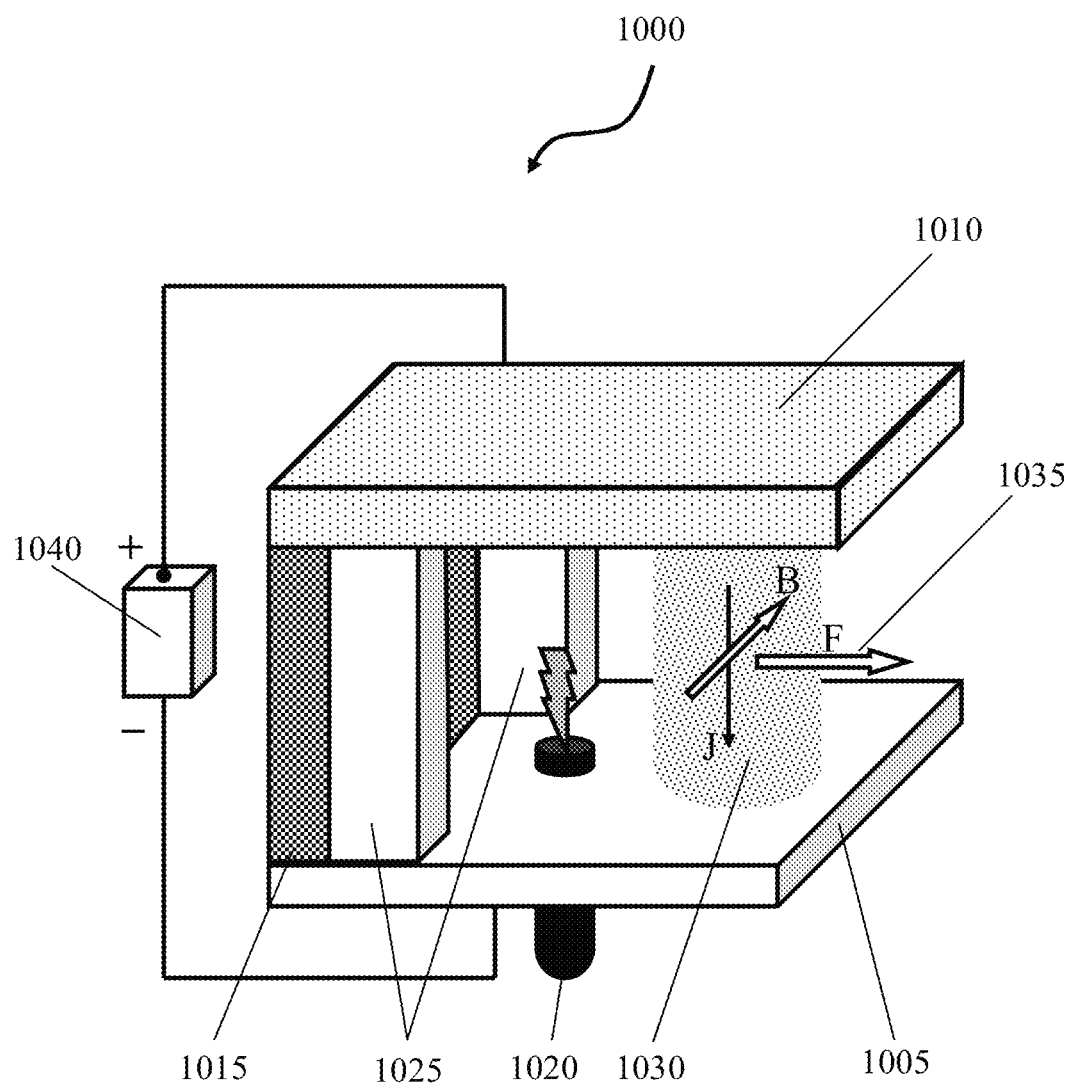
FIG. 10 schematically shows the disclosed electromagnetic propulsion device of the Pulsed Plasma Thruster (PPT) type.

FIG. 10 schematically illustrates the disclosed electromagnetic propulsion device of the Pulsed Plasma Thruster (PPT) type 1000. The PPT thruster comprises cathode 1005, an anode 1010, an interelectrode insulator 1015 and spark plug 1020. Most PPTs use a solid material (normally PTFE, more commonly known as Teflon) for propellant. Although liquid or gaseous propellants may also be used. The first stage in PPT operation involves using of an arc of electricity passing through the Teflon fuel blocks 1025, causing ablation and sublimation of the fuel. The heat generated by this arc causes the resultant gas to turn into plasma, thereby creating a charged gas cloud 1030. Due to the force of the ablation, the plasma is propelled at low speed between two charged plates (an anode and cathode). Since the plasma is charged, the fuel effectively completes the circuit between the two plates, allowing a current to flow through the plasma. This flow of electrons generates a strong electromagnetic field which then exerts a Lorentz force 1035 on the plasma, accelerating the plasma out of the PPT. Electric power is applied between the cathode 1005 and the annular anode 1010. As power source the disclosed energy storage device 1040 is used.

In accordance with aspects of the present disclosure, storage devices used in the propulsion systems depicted in FIG. 5, FIG. 6, FIG. 7, FIG. 8, FIG. 9, and FIG. 10 may include metadielectric layers as described above with respect to the energy storage devices illustrated in FIG. 1, FIG. 2, FIG. 3, and FIG. 4. The metadielectric layers used in such energy storage devices may include compounds with rigid electro-polarizable organic units, composite organic polarizable compounds, composite electro-polarizable organic compounds, composite non-linear electro-polarizable compounds, Sharp polymers, Furuta polymers, YanLi polymers, and any combination thereof.

Sharp polymers are composites of a polarizable core inside an envelope of hydrocarbon (saturated and/or unsaturated), fluorocarbon, chlorocarbon, siloxane, and/or polyethylene glycol as linear or branched chain oligomers covalently bonded to the polarizable core that act to insulate the polarizable cores from each other, which favorably allows discrete polarization of the cores with limited or no dissipation of the polarization moments in the cores. The polarizable core has hyperelectronic, nonlinear, or ionic type polarizability. "Hyperelectronic polarization may be viewed as the electrical polarization in external fields due to the pliant interaction with the charge pairs of excitons, in which the charges are molecularly separated and range over molecularly limited domains." (See Roger D. Hartman and Herbert A. Pohl, "Hyper-electronic Polarization in Macromolecular Solids", Journal of Polymer Science: Part A-1 Vol. 6, pp. 1135-1152 (1968)). Ionic type polarization can be achieved by limited mobility of ionic parts of the core molecular fragment.

An electro-polarizable compound has a general structural formula:

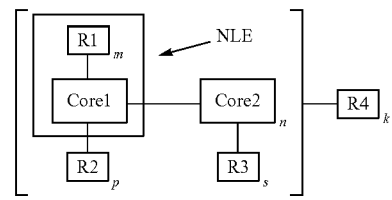

Where Core1 is an aromatic polycyclic conjugated molecule having two-dimensional flat form and self-assembling by pi-pi stacking in a column-like supramolecule, R1 is a dopant group connected to the aromatic polycyclic conjugated molecule (Core1), m is the number of dopant groups R1 which is equal to 1, 2, 3 or 4, R2 is a substituent comprising one or more ionic groups from a class of ionic compounds that are used in ionic liquids connected to the aromatic polycyclic conjugated molecule (Core1) directly or via a connecting group, p is number of ionic groups R2 which is equal to 0, 1, 2, 3 or 4. The fragment marked NLE containing the aromatic polycyclic conjugated molecule with at least one dopant of group has nonlinear effect of polarization. The Core2 is an electro-conductive oligomer self-assembling by pi-pi stacking in a column-like supramolecule, n is number of the electro-conductive oligomers which is equal to 0, 2, or 4, R3 is a substituent comprising one or more ionic groups from a class of ionic compounds that are used in ionic liquids connected to the electro-conductive oligomer (Core2) directly or via a connecting group, s is number of the ionic groups R3 which is equal to 0, 1, 2, 3 or 4. The R4 is a resistive substituent providing solubility of the organic compound in a solvent and electrically insulating the column-like supramolecules from each other, k is the number of R4 substituents, on said electro-polarizable compound, which is equal to 0, 1, 2, 3, 4, 5, 6, 7 or 8.

In one embodiment of the present disclosure, the aromatic polycyclic conjugated molecule (Core1) comprises rylene fragments.

Example 1

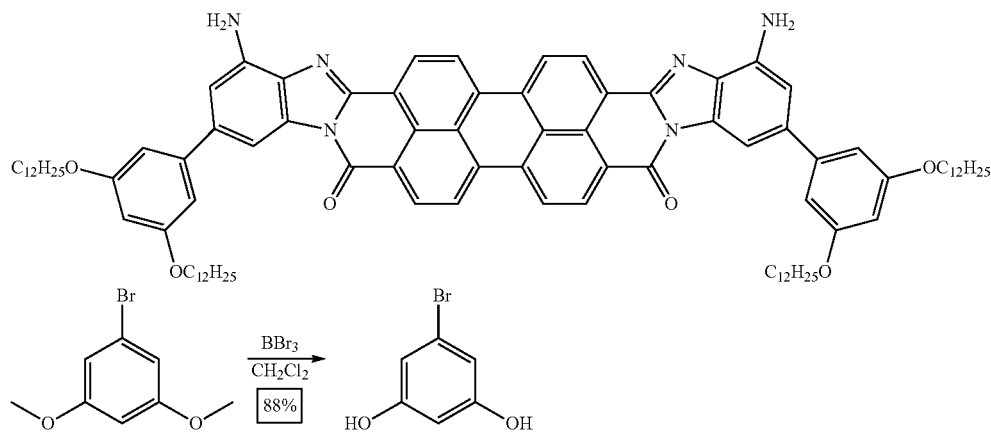

Synthesis of 3,5-dihydroxybromobenzene

To a 50 mL reaction flask oven dried overnight at 90° C., 3,5-dimethoxybromobenzene (1.012 g, 4.662 mmol) was dissolved in anhydrous $CH_2Cl_2$ (8 mL) and placed in an ice water bath to cool for 10 minutes. To this chilled solution, $BBr_3$ (10.2 mmol, 10.2 mL, 1 M in $CH_2Cl_2$) was slowly added over 5 minutes. Once this addition was complete, the reaction was removed from the ice water bath and allowed to warm in in air to room temperature and allowed to stir overnight. The reaction was confirmed to be completed after 18 hours by $SiO_2$ TLC using 1:1 Hexanes:EtOAc. The reaction was placed back on an ice water bath to cool for 10 minutes before 1 mL of methanol was added to quench any unreacted $BBr_3$ still present. This reaction mixture was washed with 10 mL of aqueous HCl (2 M) and extracted with EtOAc (3×10 mL). The organic fractions were collected and dried with $Na_2SO_4$ before being filtered. The crude reaction mixture was concentrated under vacuum and precipitated into hexanes to yield 3,5-dihydroxybromobenzene (0.768 g, 88%) $^1$H NMR (250 MHz, $CDCl_3$) δ 6.60 (d, 2H), 6.29 (m, 1H), 4.96 (s, 2H) ppm.

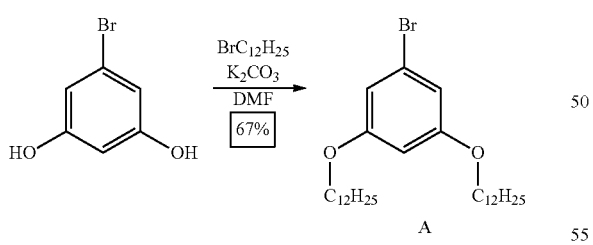

Synthesis of A

To a 25 mL reaction flask oven dried overnight at 90° C., 3,5-dihydroxybromobenzene (0.502 g, 2.66 mmol) and $K_2CO_3$ (1.097 g, 7.937 mmol) was dissolved in anhydrous DMF (11 mL) and stirred at room temperature for 10 minutes. To this mixture, bromododecane (2.0 g, 1.9 mL, 7.935 mmol) was added and the reaction was placed in a preheated 100° C. oil bath and stirred overnight. The reaction was confirmed to be completed after 18 hours by $SiO_2$ TLC using 1:1 Hexanes:EtOAc. The reaction removed from the oil bath and allowed to cool in air to room temperature. Excess $K_2CO_3$ was quenched with 10 mL of aqueous HCl (2 M) and the reaction was extracted with EtOAc (3×10 mL). The organic fractions were collected, washed with dionized water (10 mL) and dried with $Na_2SO_4$ before being filtered. The solvent was removed under vacuum and the product was purified by silica gel chromatography (100% Hexanes to 10% EtOAc: 90% Hexanes) and isolated as a colorless oil that slowly solidified into a white solid (0.929 g, 67%). $^1$H NMR (250 MHz, $CDCl_3$) δ 6.64 (d, 2H), 6.3 (m, 1H), 3.90 (t, 4H), 1.75 (m, 4H), 1.27 (s, 34H), 0.89 (t, 6H) ppm.

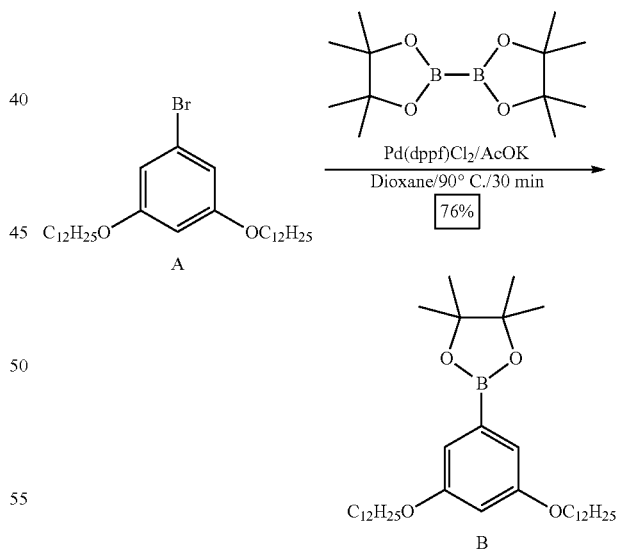

Synthesis of B

A (4.711 g, 8.962 mmol), bis(pinacolato)diboron (3.623 g, 14.26 mmol), potassium acetate (2.733 g, 27.85 mmol), Pd(dppf)Cl$_2$ (0.211 g, 0.288 mmol) were evacuated inside a 100 mL round bottom flask and backfilled with $N_2$. In a separate flask, 32 mL of dioxane was sparged with a $N_2$ flow for 15 min before being added to the reaction flask via syringe. This reaction solution was placed in a preheated oil bath set to 90° C. and monitored by TLC (9:1 Hexanes: Hexanes). When the reaction was complete, the reaction mixture was washed with 25 mL of 2M HCl and extracted with ethyl acetate (3×25 mL). The organic fractions were collected and dried using Na$_2$SO$_4$ and filtered before removing the solvent under reduced pressure. The crude material was redissolved in hexanes and filtered using a silica plug using hexanes as the eluent. Hexane was removed under reduced pressure to isolate a viscous oil (5.852 g, 114% yield). This crude mixture stirred for 1 h in 50 mL of methanol to give a white solid precipitate that was collected by vacuum filtration. B was isolated as a white solid (3.941 g, 76%).

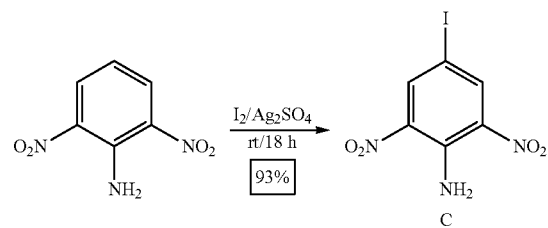

Synthesis of C 2,6-dinitroaniline (1.007 g, 5.496 mmol), Ag$_2$SO$_4$ (2.34 g, 7.502 mmol), and I$_2$ (1.965 g, 7.743 mmol) were added to a 50 mL round bottom flask at room temperature. To this mixture, 10 mL of ethanol (0.5 M of 2,6-dinitroaniline) was added and the reaction was allowed to stir at room temperature for 18 hours. The next morning a yellow precipitate had formed and TLC analysis (1:1 EtOAc:Hexanes) had shown complete consumption of the starting material. This reaction mixture was filtered and the solid residue was washed with EtOAc until the filtrate ran clear. The solvent was then removed from the filtrate under vacuum and the crude solid was redissolved in a minimum amount of CH$_2$Cl$_2$ before being precipitated into 100 mL of hexanes. The mixture was set aside for 30 minutes until no more solid precipitated and the solid was isolated via vacuum filtration. C was isolated as an orange solid (1.578 g, 93%).

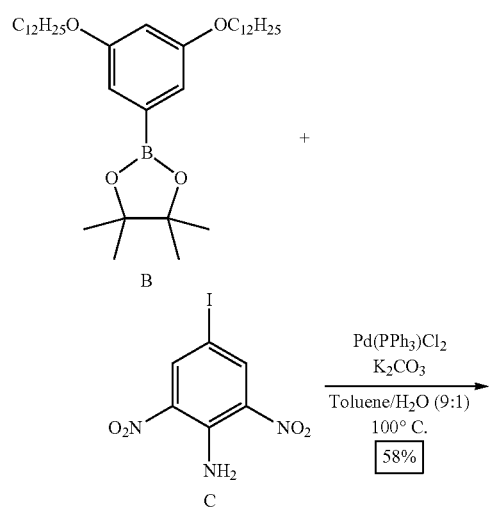

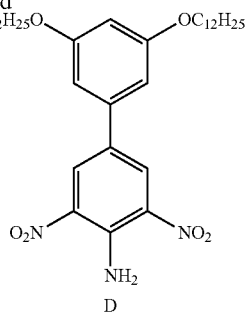

Synthesis of D

C (0.702 g, 2.24 mmol), B (1.418 g, 2.47 mmol), Pd(PPh$_3$)$_2$Cl$_2$ (0.049 g, 0.070 mmol), and K$_2$CO$_3$ (0.628 g, 4.50 mmol) were added to a 25 mL round bottom flask before being evacuated and backfilled with N$_2$ three times. In a separate flask, N$_2$ was bubbled through a 10 mL of toluene and 5 mL of H$_2$O for 30 min before adding 4.7 mL of degassed toluene and 0.53 mL of degassed water to the reaction flask. This solution was then placed in a preheated oil bath at 100° C. and stirred for overnight. The reaction was monitored by TLC (7:3 Hexanes:EtOAc). Once the reaction was complete, it was removed from the oil bath and allowed to cool to room temperature in air for 30 min. The mixture was washed with 5 mL of distilled water and excess base was carefully acidified with the addition of 2M HCl (10 mL) then extracted with EtOAc (3×10 mL). The organic fractions were collected and dried with NaSO$_4$, filtered, and the solvent was removed under vacuum distillation. The crude product was dissolved in a minimum amount of CH$_2$Cl$_2$ and precipitated into MeOH. The solid was filtered to give D as a yellow solid (0.818 g, 58%).

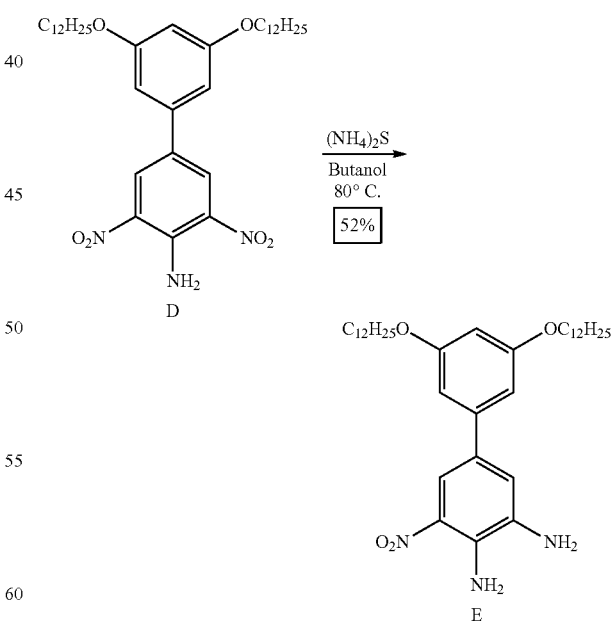

Synthesis of E

D (0.489 g, 0.773 mmol), was added to a round bottom flask and dissolved into n-butanol (3.2 mL) at 80° C. To this solution was added a 20 wt % aqueous solution of (NH$_4$)$_2$S (2 equiv, 0.54 mL). The reaction was stirred for 1 hr and was monitored by TLC (7:3 Hexanes/EtOAc). When the reaction was complete, the reaction mixture was washed with 5 mL of 2 M HCl and extracted with ethyl acetate (3×5 mL). The organic fractions were collected and dried using Na$_2$SO$_4$ and filtered before removing the solvent under reduced pressure. The crude material was redissolved in hexanes purified using SiO$_2$ column chromatography (7:3 Hexanes/EtOAc) to give E as a viscous red oil (0.241 g, 52%).

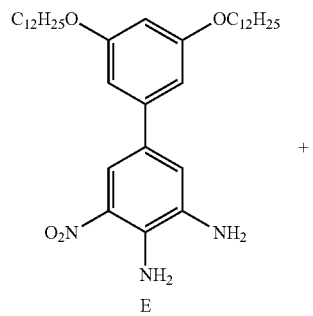

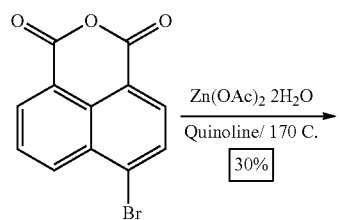

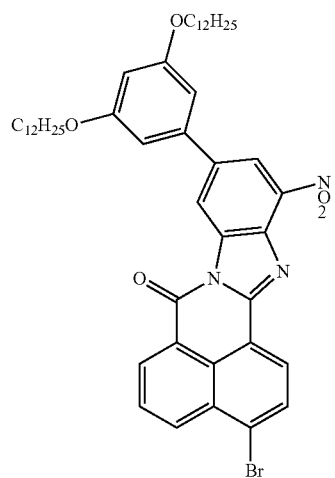

Synthesis of F

E (0.050 g, 0.0836 mmol) and 4-bromonaphthalic anhydride (0.030 g, 0.101 mmol), and Zn(OAc)$_2$ 2H$_2$O (0.008 g, 0.035 mmol) were added to a round bottom flask before being evacuated and backfilled with N$_2$. In a separate flask, quinoline was sparged for 15 min under a flow of N$_2$ and added to the reaction mixture (0.7 mL). This suspension was heated to 170° C. and let to stir overnight. When the reaction is complete (monitored by TLC), the hot solution was poured into MeOH (50 mL) and the resulting solid was washed with 20 mL of additional MeOH before being collected. Residual MeOH was removed under reduced pressure. F was collected (1.038 g, 74%).

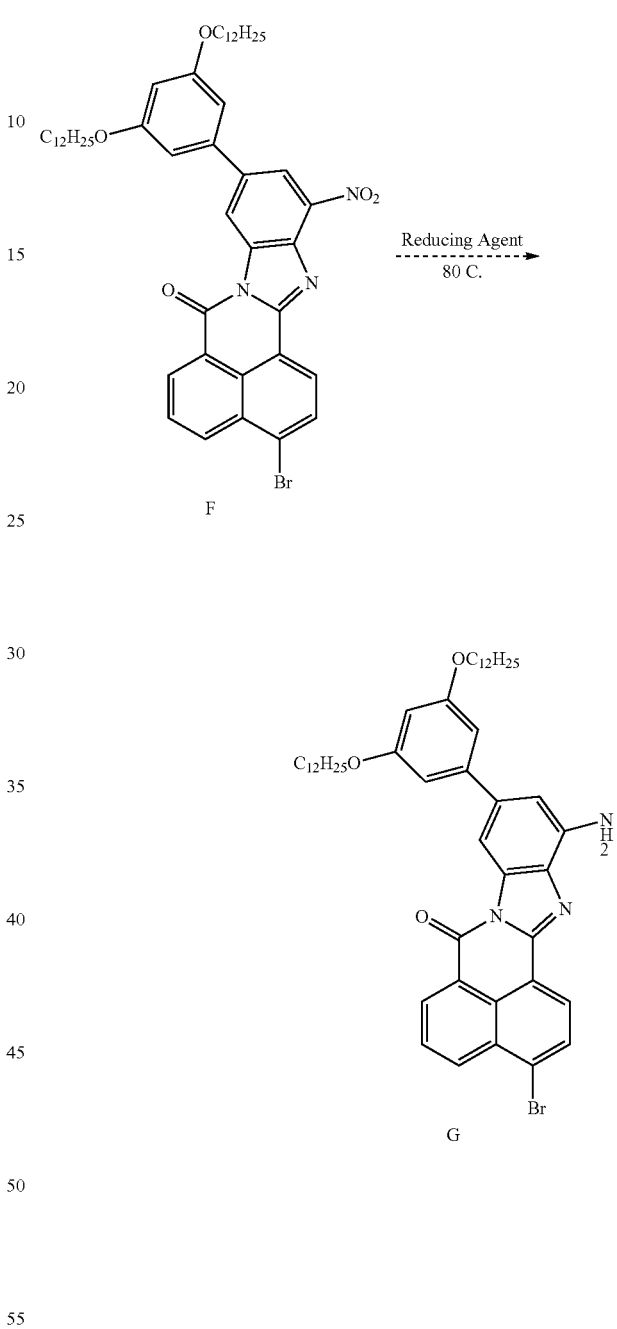

Synthesis of G

F (1 equivalent) was added to a round bottom flask with butanol (0.3 M). This suspension was heated to 80° C. and a reducing agent (SnCl$_2$, (NH$_4$)$_2$S, or HNaS; 1 equivalent) was transferred to the hot reaction mixture. The reaction was monitored by TLC analysis and allowed to stir overnight. By TLC, SnCl$_2$ and HNaS had completely consumed the starting material, however there is no observable product that could be isolated from the reaction mixture. (NH$_4$)$_2$S revealed no reaction and only starting material could be isolated.

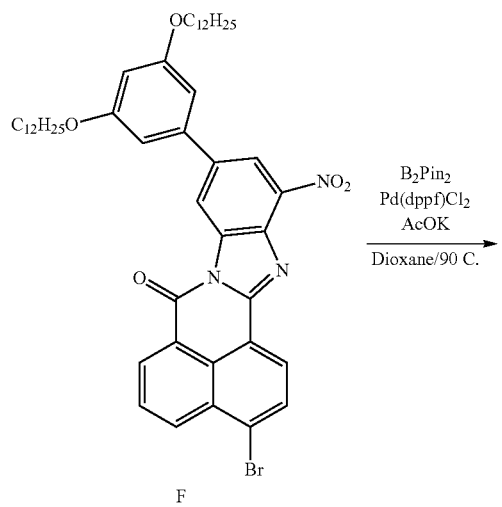

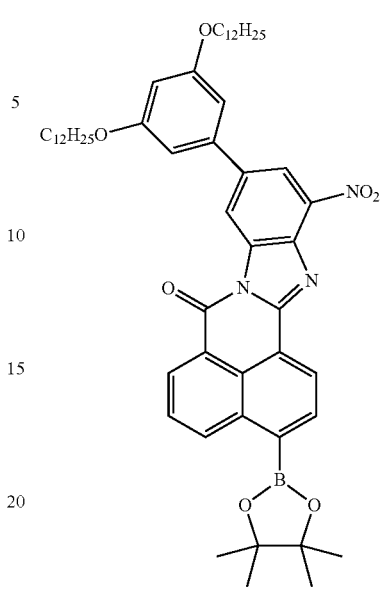

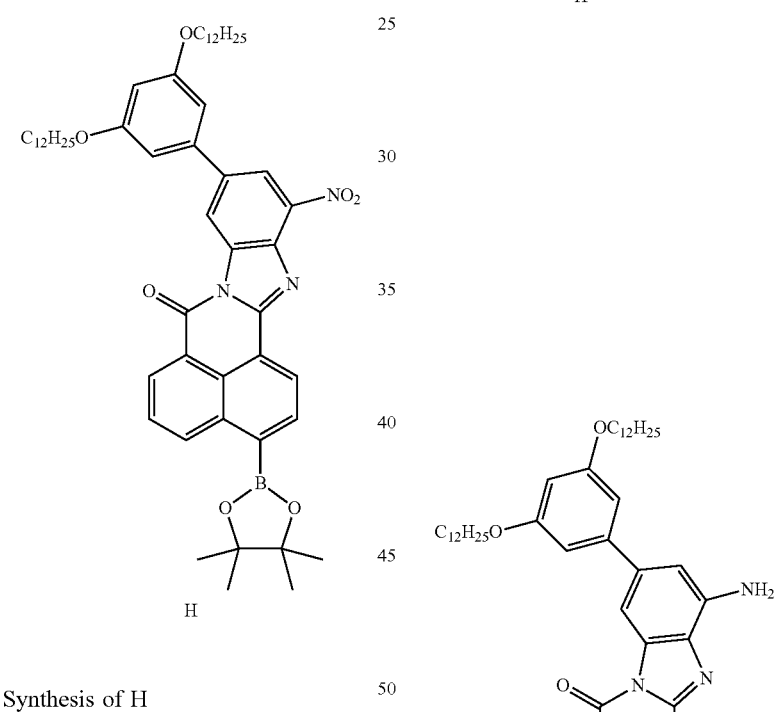

Synthesis of H

F (1 equiv.), Pd(dppf)Cl₂ (0.05 equiv.), AcOK (2 equiv.), and B₂Pin₂ (1.5 equiv.) were added to 25 mL round bottom flask. This mixture was then evacuated and backfilled with $N_2$ 3 times. In a separate flask, dioxane (0.3 M) was bubbled with $N_2$ for 30 minutes. This degassed solvent was then added to the reaction flask under an $N_2$ atmosphere and placed into a preheated 100° C. oil bath and allowed to stir overnight. When the reaction was complete, it was removed from the oil bath and allowed to cool to rt before being washed with 2M HCl (~20 mL) and extracted using EtOAc (2×30 mL). The organic layers were collected, dried with $Na_2SO_4$, filtered, and the solvent was removed under reduced pressure. The crude product was purified by column chromatography (100% Hexanes—8:2 Hexanes/EtOAc). The solvent was removed to give H.

-continued

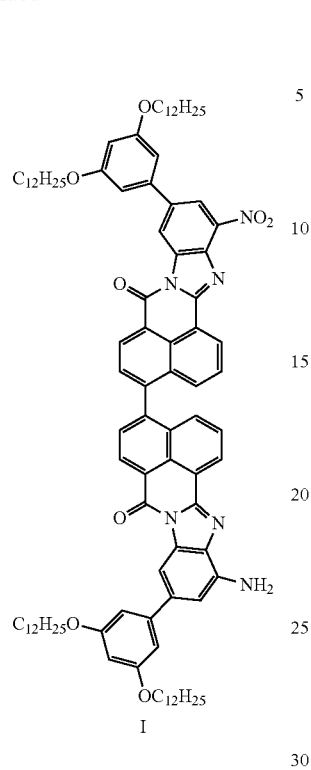

I

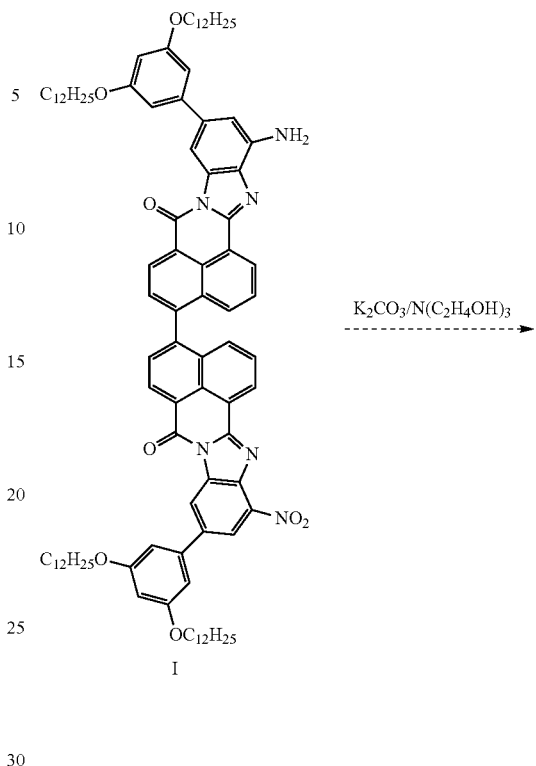

I

Synthesis of I

H (1 equiv.), Pd(PPh$_3$)$_4$ (0.05 equiv), K$_2$CO$_3$ (2 equiv.), and G (1 equiv.) were added to a reaction flask. This mixture was then evacuated and backfilled with N$_2$ 3 times. In a separate flask, a mixture of toluene, H$_2$O (2:1) was bubbled with N$_2$ for 10 minutes. This degassed solvent was then added to the reaction flask under an N$_2$ atmosphere via syringe and placed into a preheated 100° C. oil bath and allowed to stir overnight. When completed, the reaction was removed from the oil bath and allowed to cool to rt before being washed with 2M HCl (10 mL) and extracted using EtOAc (2×10 mL). The organic layers were collected, dried with Na$_2$SO$_4$, filtered, and the solvent was removed under reduced pressure. The crude solid was dissolved in a minimum amount of CH$_2$Cl$_2$ and precipitated into MeOH.

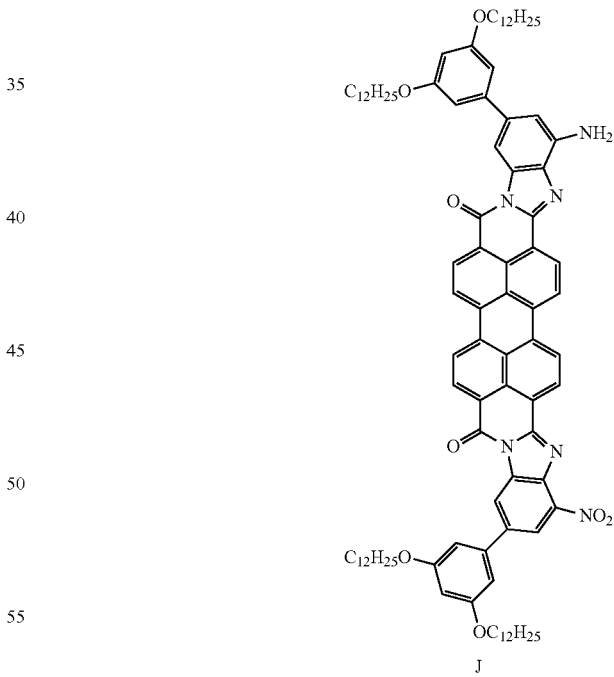

J

I (1 equivalent) was dispersed in triethanolamine (0.02 M) and K$_2$CO$_3$ (25 equivalents) was added. The mixture was stirred at 130° C. for 24 hours under argon atmosphere. Upon cooling to room temperature, the reaction mixture was diluted with dichloromethane and washed with water. The organic layer was dried over anhydrous sodium sulfate and purified by precipitation into methanol or silica gel column chromatography to yield J as dark purple solid.

A Sharp polymer has a general structural formula:

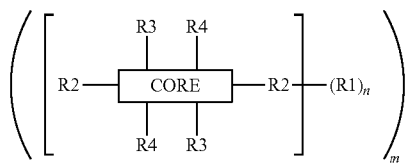

Where Core is an aromatic polycyclic conjugated molecule comprising rylene fragments. This molecule has flat anisometric form and self-assembles by pi-pi stacking in a column-like supramolecule. The substitute R1 provides solubility of the organic compound in a solvent. The parameter n is number of substitutes R1, which is equal to 0, 1, 2, 3, 4, 5, 6, 7 or 8. The substitute R2 is an electrically resistive substitute located in terminal positions, which provides resistivity to electric current and comprises hydrocarbon (saturated and/or unsaturated), fluorocarbon, siloxane, and/or polyethyleneglycol as linear or branched chains. The substitutes R3 and R4 are substitutes located on side (lateral) positions (terminal and/or bay positions) comprising one or more ionic groups from a class of ionic compounds that are used in ionic liquids connected to the aromatic polycyclic conjugated molecule (Core), either directly, e.g., with direct bound SP2-SP3 carbons, or via a connecting group. The parameter m is a number of the aromatic polycyclic conjugated molecules in the column-like supramolecule, which is in a range from 3 to 100,000.

In another embodiment of the composite organic compound, the aromatic polycyclic conjugated molecule comprises an electro-conductive oligomer, such as a phenylene, thiophene, or polyacene quinine radical oligomer or combinations of two or more of these. In yet another embodiment of the composite organic compound, the electro-conductive oligomer is selected from phenylene, thiophene, or substituted and/or unsubstituted polyacene quinine radical oligomer of lengths ranging from 2 to 12 or combination of two or more of these. Wherein the substitutions of ring hydrogens by O, S or NR5, and R5 is selected from the group consisting of unsubstituted or substituted $C_1$-$C_{18}$alkyl, unsubstituted or substituted $C_2$-$C_{18}$alkenyl, unsubstituted or substituted $C_2$-$C_{18}$alkynyl, and unsubstituted or substituted $C_4$-$C_{18}$ aryl.

In some embodiments, the substitute providing solubility (R1) of the composite organic compound is $C_XQ_{2X+1}$, where X≥1 and Q is hydrogen (H), fluorine (F), or chlorine (Cl). In still another embodiment of the composite organic compound, the substitute providing solubility (R1) of the composite organic compound is independently selected from alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, butyl, iso-butyl and tert-butyl groups, and the aryl group is selected from phenyl, benzyl and naphthyl groups or siloxane, and/or polyethylene glycol as linear or branched chains.

In some embodiments, at least one electrically resistive substitute (R2) of the composite organic compound is $C_XQ_{2X+1}$, where X≥1 and Q is hydrogen (H), fluorine (F), or chlorine (Cl). In another embodiment of the composite organic compound, at least one electrically resistive substitute (R2) is selected from the list comprising —(CH$_2$)$_n$—CH$_3$, —CH((CH$_2$)$_n$CH$_3$)$_2$) (where n≥1), alkyl, aryl, substituted alkyl, substituted aryl, branched alkyl, branched aryl, and any combination thereof and wherein the alkyl group is selected from methyl, ethyl, propyl, butyl, iso-butyl and tert-butyl groups, and the aryl group is selected from phenyl, benzyl and naphthyl groups. In yet another embodiment of the composite organic compound.

In some embodiments, the substitute R1 and/or R2 is connected to the aromatic polycyclic conjugated molecule (Core) via at least one connecting group. The at least one connecting group may be selected from the list comprising the following structures: ether, amine, ester, amide, substituted amide, alkenyl, alkynyl, sulfonyl, sulfonate, sulfonamide, or substituted sulfonamide.

In some embodiments, the substitute R3 and/or R4 may be connected to the aromatic polycyclic conjugated molecule (Core) via at least one connecting group. The at least one connecting group may be selected from the list comprising CH$_2$, CF$_2$, SiR$_2$O, CH$_2$CH$_2$O, wherein R is selected from the list comprising H, alkyl, and fluorine. In another embodiment of the composite organic compound, the one or more ionic groups include at least one ionic group selected from the list comprising [NR$_4$]$^+$, [PR$_4$]$^+$ as cation and [—CO$_2$]$^-$, [—SO$_3$]$^-$, [—SR$_5$]$^-$, [—PO$_3$R]$^-$, [—PR$_5$]$^-$ as anion, wherein R is selected from the list comprising H, alkyl, and fluorine.

In some implementations, the aromatic polycyclic conjugated molecule (Core) comprises rylene fragments. In another embodiment of the composite organic compound, the rylene fragments are selected from structures 1 to 21 as given in Table 1.

TABLE 1

Examples of the polycyclic organic molecule (Core) comprising rylene fragments

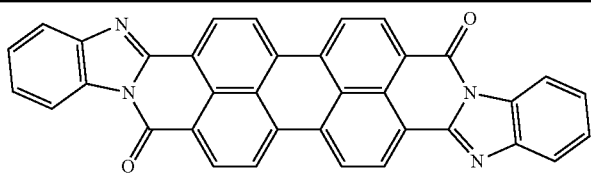

1

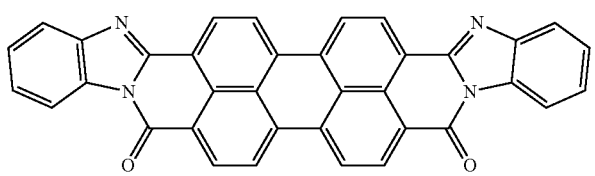 [SMILES: O=c1c2ccc3c4ccc5c(=O)n6c7ccccc7nc6c6ccc(c7ccc(c2c37)c2nc3ccccc3n12)c4c56]

2

TABLE 1-continued
Examples of the polycyclic organic molecule (Core) comprising rylene fragments
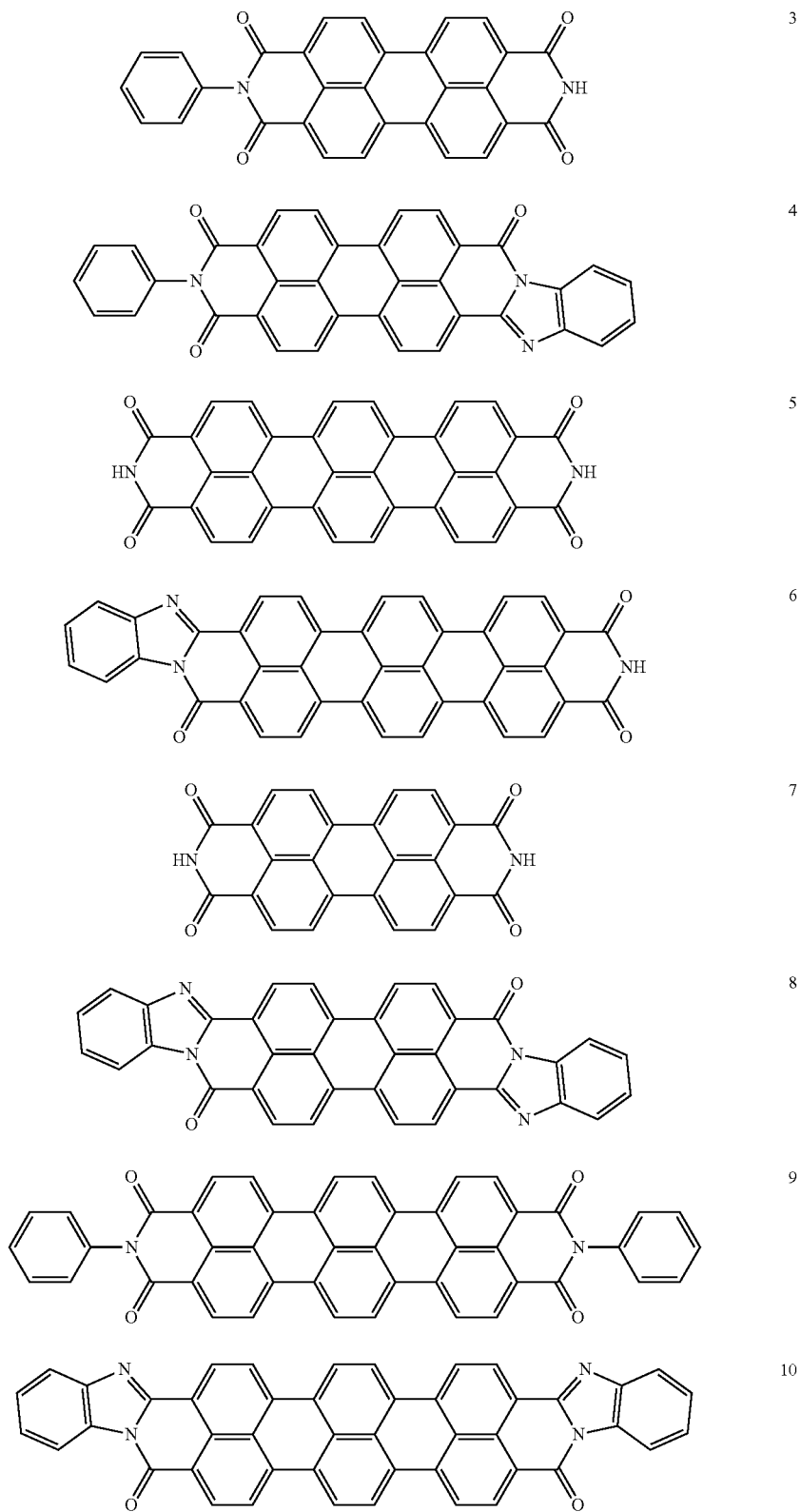
3
4
5
6
7
8
9
10

TABLE 1-continued
Examples of the polycyclic organic molecule (Core) comprising rylene fragments
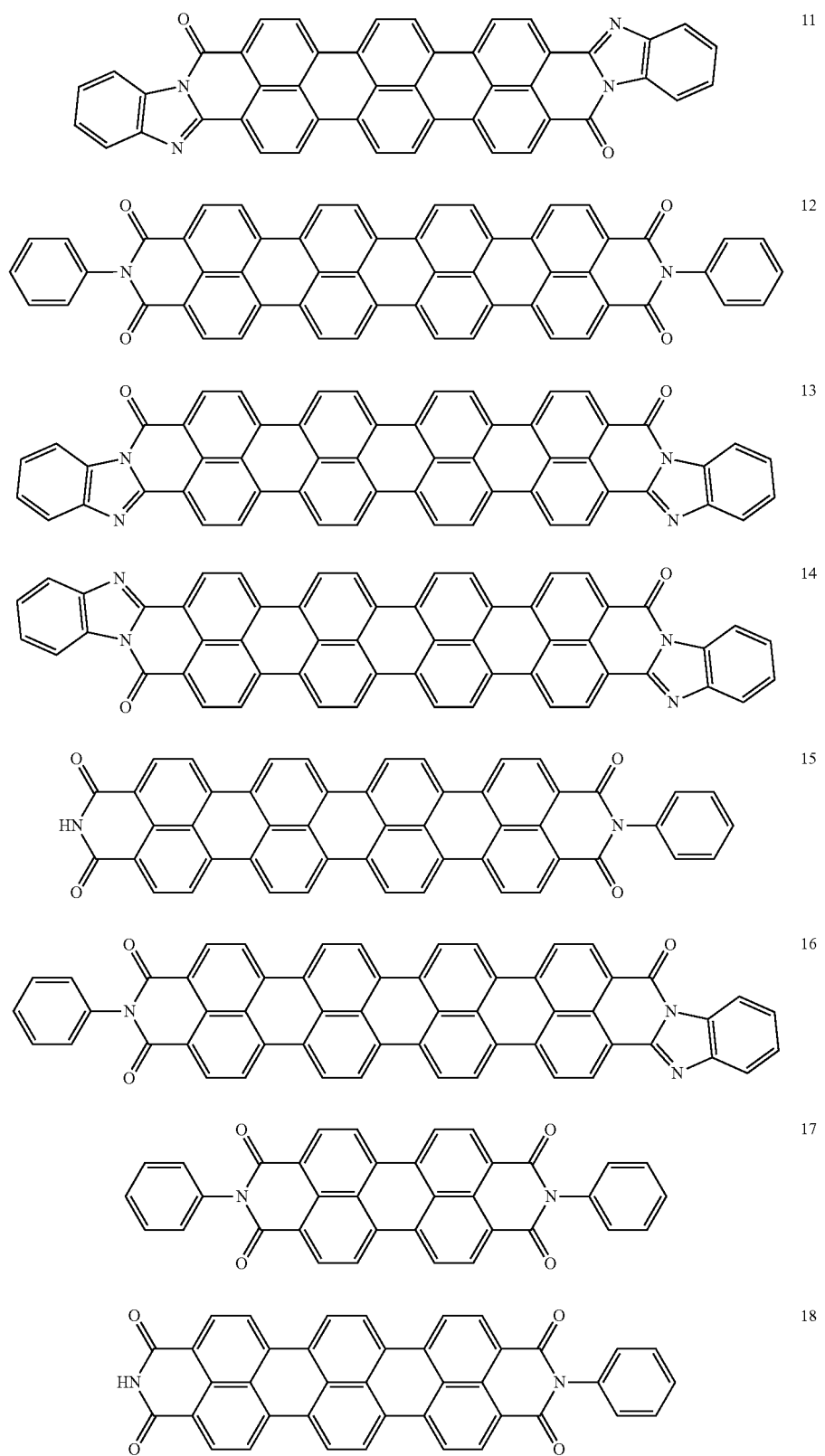
11
12
13
14
15
16
17
18

TABLE 1-continued

Examples of the polycyclic organic molecule (Core) comprising rylene fragments

| | |
|---|---|
| (structure) | 19 |
| (structure) | 20 |
| (structure) | 21 |

In other implementations, the aromatic polycyclic conjugated molecule comprises an electro-conductive oligomer, such as a phenylene, thiophene, or polyacene quinine radical oligomer or combinations of two or more of these. In yet another embodiment of the composite organic compound, the electro-conductive oligomer is selected from structures 22 to 30 as given in Table 2, wherein I=2, 3, 4, 5, 6, 7, 8, 9, 10, 11 or 12, Z is =O, =S or =NR5, and R5 is selected from the group consisting of unsubstituted or substituted $C_1$-$C_{18}$alkyl, unsubstituted or substituted $C_2$-$C_{18}$alkenyl, unsubstituted or substituted $C_2$-$C_{18}$alkynyl, and unsubstituted or substituted $C_4$-$C_{18}$aryl:

TABLE 2

Examples of the polycyclic organic molecule (Core) comprising electro-conductive oligomer

| | |
|---|---|
| (structure) | 22 |
| (structure) | 23 |
| (structure) | 24 |

TABLE 2-continued

Examples of the polycyclic organic molecule (Core) comprising electro-conductive oligomer

| | |
|---|---|
| (structure) | 25 |
| (structure) | 26 |
| (structure) | 27 |
| (structure) | 28 |

TABLE 2-continued

Examples of the polycyclic organic molecule (Core) comprising electro-conductive oligomer

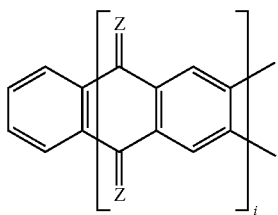

29

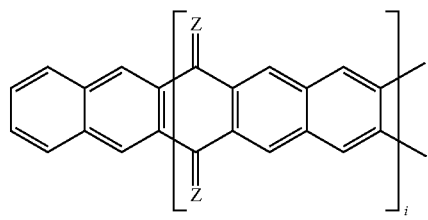

30

In some implementations, the substitute providing solubility (R1) of the composite organic compound is $C_xQ_{2X+1}$, where i≥1 and Q is hydrogen (H), fluorine (F), or chlorine (Cl). In still another embodiment of the composite organic compound, the substitute providing solubility (R1) of the composite organic compound is independently selected from alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, butyl, iso-butyl and tert-butyl groups, and the aryl group is selected from phenyl, benzyl and naphthyl groups or siloxane, and/or polyethyleneglycol as linear or branched chains.

In one embodiment of the composite organic compound, the solvent is selected from benzene, toluene, xylenes, acetone, acetic acid, methylethylketone, hydrocarbons, chloroform, carbontetrachloride, methylenechloride, dichlorethane, chlorobenzene, alcohols, nitromethan, acetonitrile, dimethylforamide, 1,4-dioxane, tetrahydrofuran (THF), methylcyclohexane (MCH), and any combination thereof.

In some embodiments, at least one electrically resistive substitute (R2) of the composite organic compound is $C_xQ_{2X+1}$, where i≥1 and Q is hydrogen (H), fluorine (F), or chlorine (Cl). In another embodiment of the composite organic compound, at least one electrically resistive substitute (R2) is selected from the list comprising —(CH$_2$)$_n$—CH$_3$, —CH((CH$_2$)$_n$CH$_3$)$_2$) (where n≥1), alkyl, aryl, substituted alkyl, substituted aryl, branched alkyl, branched aryl, and any combination thereof and wherein the alkyl group is selected from methyl, ethyl, propyl, butyl, iso-butyl and tert-butyl groups, and the aryl group is selected from phenyl, benzyl and naphthyl groups. In yet another embodiment of the composite organic compound.

In some embodiments, at least one electrically resistive substitute (R2) is selected from the group of alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, n-butyl, iso-butyl and tert-butyl groups, and the aryl group is selected from phenyl, benzyl and naphthyl groups or siloxane, and/or polyethyleneglycol as linear or branched chains.

In some embodiments, the substitute R1 and/or R2 is connected to the aromatic polycyclic conjugated molecule (Core) via at least one connecting group. The at least one connecting group may be selected from the list comprising the following structures: 31-41 as given in Table 3, where W is hydrogen (H) or an alkyl group.

TABLE 3

Examples of the connecting group

  31

  32

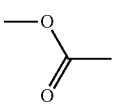  33

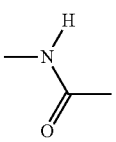  34

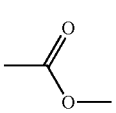  35

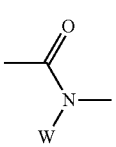  36

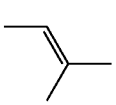  37

  38

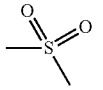  39

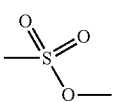  40

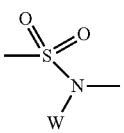  41

In some embodiments, the substitute R3 and/or R4 may be connected to the aromatic polycyclic conjugated molecule (Core) via at least one connecting group. The at least one connecting group may be selected from the list comprising CH$_2$, CF$_2$, SiR$_2$O, CH$_2$CH$_2$O, wherein R is selected from the list comprising H, alkyl, and fluorine. In another embodiment of the composite organic compound, the one or more ionic groups include at least one ionic group selected from the list comprising [NR$_4$]$^+$, [PR$_4$]$^+$ as cation and [—CO$_2$]$^-$, [—SO$_3$]$^-$, [—SR$_5$]$^-$, [—PO$_3$R]$^-$, [—PR$_5$]$^-$ as anion, wherein R is selected from the list comprising H, alkyl, and fluorine.

Sharp polymers have hyperelectronic or ionic type polarizability. "Hyperelectronic polarization may be considered due to the pliant interaction of charge pairs of excitons, localized temporarily on long, highly polarizable molecules, with an external electric field (Roger D. Hartman and Herbert A. Pohl, "Hyper-electronic Polarization in Macromolecular Solids", Journal of Polymer Science: Part A-1 Vol. 6, pp. 1135-1152 (1968))." Ionic type polarization can be achieved by limited mobility of ionic parts of the tethered/partially immobilized ionic liquid or zwitterion (Q). Additionally, other mechanisms of polarization such as dipole polarization and monomers and polymers possessing metal conductivity may be used independently or in combination with hyper-electronic and ionic polarization in aspects of the present disclosure.

In some implementations, the metadielectric may include one or more Sharp polymers in the form of a composite organic compound characterized by polarizability and resistivity having the above general structural formula.

Further, characteristics of metadielectrics include a relative permittivity greater than or equal to 1,000 and resistivity greater than or equal to 10$^{16}$ ohm/cm. Individually, the Sharp Polymers in a metadielectric may form column like supramolecular structures by pi-pi interaction. Said supramolecules of Sharp polymers allow formation of crystal structures of the metadielectric material. By way of using Sharp polymers in a dielectric material, polarization units are incorporated to provide the molecular material with high dielectric permeability. There are several mechanisms of polarization such as dipole polarization, ionic polarization, and hyper-electronic polarization of molecules, monomers and polymers possessing metal conductivity. All polarization units with the listed types of polarization may be used in aspects of the present disclosure. Further, Sharp polymers are composite materials which incorporate an envelope of insulating substituent groups that electrically isolate the supramolecules from each other in the dielectric crystal layer and provide high breakdown voltage of the energy storage molecular material. Said insulating substituent groups are resistive alkyl or fluoro-alkyl chains covalently bonded to a polarizable core, forming the resistive envelope.

In order that the invention may be more readily understood, reference is made to the following examples, which are intended to be illustrative of the invention, but are not intended to be limiting the scope.

Example 2

This Example describes synthesis of one type of Sharp polymer according following structural scheme:

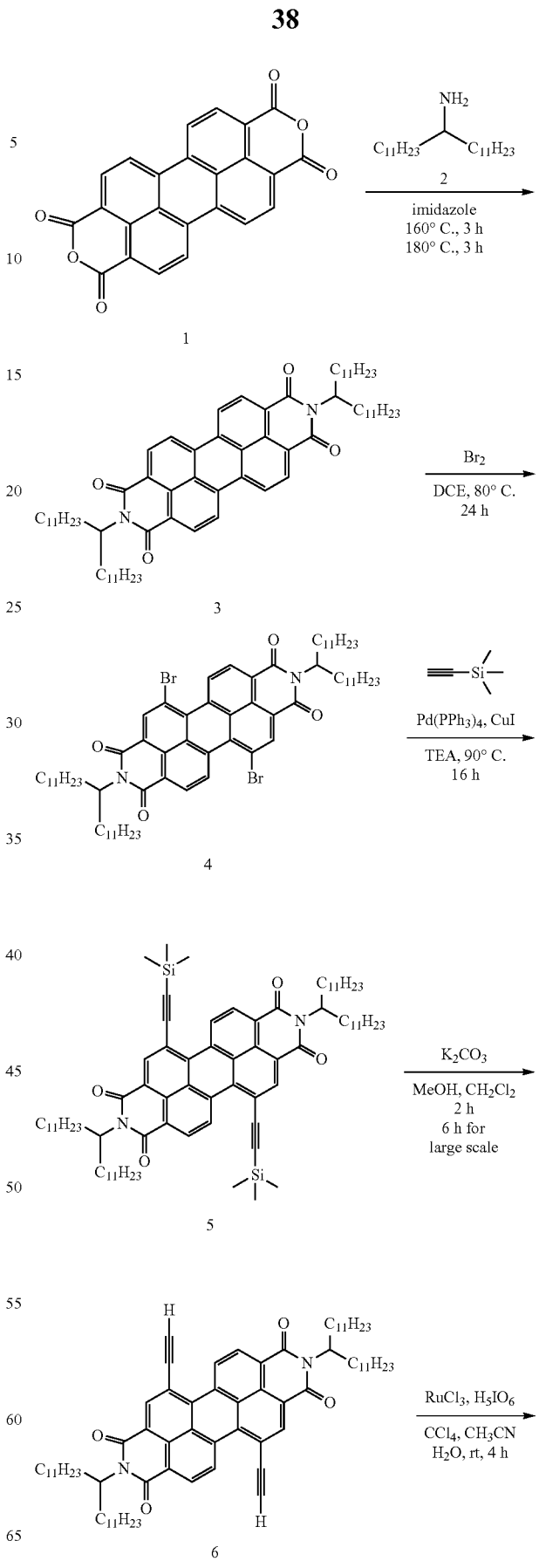

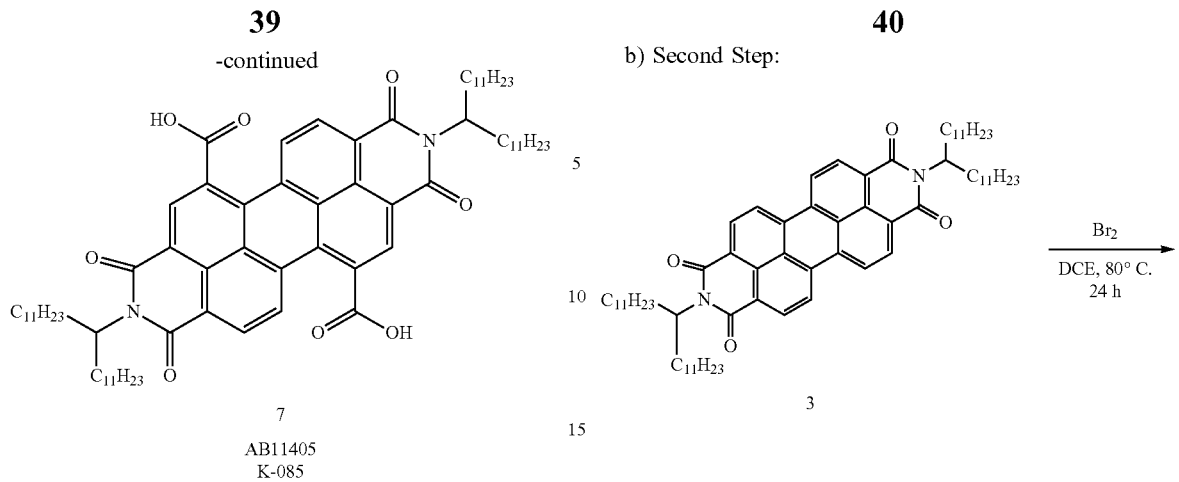

7
AB11405
K-085

The process involved in the synthesis in this example may be understood in terms of the following five steps.

a) First Step:

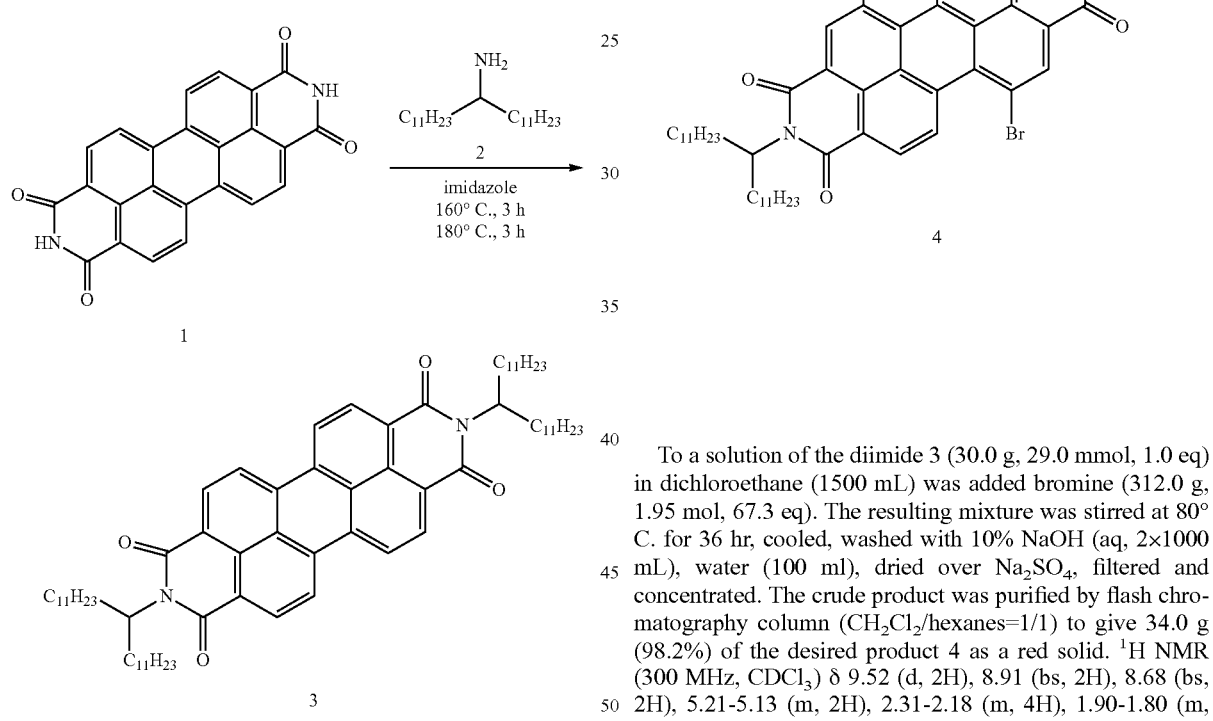

Anhydride 1 (60.0 g, 0.15 mol, 1.0 eq), amine 2 (114.4 g, 0.34 mol, 2.2 eq) and imidazole (686.0 g, 10.2 mol, 30 eq to 2) were mixed well into a 500 mL of round-bottom flask equipped with a bump-guarder. The mixture was degassed three times, stirred at 160° C. for 3 hr, 180° C. for 3 hr, and cooled to rt. The reaction mixture was crushed into water (1000 mL) with stirring. Precipitate was collected with filtration, washed with water (2×500 mL), methanol (2×300 mL) and dried on high vacuum. The crude product was purified by flash chromatography column (CH$_2$Cl$_2$/hexane=1/1) to give 77.2 g (48.7%) of the desired product 3 as an orange solid. $^1$H NMR (300 MHz, CDCl$_3$) δ 8.65-8.59 (m, 8H), 5.20-5.16 (m, 2H), 2.29-2.22 (m, 4H), 1.88-1.82 (m, 4H), 1.40-1.13 (m, 64H), 0.88-0.81 (t, 12H). Rf=0.68 (CH$_2$Cl$_2$/hexane=1/1).

b) Second Step:

To a solution of the diimide 3 (30.0 g, 29.0 mmol, 1.0 eq) in dichloroethane (1500 mL) was added bromine (312.0 g, 1.95 mol, 67.3 eq). The resulting mixture was stirred at 80° C. for 36 hr, cooled, washed with 10% NaOH (aq, 2×1000 mL), water (100 ml), dried over Na$_2$SO$_4$, filtered and concentrated. The crude product was purified by flash chromatography column (CH$_2$Cl$_2$/hexanes=1/1) to give 34.0 g (98.2%) of the desired product 4 as a red solid. $^1$H NMR (300 MHz, CDCl$_3$) δ 9.52 (d, 2H), 8.91 (bs, 2H), 8.68 (bs, 2H), 5.21-5.13 (m, 2H), 2.31-2.18 (m, 4H), 1.90-1.80 (m, 4H), 1.40-1.14 (m, 64H), 0.88-0.81 (t, 12H). Rf=0.52 (CH$_2$Cl$_2$/hexanes=1/1).

c) Third Step

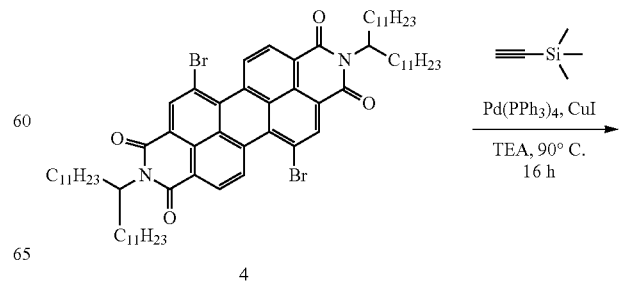

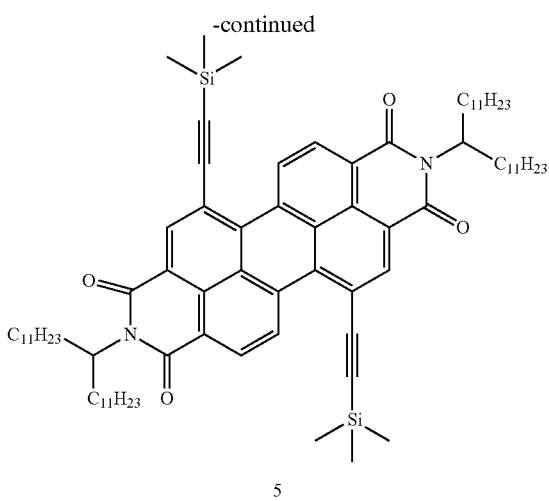

5

To a solution of the di-bromide 4 (2.0 g, 1.68 mmol, 1.0 eq) in triethylamine (84.0 mL) was added CuI (9.0 mg, 0.048 mmol, 2.8 mol %) and (trimethylsilyl)acetylene (80.49 g, 5.0 mmol, 3.0 eq). The mixture was degassed three times. Catalyst Pd(PPh$_3$)$_4$ (98.0 mg, 0.085 mmol, 5.0 mol %) was added. The mixture was degassed three times, stirred at 90° C. for 24 hr, cooled, passed through a pad of Celite, and concentrated. The crude product was purified by flash chromatography column (CH$_2$Cl$_2$/hexane=1/1) to give 1.8 g (87.2%) of the desired product 5 as a dark-red solid. $^1$H NMR (300 MHz, CDCl$_3$) δ 10.24-10.19 (m, 2H), 8.81 (bs, 2H), 8.65 (bs, 2H), 5.20-5.16 (m, 2H), 2.31-2.23 (m, 4H), 1.90-1.78 (m, 4H), 1.40-1.15 (m, 72H), 0.84-0.81 (t, 12H), 0.40 (s, 18H). Rf=0.72 (CH$_2$Cl$_2$/hexane=1/1).

d) Fourth Step

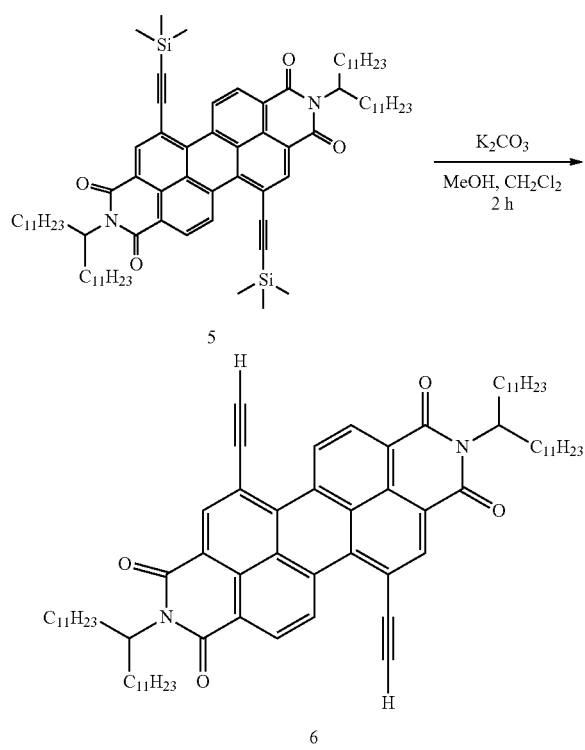

To a solution of diimide 5 (1.8 g, 1.5 mmol, 1.0 eq) in a mixture of MeOH/DCM (40.0 mL/40.0 mL) was added K$_2$CO$_3$ (0.81 g, 6.0 mmol, 4.0 eq). The mixture was stirred at room temperature for 1.5 hr, diluted with DCM (40.0 mL), washed with water, brine, dried over Na$_2$SO$_4$, filtered and concentrated. The crude product was purified by flash chromatography column (CH$_2$Cl$_2$) to give 1.4 g (86.1%) of the desired product 6 as a dark-red solid. $^1$H NMR (300 MHz, CDCl$_3$) δ 10.04-10.00 (m, 2H), 8.88-8.78 (m, 2H), 8.72-8.60 (m, 2H), 5.19-5.14 (m, 2H), 3.82-3.80 (m, 2H), 2.31-2.23 (m, 4H), 1.90-1.78 (m, 4H), 1.40-1.05 (m, 72H), 0.85-0.41 (t, 12H). Rf=0.62 (CH$_2$Cl$_2$).

e) Fifth Step

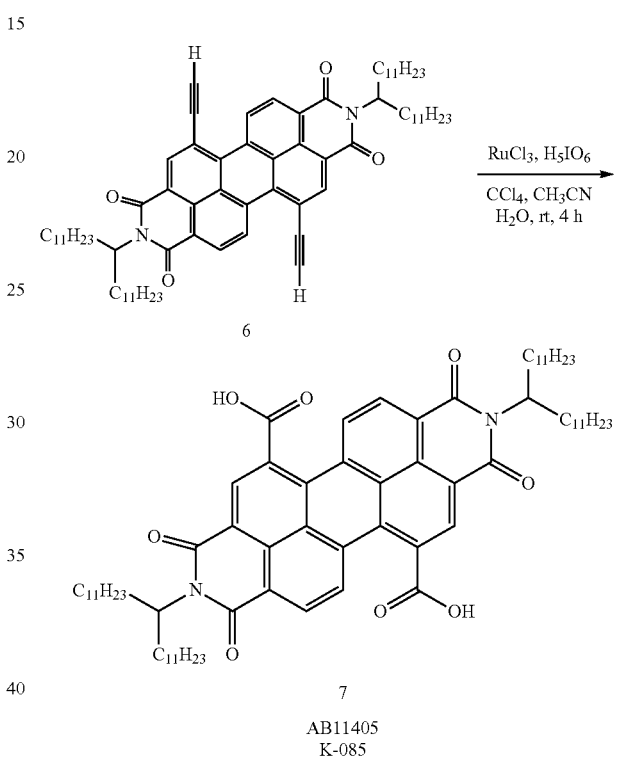

AB11405
K-085

To a suspension of alkyne 6 (1.4 g, 1.3 mmol, 1.0 eq) in a mixture of CCl$_4$/CH$_3$CN/H$_2$O (6 mL/6 mL/12 mL) was added periodic acid (2.94 g, 12.9 mmol, 10.0 eq) and RuCl$_3$ (28.0 mg, 0.13 mmol, 10 mol %). The mixture was stirred at room temperature under nitrogen for 4 hours, diluted with DCM (50 mL), washed with water, brine, dried over Na$_2$SO$_4$, filtered and concentrated. The crude product was purified by flash chromatography column (10% MeOH/CH$_2$Cl$_2$) to give 1.0 g (68.5%) of the desired product 7 as a dark-red solid. $^1$H NMR (300 MHz, CDCl$_3$) □ 8.90-8.40 (m, 6H), 5.17-5.00 (m, 2H), 2.22-2.10 (m, 4H), 1.84-1.60 (m, 4H), 1.41-0.90 (m, 72H), 0.86-0.65 (t, 12H). Rf=0.51 (10% MeOH/CH$_2$Cl$_2$).

Furuta co-polymers and para-Furuta polymers (herein referred to collectively as Furuta Polymers unless otherwise specified) are polymeric compounds with insulating tails, and linked/tethered/partially immobilized polarizable ionic groups. The insulating tails are hydrocarbon (saturated and/or unsaturated), fluorocarbon, siloxane, and/or polyethylene glycol linear or branched chains covalently bonded to the co-polymer backbone. The tails act to insulate the polarizable tethered/partially immobilized ionic molecular components and ionic pairs from other ionic groups and ionic group pairs on the same or parallel co-polymers, which favorably allows discrete polarization of counter ionic liquid pairs or counter Q groups (i.e. polarization of cationic liquid and anionic liquid tethered/partially immobilized to parallel Furuta polymers) with limited or no interaction of ionic fields or polarization moments of other counter ionic group pairs partially immobilized on the same or parallel co-polymer chains Further, the insulating tails electrically insulate supra-structures of Furuta polymers from each other. Parallel Furuta polymers may arrange or be arranged such that counter ionic groups (i.e. tethered/partially immobilized ionic groups (Qs) of cation and anion types (sometimes known as cationic Furuta polymers and anionic Furuta polymers)) are aligned opposite from one another. In some implementations, the metadielectric layer may include two or more Furuta polymers, including a Furuta polymer having an immobilized ion liquid group of a cationic or anionic type.

A Furuta co-polymer has the following general structural formula:

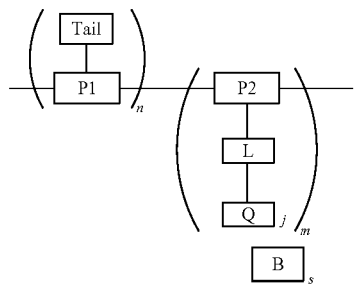

wherein backbone structure of the co-polymer comprises structural units of first type P1 and structural units of second type P2 both of which randomly repeat and are independently selected from the list comprising acrylic acid, methacrylate, repeat units of polypropylene (—[CH$_2$—CH(CH$_3$)]—), repeat units of polyethylene (—[CH$_2$]—), siloxane, or repeat units of polyethylene terephthalate (sometimes written poly(ethylene terephthalate)) for which the repeat unit may be expressed as —CH$_2$—CH$_2$—O—CO—C$_6$H$_4$—CO—O—. Parameter n is the number of the P1 structural units in the backbone structure which is in the range from 3 to 100,000 and m is number of the P2 structural units in the backbone structure which is in the range from 3 to 100,000. Further, the first type structural unit (P1) has a resistive substitute Tail which is oligomers of polymeric material with HOMO-LUMO gap no less than 2 eV. Additionally, the second type of structural units (P2) has an ionic functional group Q which is connected to P2 via a linker group L. The parameter j is a number of functional groups Q attached to the linker group L, which may range from 0 to 5. Wherein the ionic functional group Q comprises one or more ionic liquid ions (from the class of ionic compounds that are used in ionic liquids), zwitterions, or polymeric acids. Further, an energy interaction of the ionic Q groups may be less than kT, where k is Boltzmann constant and T is the temperature of environment. Still further, parameter B is a counter ion which is a molecule or molecules or oligomers that can supply the opposite charge to balance the charge of the co-polymer. Wherein, s is the number of the counter ions.

The present disclosure provides an organic co-polymeric compound having the structure described above. In one embodiment of the organic co-polymeric compound, the resistive substitute Tails are independently selected from the list comprising oligomers of polypropylene (PP), oligomers of polyethylene terephthalate (PET), oligomers of polyphenylene sulfide (PPS), oligomers of polyethylene naphthalate (PEN), oligomers of polycarbonate (PP), polystyrene (PS), and oligomers of polytetrafluoroethylene (PTFE). In another embodiment of the organic co-polymeric compound, the resistive substitutes Tail are independently selected from alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, butyl, iso-butyl and tert-butyl groups, and the aryl group is selected from phenyl, benzyl and naphthyl groups. The resistive substitute Tail may be added after polymerization.

In yet another aspect of the present disclosure, it is preferable that the HOMO-LUMO gap is no less than 4 eV. In still another aspect of the present disclosure, it is even more preferable that the HOMO-LUMO gap is no less than 5 eV. The ionic functional group Q comprises one or more ionic liquid ions from the class of ionic compounds that are used in ionic liquids, zwitterions, or polymeric acids. The energy of interaction between Q group ions on discrete P$_2$ structural units may be less than kT, where k is Boltzmann constant and T is the temperature of environment. The temperature of environment may be in range between −60° C. of and 150° C. The preferable range of temperatures is between −40° C. and 100° C. Energy interaction of the ions depends on the effective radius of ions. Therefore, by increasing the steric hindrance between ions it is possible to reduce energy of interaction of ions. In one embodiment of the present invention, at least one ionic liquid ion is selected from the list comprising [NR$_4$]$^+$, [PR$_4$]$^+$ as cation and [—CO$_2$]$^-$, [—SO$_3$]$^-$, [—SR$_5$]$^-$, [—PO$_3$R]$^-$, [—PR$_5$]$^-$ as anion, wherein R is selected from the list comprising H, alkyl, and fluorine. The functional group Q may be charged after or before polymerization. In another embodiment of the present invention, the linker group L is oligomer selected from structures 42 to 47 as given in Table 4.

TABLE 4

| Examples of the oligomer linker group | |
|---|---|
| 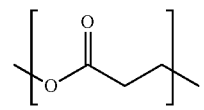 | 42 |
| 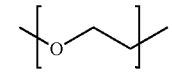 | 43 |
| 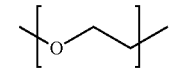 | 44 |
| 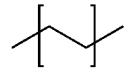 | 45 |
| 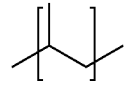 | 46 |

TABLE 4-continued

Examples of the oligomer linker group

In yet another embodiment of the present invention, the linker group L is selected from structures 48 to 57 as given in Table 5.

TABLE 5

Examples of the linker group 48, 49, 50, 51, 52, 53, 54, 55, 56, 57

In yet another embodiment of the present invention, the linker group L may be selected from the list comprising $CH_2$, $CF_2$, $SiR_2O$, and CH2CH2O, wherein R is selected from the list comprising H, alkyl, and fluorine. The ionic functional group Q and the linker groups L may be added after polymerization.

In another aspect, the present disclosure provides a dielectric material (sometimes called a metadielectric) comprising of one or more of the class of Furuta polymers comprising protected or hindered ions of zwitterion, cation, anion, or polymeric acid types described hereinabove. The metadielectric material may be a mixture of zwitterion type Furuta polymers, or positively charged (cation) Furuta polymers and negatively charged (anion) Furuta polymers, polymeric acid Furuta polymers, or any combination thereof. The mixture of Furuta polymers may form or be induced to form supra-structures via hydrophobic and ionic interactions. By way of example, but not limiting in scope, the cation on a positively charged Furuta polymer replaces the B counter ions of the anion on a negatively charged Furuta polymer parallel to the positively charged Furuta polymer and vice versa; and the resistive Tails of neighboring Furuta polymers further encourages stacking via van der Waals forces, which increases ionic group isolation. Metadielectrics comprising both cationic and anionic Furuta polymers have a 1:1 ratio of cationic and anionic Furuta polymers.

The Tails of hydrocarbon (saturated and/or unsaturated), fluorocarbon, siloxane, and/or polyethylene glycol linear or branched act to insulate linked/tethered/partially immobilized polarizable ionic liquids, zwitterions, or polymeric acids (ionic Q groups). The Tails insulate the ionic Q groups from other ionic Q groups on the same or parallel Furuta polymer via steric hindrance of the ionic Q groups' energy of interaction, which favorably allows discrete polarization of the ionic Q groups (i.e. polarization of cationic liquid and anionic liquid tethered/partially immobilized to parallel Furuta polymers). Further, the Tails insulate the ionic groups of supra-structures from each other. Parallel Furuta polymers may arrange or be arranged such that counter ionic liquids (i.e. tethered/partially immobilized ionic liquids (Qs) of cation and anion types) are aligned opposite from one another (sometimes known as cationic Furuta polymers and anionic Furuta polymers).

The Furuta polymers have hyperelectronic or ionic type polarizability. "Hyperelectronic polarization may be considered due to the pliant interaction of charge pairs of excitons, localized temporarily on long, highly polarizable molecules, with an external electric field (Roger D. Hartman and Herbert A. Pohl, "Hyper-electronic Polarization in Macromolecular Solids", Journal of Polymer Science: Part A-1 Vol. 6, pp. 1135-1152 (1968))." Ionic type polarization can be achieved by limited mobility of ionic parts of the tethered/partially immobilized ionic liquid or zwitterion (Q). Additionally, other mechanisms of polarization such as dipole polarization and monomers and polymers possessing metal conductivity may be used independently or in combination with hyper-electronic and ionic polarization in aspects of the present disclosure.

Further, a metadielectric layer may be comprised of one or more types of zwitterion Furuta polymer and/or selected from the anionic $Q^l$ group types and cationic $Q^-$ group types and/or polymeric acids, having the general configuration of Furuta polymers:

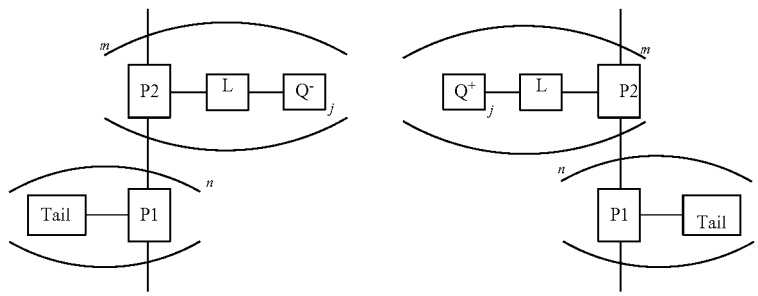

In order that the invention may be more readily understood, reference is made to the following examples of synthesis of Furuta co-polymers, which are intended to be illustrative of the invention, but are not intended to be limiting the scope.

Example 3

Carboxylic acid co-polymer P002. To a solution of 1.02 g (11.81 mmol) of methacrylic acid and 4.00 g (11.81 mmol) of stearylmethacrylate in 2.0 g isopropanol was added a solution of 0.030 g 2,2'-azobis(2-methylpropionitrile) (AIBN) in 5.0 g of toluene. The resulting solution was heated to 80° C. for 20 hours in a sealed vial, after which it became noticeably viscous. NMR shows <2% remaining monomer. The solution was used without further purification in film formulations and other mixtures.

Example 4

Amine co-polymer P011. To a solution of 2.52 g (11.79 mmol) of 2-(diisopropylamino)ethyl methacrylate and 3.00 g (11.79 mmol) of laurylmethacrylate in 2.0 g toluene was added a solution of 0.030 g 2,2'-azobis(2-methylpropionitrile) (AIBN) in 4.0 g of toluene. The resulting solution was heated to 80° C. for 20 hours in a sealed vial, after which it became noticeably viscous. NMR shows <2% remaining monomer. The solution was used without further purification in film formulations and other mixtures.

Example 5

Carboxylic acid co-polymer and amine co-polymer mixture. 1.50 g of a 42 wt % by solids solution of P002 was added to 1.24 g of a 56 wt % solution of P011 with 1 g of isopropanol and mixed at 40° C. for 30 minutes. The solution was used without further purification.

A para-Furuta polymer has repeat units of the following general structural formula:

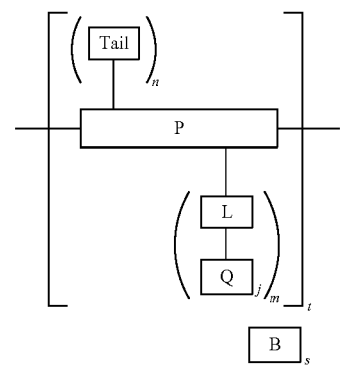

wherein a structural unit P comprises a backbone of the copolymer, which is independently selected from the list comprising acrylic acid, methacrylate, repeat units for polypropylene (PP) (—[$CH_2$—$CH(CH_3)$]—), repeat units for polyethylene (PE) (—[$CH_2$]—), siloxane, or repeat units of polyethylene terephthalate (sometimes written poly(ethylene terephthalate)) for which the repeat unit may be expressed as —$CH_2$—$CH_2$—O—CO—$C_6H_4$—CO—O—. Wherein the first type of repeat unit (Tail) is a resistive substitute in the form of an oligomer of a polymeric material. The resistive substitute preferably has a HOMO-LUMO gap no less than 2 eV. The parameter n is a number of Tail repeat units on the backbone P structural unit, and is in the range from 3 to 100,000. Further, the second type of repeat units (-L-Q) include an ionic functional group Q which is connected to the structural backbone unit (P) via a linker group L, and m is number of the -L-Q repeat units in the backbone structure which is in the range from 3 to 100,000. Additionally, the ionic functional group Q comprises one or more ionic liquid ions (from the class of ionic compounds that are used in ionic liquids), zwitterions, or polymeric acids. An energy of interaction of the ionic Q groups may be less than kT, where k is Boltzmann constant and T is the temperature of environment. Still further, the parameter t is average of para-Furuta polymer repeat units, ranging from 6 to 200,000. Wherein B's are counter ions which are molecules or oligomers that can supply the opposite charge to balance the charge of the co-polymer, s is the number of the counter ions.

In some implementations, the resistive substitute Tails are independently selected from the list comprising polypropylene (PP), polyethylene terephthalate (PET), polyphenylene sulfide (PPS), polyethylene naphthalate (PEN), polycarbonate (PP), polystyrene (PS), and polytetrafluoroethylene (PTFE). In another embodiment of the organic polymeric compound, the resistive substitutes Tail are independently selected from alkyl, aryl, substituted alkyl, substituted aryl, fluorinated alkyl, chlorinated alkyl, branched and complex alkyl, branched and complex fluorinated alkyl, branched and complex chlorinated alkyl groups, and any combination thereof, and wherein the alkyl group is selected from methyl, ethyl, propyl, butyl, iso-butyl and tert-butyl groups, and the aryl group is selected from phenyl, benzyl and naphthyl groups. The resistive substitute Tail may be added after polymerization. In yet another embodiment of the present disclosure, it is preferable that the HOMO-LUMO gap is no less than 4 eV. In still another embodiment of the present disclosure, it is even more preferable that the HOMO-LUMO gap is no less than 5 eV. The ionic functional group Q comprises one or more ionic liquid ions from the class of ionic compounds that are used in ionic liquids, zwitterions, or polymeric acids. Energy of interaction between Q group ions on discrete P structural units may be less than kT, where k is Boltzmann constant and T is the temperature of environment. The temperature of environment may be in range between −60° C. and 150° C. The preferable range of temperatures is between −40° C. and 100° C. Energy interaction of the ions depends on the effective radius of ions. Therefore, by increasing the steric hindrance between ions it is possible to reduce energy of interaction of ions. In one embodiment of the present invention, at least one ionic liquid ion is selected from the list comprising $[NR_4]^+$, $[PR_4]^+$ as cation and $[-CO_2]^-$, $[-SO_3]^-$, $[-SR_5]^-$, $[-PO_3R]^-$, $[-PR_5]^-$ as anion, wherein R is selected from the list comprising H, alkyl, and fluorine. The functional group Q may be charged after or before polymerization. In another embodiment of the present invention, the linker group L is oligomer selected from structures 42 to 47 as given in Table 3 or structures 48 to 57 in Table 4.

In some implementations, the linker group L is selected from the list comprising $CH_2$, $CF_2$, $SiR_2O$, and $CH_2CH_2O$, wherein R is selected from the list comprising H, alkyl, and fluorine. The ionic functional group Q and the linker groups L may be added after polymerization.

In some implementations, the metadielectric includes one or more of the class of para-Furuta polymers comprising protected or hindered ions of zwitterion, cationic liquid ions, anionic liquid ions, or polymeric acid types described hereinabove. The metadielectric material may be a mixture of zwitterion type para-Furuta polymers, or positively charged (cation) para-Furuta polymers and negatively charged (anion) para-Furuta polymers, polymeric acid para-Furuta polymers, or any combination thereof. The mixture of para-Furuta polymers may form or be induced to form suprastructures via hydrophobic and ionic interactions. By way of example, but not limiting in scope, the cation(s) on a positively charged para-Furuta polymer replaces the B counter ions of the anion(s) on a negatively charged para-Furuta polymer parallel to the positively charged para-Furuta polymer and vice versa; and the resistive Tails of neighboring para-Furuta polymers further encourages stacking via van der Waals forces, which increases ionic group isolation. Metadielectrics comprising both cationic and anionic para-Furuta polymers preferably have a 1:1 ratio of cationic and anionic para-Furuta polymers.

The Tails of hydrocarbon (saturated and/or unsaturated), fluorocarbon, siloxane, and/or polyethylene glycol linear or branched act to insulate linked/tethered/partially immobilized polarizable ionic liquids, zwitterions, or polymeric acids (ionic Q groups). The Tails insulate the ionic Q groups from other ionic Q groups on the same or parallel para-Furuta polymer via steric hindrance of the ionic Q groups' energy of interaction, which favorably allows discrete polarization of the ionic Q groups (i.e. polarization of cationic liquid and anionic liquid tethered/partially immobilized to parallel para-Furuta polymers). Further, the Tails insulate the ionic groups of supra-structures from each other. Parallel para-Furuta polymers may arrange or be arranged such that counter ionic liquids (i.e. tethered/partially immobilized ionic liquids (Qs) of cation and anion types) are aligned opposite from one another (sometimes known as cationic para-Furuta polymers and anionic para-Furuta polymers).

The para-Furuta polymers have hyperelectronic or ionic type polarizability. "Hyperelectronic polarization may be considered due to the pliant interaction of charge pairs of excitons, localized temporarily on long, highly polarizable molecules, with an external electric field[.] (Roger D. Hartman and Herbert A. Pohl, "Hyper-electronic Polarization in Macromolecular Solids", Journal of Polymer Science: Part A-1 Vol. 6, pp. 1135-1152 (1968))." Ionic type polarization can be achieved by limited mobility of ionic parts of the tethered/partially immobilized ionic liquid or zwitterion (Q). Additionally, other mechanisms of polarization such as dipole polarization and monomers and polymers possessing metal conductivity may be used independently or in combination with hyper-electronic and ionic polarization in aspects of the present disclosure.

Further, a metadielectric layer may be comprised of one or more types of zwitterion para-Furuta polymer and/or selected from the anionic Q group types and cationic Q group types and/or polymeric acids, which may have the following general arrangement of para-Furuta polymers:

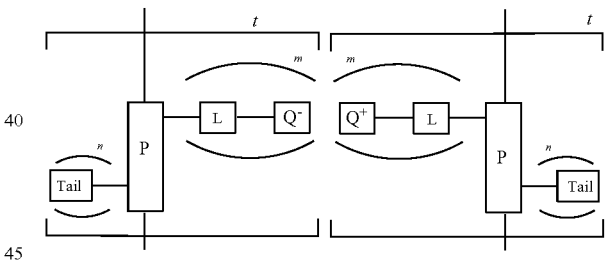

A metadielectric is defined here as a dielectric material comprised of one or more types of structured polymeric materials (SPMs) having a relative permittivity greater than or equal to 1000 and resistivity greater than or equal to $10^{13}$ ohm/cm. Individually, the SPMs in a metadielectric may form column like supramolecular structures by pi-pi interaction or hydrophilic and hydrophobic interactions. Said supramolecules of SPMs may permit formation of crystal structures of the metadielectric material. By way of using SPMs in a dielectric material, polarization units are incorporated to provide the molecular material with high dielectric permeability. There are several mechanisms of polarization such as dipole polarization, ionic polarization, and hyper-electronic polarization of molecules, monomers and polymers possessing metal conductivity. All polarization units with the listed types of polarization may be used in aspects of the present disclosure. Further, SPMs are composite materials which incorporate an envelope of insulating substituent groups that electrically isolate the supramolecules from each other in the dielectric layer and provide high breakdown voltage of the energy storage molecular material. Said insulating substituent groups are hydrocarbon (saturated and/or unsaturated), fluorocarbon, siloxane, and/or polyethylene glycol linear or branched chains covalently bonded to a polarizable core or co-polymer backbone, forming the resistive envelope.

In general, a YanLi polymer is a composite oligomeric material comprised of monomers that have polarizable and insulating components. The monomers may include a polarizable unit having a non-linear polarizable core that includes a conjugated ring system and at least one dopant group. The monomers also include an insulating tail as a side chain on the polarizable unit, on the handle linking a polarizable unit to the monomer backbone, or directly attached to the backbone. In some embodiments, a YanLi polymer may be a co-polymer wherein one monomer unit includes an insulating tail and a second monomer unit includes a polarizable unit having a non-linear polarizable core that includes a conjugated ring system and at least one dopant group. In some embodiments, the polarizable unit may be partially or fully incorporated into the monomer backbone. Additionally, the polarizable unit may be partially or fully incorporated into the monomer backbone.

A metadielectric layer may be a film made from composite polymers referred to herein as YanLi materials. A particular subclass of YanLi materials are referred to herein as YanLi dielectrics, which are materials of one or more YanLi polymers, of one or more YanLi oligomer, or any combination thereof. Such a composite polymeric material is characterized by a chemical structure that includes a repeating backbone unit, a polarizable unit, and a resistive tail. The polarizable unit must possess a high degree of conjugation. Herein, we define "polarizable unit" to mean any multicyclic arrangement where electrons are delocalized over the entire portion of the polarizable unit structure via conjugated single and double bonds. Herein, anisometric is defined as the condition of a molecule possessing charge or partial charge asymmetry along an axis. Possible, non-limiting, forms of this conjugation are polycyclic fused aromatic systems or a conjugated bridge where aromatic systems are connected by alternating single and double bonds.

YanLi materials include composite polymeric materials of the following general formula:

or a hydrocarbon chain, wherein $R^{1a}$, $R^{1b}$, $R^{2a}$, $R^{2b}$, $R^{2c}$, $R^{2d}$, $R^{3a}$, $R^{3b}$, $R^{4a}$, $R^{4b}$, $R^{4c}$, $R^{4d}$, $R^{5a}$, $R^{5b}$, $R^{5c}$, $R^{5d}$ are independently selected from —H, —OH, -Ak, -Ak-$X_j$, —OAk, or —OAk-$X_j$; $L_2$ is a heteroatom bridge in conjugation with the ring system containing $R^{2a}$, $R^{2b}$, $R^{2c}$, $R^{2d}$, $Q^1$, $Q^2$, $Q^3$, $Q^4$, $Q^5$; wherein $R^{2a}$, $R^{2b}$, $R^{2c}$, $R^{2d}$, $Q^1$, $Q^2$, $Q^3$, $Q^4$, $Q^5$ are each independently selected from —H and any electron withdrawing or electron donating group; wherein Ak is alkyl, X is any halogen, n is 0-150, m is 1-300, l is 1-51, o is 0-10, p is 0-1 when o is less than or equal to one and 1 when o is greater than 1, wherein $R^{1a}$ or $R^{1b}$ is an insulating resistive tail or both $R^{1a}$ and $R^{2a}$ are insulating resistive tails.

In some implementations of composite polymeric materials of the above general formula, the value of n may be equal to or greater than 1.

In some implementations of composite polymeric materials of the above general formula, the value of n may be equal to zero. In such implementations, $R^{1a}$, $R^{1b}$, $R^{3a}$ or $R^{3b}$ may possesses at least 7 carbon atoms.

In some implementations of composite polymeric materials of the above general formula, $R^{1a}$, $R^{1b}$, $R^{3a}$, and $R^{3b}$ may be insulating resistive tails are independently selected from the group consisting of saturated hydrocarbon, saturated halogenated hydrocarbon, partially halogenated hydrocarbon, aryl chain, and cycloalkyl, and X—RR'R"; wherein X is selected from C, O, N, and S, and R, R', and R" are independently selected from H and $C_{5-50}$, wherein one or more of R, R', and R" is $C_{5-50}$. As used in the present disclosure, the notation $C_{5-50}$ means a chain of 5 to 50 carbon atoms. In such implementations a chain may be monounsaturated or partially unsaturated, yet the unsaturated bonds are not conjugated. In such implementations all insulating resistive tails may be selected independently from the group consisting of non-aromatic carbocycles and non-aromatic heterocycles.

In some implementations of composite polymeric materials of the above general formula, all insulating resistive tails may be rigid.

In some implementations of composite polymeric materials of the above general formula, $Q_1$, $Q_2$, $Q_3$, $Q_4$ and $Q_5$ may each be independently selected from —$NO_2$, —$NH_3^+$

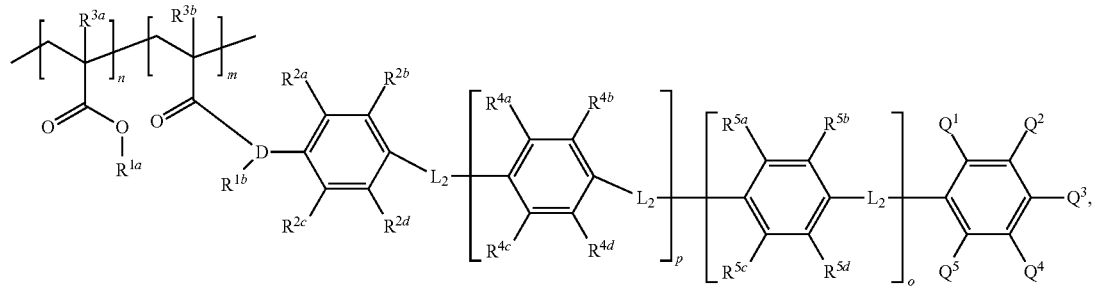

wherein D is

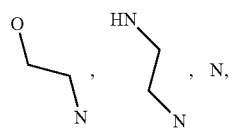

and —NRR'R"+ (quaternary nitrogen salts) with counterion Cl− or Br−, —CHO (aldehyde), —CRO (keto group), —$SO_3H$ (sulfonic acids), —$SO_3R$ (sulfonates), $SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, —$CCl_3$, —CN, —O− (phenoxides) with counter ion Na+ or K+, —$NH_2$, —NHR, —$NR_2$, —OH, OR (ethers), —NHCOR (amides, from amine side), —OCOR (esters, from alcohol side), alkyls, —$C_6H_5$, vinyls, wherein R and R' and R" are radicals selected from the list comprising hydrogen, alkyl (methyl, ethyl, isopropyl, tert-butyl, neopentyl, cyclohexyl etc.), allyl (—CH2-CH═CH2), benzyl (—CH2C6H5) groups, phenyl (+substituted phenyl) and other aryl (aromatic) groups. In some such implementations, one or more of $Q^1$, $Q^2$, $Q^3$, $Q^4$, and $Q^5$ may be —NO$_2$.

In some implementations of composite polymeric materials of the above general formula, D may be a hydrocarbon chain that is interrupted by heteroatoms at the point of backbone attachment and side chain attachment.

In some implementations of composite polymeric materials of the above general formula, $L_2$ may be an azo-bridge or —N═N—, an alkene bridge or —HC═CH—, and alkyne bridge or —C≡C—.

In some implementations of composite polymeric materials of the above general formula, the composite polymeric material may have any of structures 58 to 77 as shown in Table 6 below:

TABLE 6

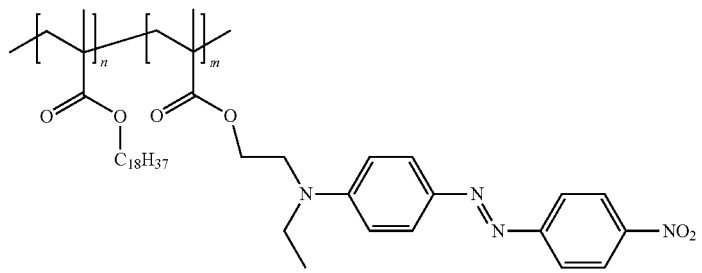

58

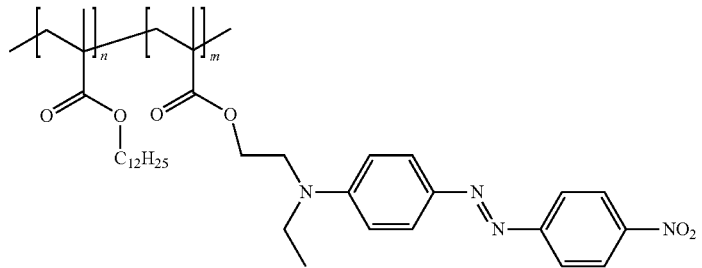

59

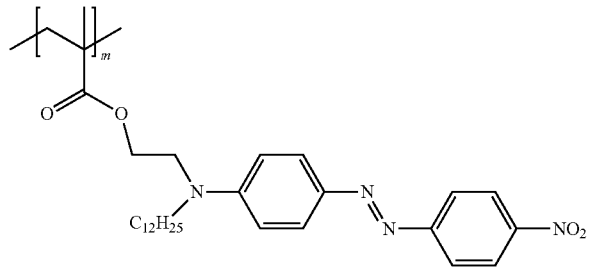

60

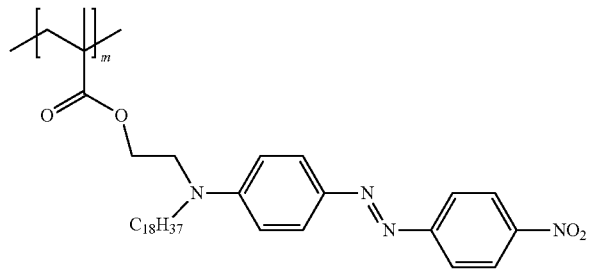

61

TABLE 6-continued
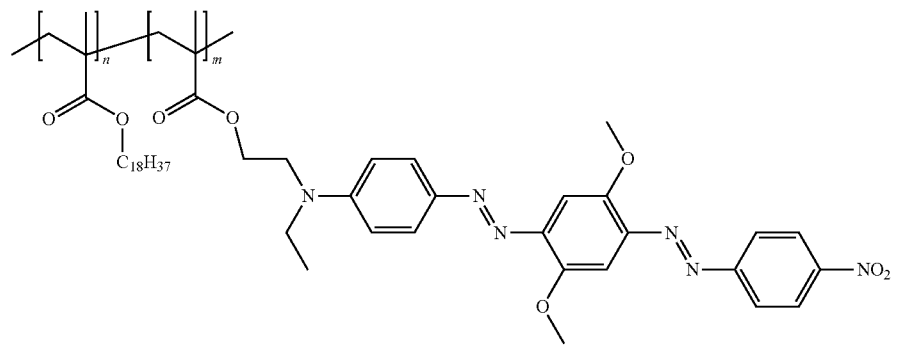
62
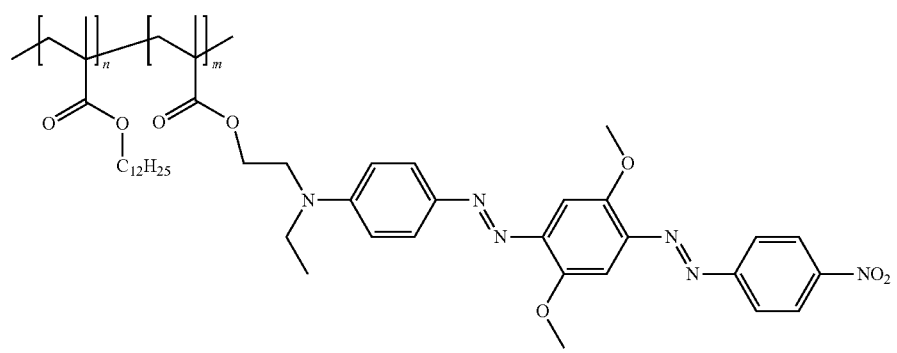
63
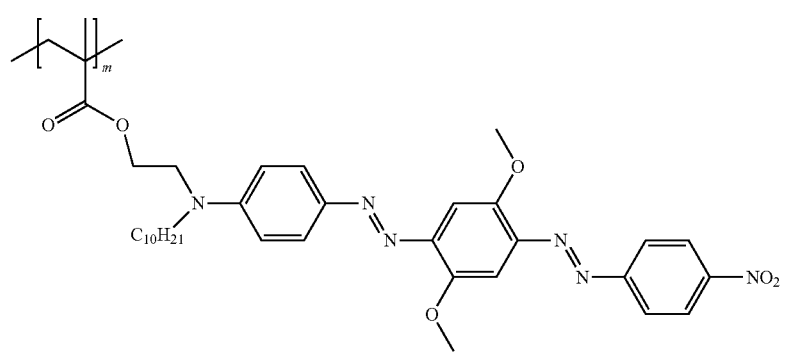
64
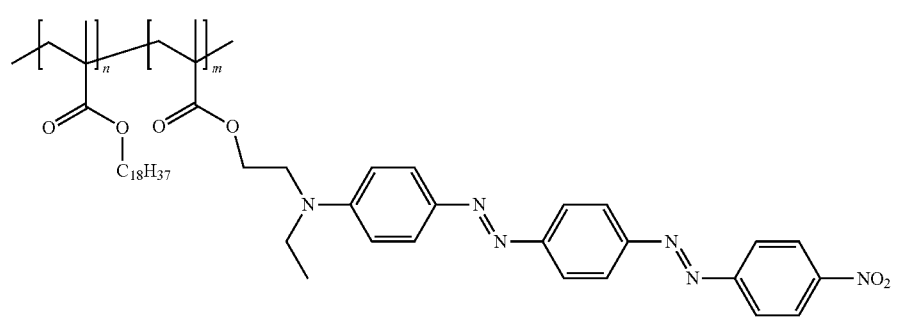
65

TABLE 6-continued
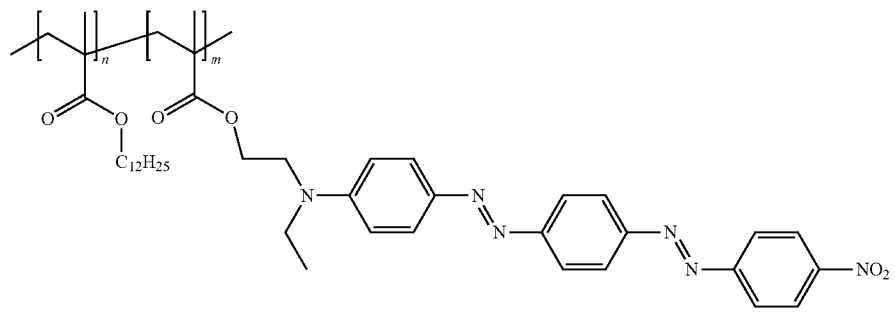
66
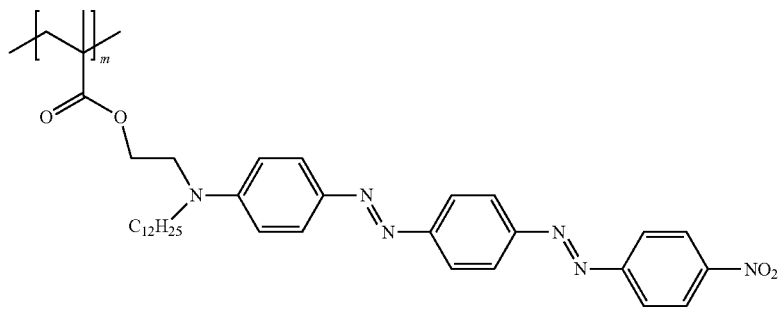
67
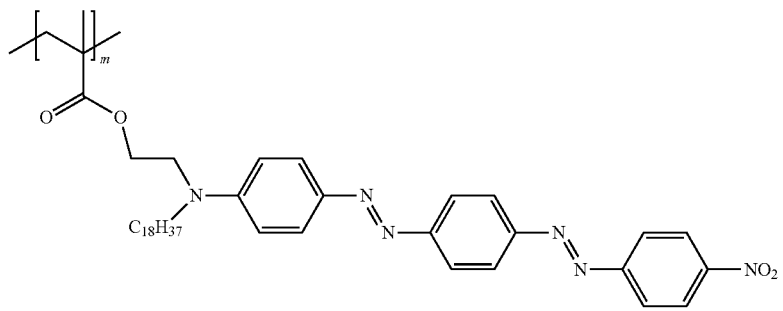
68
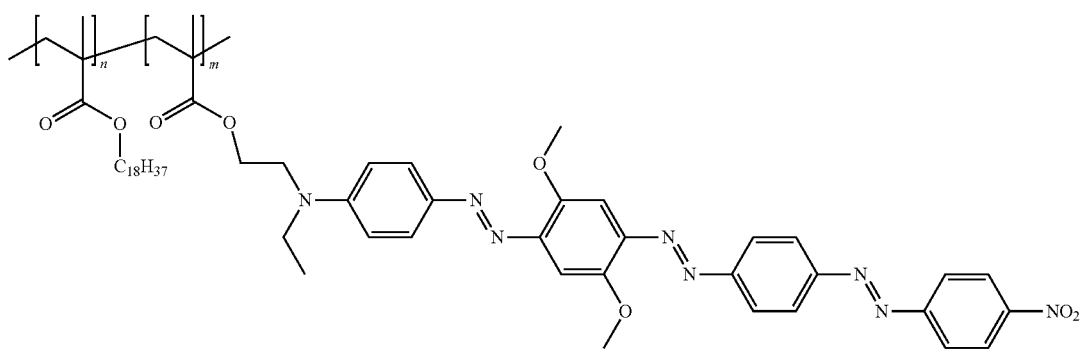
69
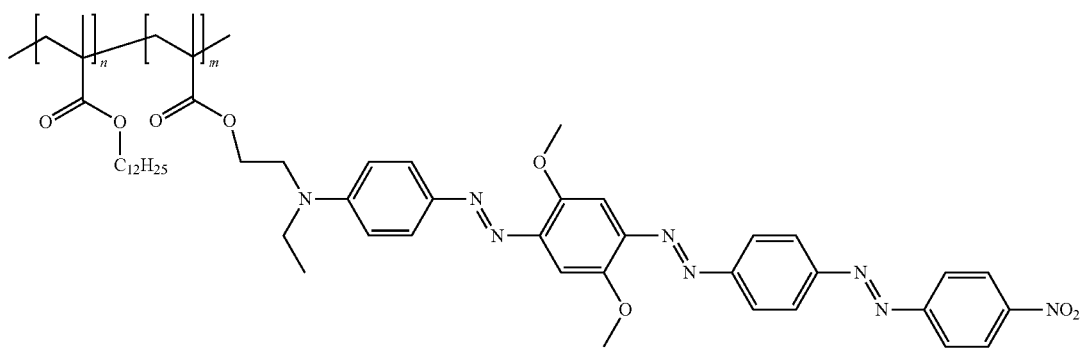
70

TABLE 6-continued
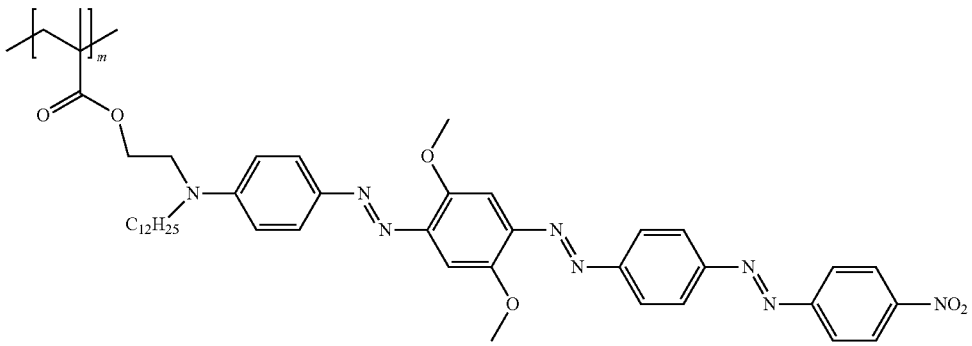
71
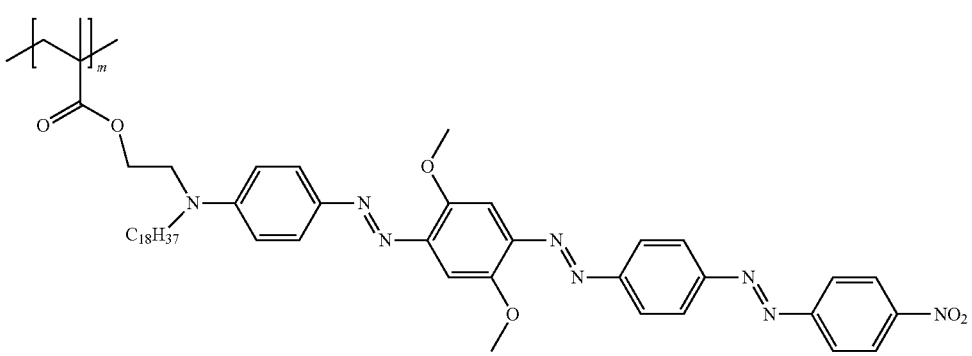
72
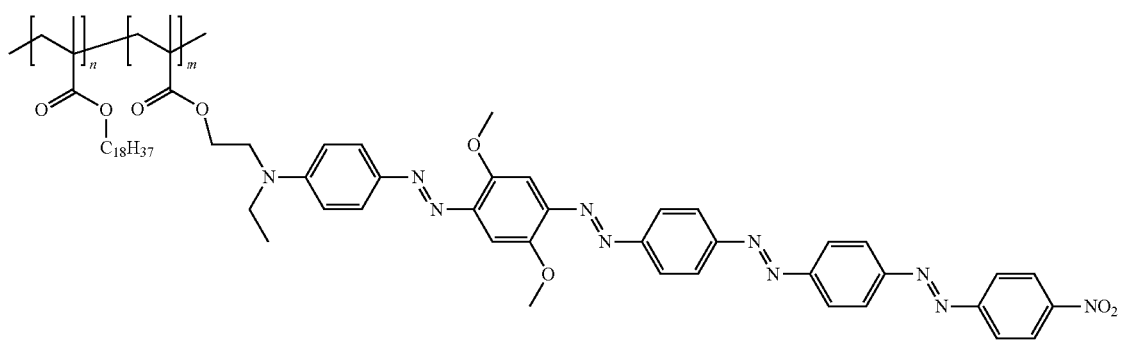
73
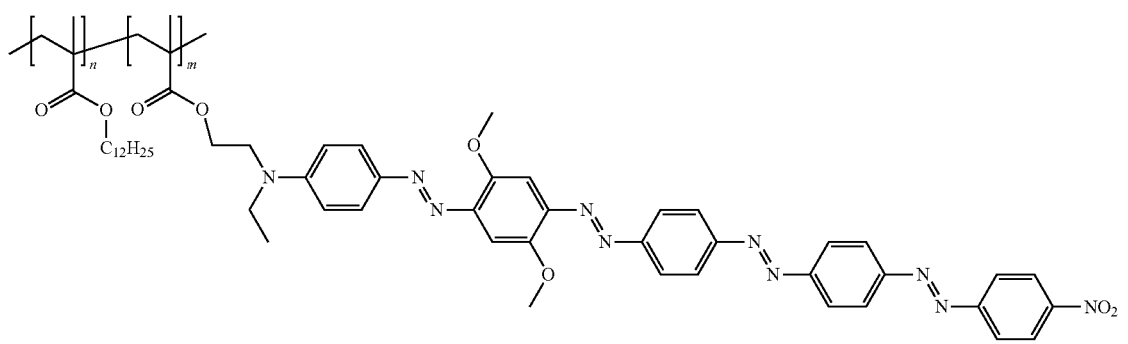
74

TABLE 6-continued
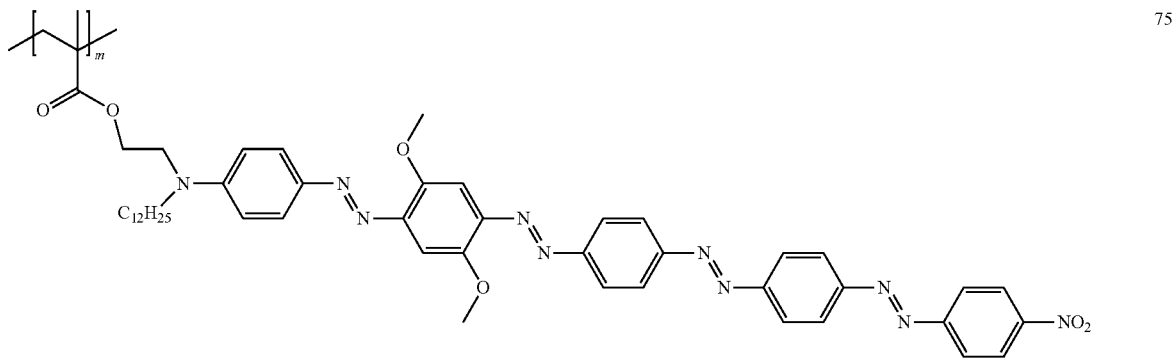
75
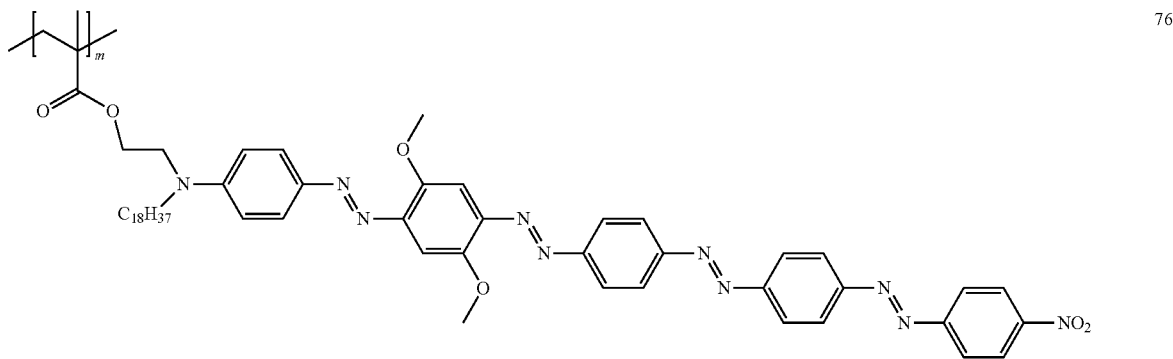
76
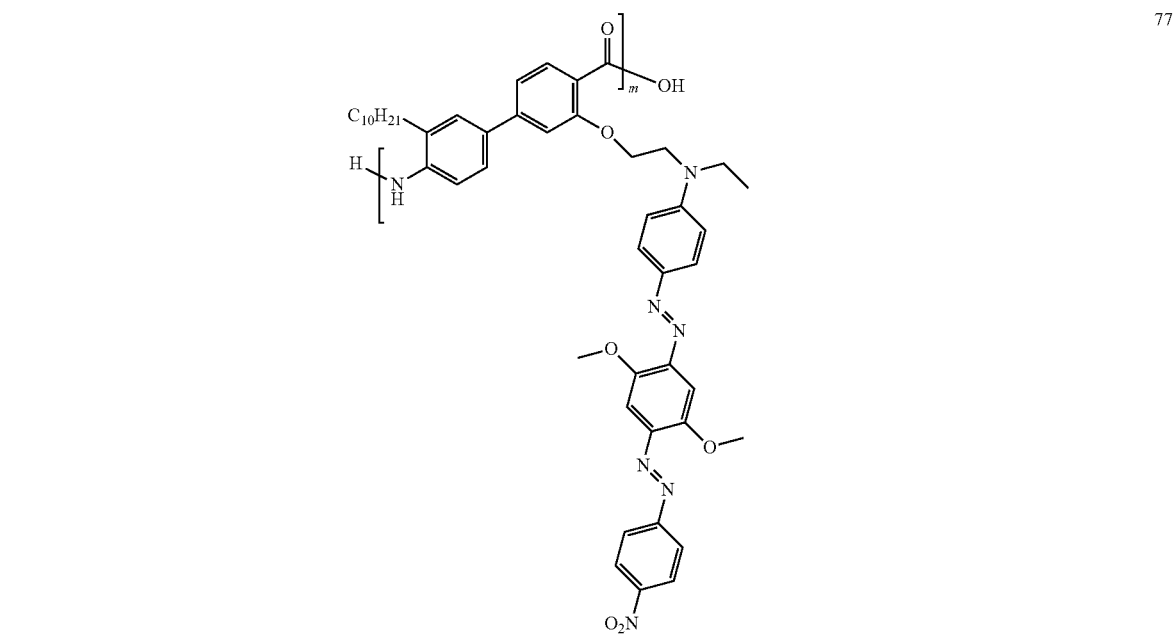
77 wherein n ranges from 0-150 and m ranges from 1-300. Additionally, the repeat units of co-polymer variants repeat randomly, or more-or-less one-to-one in succession.

In addition, aspects of the present disclosure include composite polymeric materials of the following general formula:

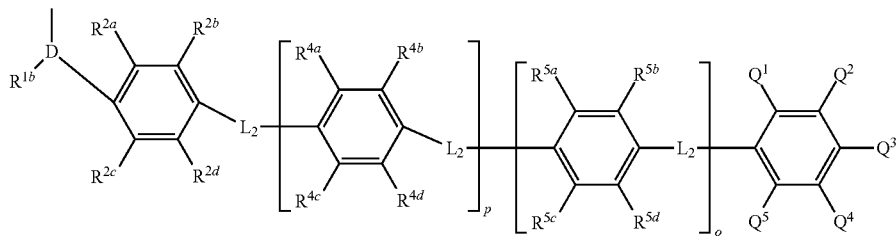

[M1]

In the above general formula [M1] is:

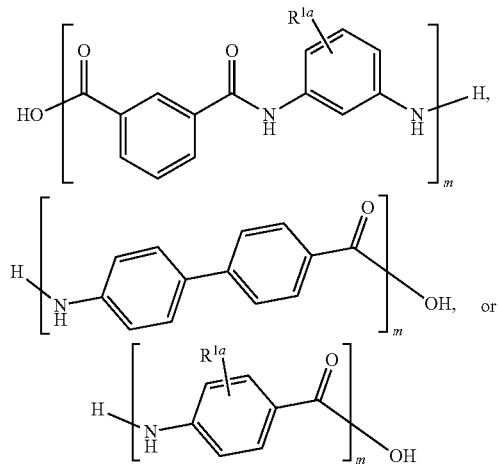

$R^{1a}$, $R^{1b}$, $R^{2a}$, $R^{2b}$, $R^{2c}$, $R^{2d}$, $R^{4a}$, $R^{4b}$, $R^{4c}$, $R^{4d}$, $R^{5a}$, $R^{5b}$, $R^{5c}$, $R^{5d}$ are independently selected from —H, —OH, -Ak, -Ak-$X_l$, —OAk, or —OAk-$X_l$, $L_2$ is a heteroatom bridge in conjugation with the ring system containing $R^{2a}$, $R^{2b}$, $R^{2c}$, $R^{2d}$, $Q^1$, $Q^2$, $Q^3$, $Q^4$, $Q^5$; wherein $R^{2a}$, $R^{2b}$, $R^{2c}$, $R^{2d}$, $Q^1$, $Q^2$, $Q^3$, $Q^4$, $Q^5$ are each independently selected from —H and any electron withdrawing or electron donating group, wherein D is a hydrocarbon chain, wherein Ak is alkyl, X is any halogen, m is 1-300, l is 1-51, o is 0-10, p is 0-1 when o is less than or equal to one and 1 when o is greater than 1, wherein $R^{1a}$ or $R^{1b}$ is an insulating resistive tail or both $R^{1a}$ and $R^{1b}$ are insulating resistive tails.

In some implementations of composite polymeric materials of the above general formula, $R^{1a}$, $R^{1b}$, $R^{3a}$ or $R^{3b}$ may possess at least 7 carbon atoms.

In some implementations of composite polymeric materials of the above general formula, $R^{1a}$, $R^{1b}$, $R^{3a}$, and $R^{3b}$ are insulating resistive tails are independently selected from the group consisting of saturated hydrocarbon, saturated halogenated hydrocarbon, partially halogenated hydrocarbon, aryl chain, and cycloalkyl, and X—RR'R"; wherein X is selected from C, O, N, and S, and R, R', and R" are independently selected from H and $C_{5-50}$, wherein one or more of R, R', and R" is $C_{5-50}$.

In some implementations of composite polymeric materials of the above general formula, the insulating resistive tails may be selected independently from the group consisting of non-aromatic carbocycles and non-aromatic heterocycles.

In some implementations of composite polymeric materials of the above general formula all insulating resistive tails may be rigid.

In some implementations of composite polymeric materials of the above general formula, $Q_1$, $Q_2$, $Q_3$, $Q_4$ and $Q_5$ are each independently selected from —$NO_2$, —$NH_3^+$ and —NRR'R"$^+$ (quaternary nitrogen salts) with counterion Cl$^-$ or Br$^-$, —CHO (aldehyde), —CRO (keto group), —$SO_3H$ (sulfonic acids), —$SO_3R$ (sulfonates), $SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, —$CCl_3$, —CN, —O$^-$ (phenoxides) with counter ion Na$^+$ or K$^+$, —$NH_2$, —NHR, —$NR_2$, —OH, OR (ethers), —NHCOR (amides, from amine side), —OCOR (esters, from alcohol side), alkyls, —$C_6H_5$, vinyls, wherein R and R' and R" are radicals selected from the list comprising hydrogen, alkyl (methyl, ethyl, isopropyl, tert-butyl, neopentyl, cyclohexyl etc.), allyl (—CH2-CH=CH2), benzyl (—CH2C6H5) groups, phenyl (+substituted phenyl) and other aryl (aromatic) groups. In some such implementations, one or more of $Q^1$, $Q^2$, $Q^3$, $Q^4$, and $Q^5$ may be —$NO_2$.

In some implementations of composite polymeric materials of the above general formula, D may be a hydrocarbon chain that is interrupted by heteroatoms at the point of backbone attachment and side chain attachment.

In some implementations of composite polymeric materials of the above general formula, $L_2$ may be an azo-bridge or —N=N—, an alkene bridge or —HC=CH—, and alkyne bridge or —C≡C—.

In some implementations of composite polymeric materials of the above general formula, D may be a hydrocarbon chain interrupted by heteroatoms at the point of backbone attachment and side chain attachment.

In some implementations of composite polymeric materials of the above general formula, $L_2$ may be an azo-bridge or —N=N—, an alkene bridge or —HC=CH—, and alkyne bridge or —C≡C—.

Furthermore, aspects of the present disclosure include composite polymeric materials of the following general formula:

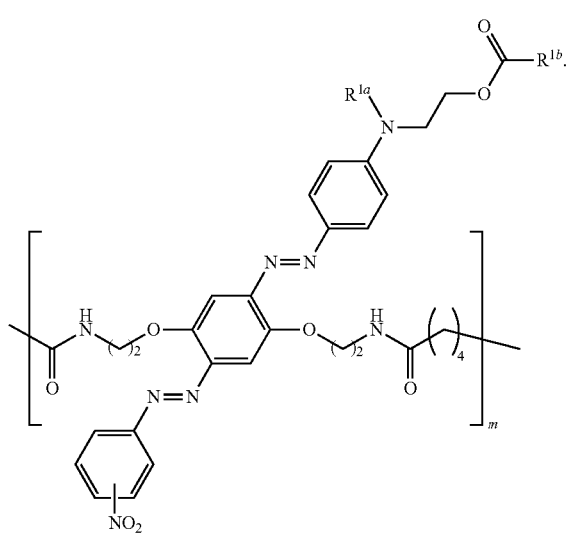

In the foregoing general formula $R^{1a}$ and $R^{1b}$ are independently selected from —H, —OH, -Ak, -Ak-$X_l$, —OAk, and —OAk-$X_l$, Ak is alkyl, X is any halogen, m is 1-300, 1 is 1-51, and wherein $R^{1a}$ or $R^{1b}$ is an insulating resistive tail or wherein $R^{1a}$ and $R^{1b}$ are both insulating resistive tails.

In some implementations of composite polymeric materials of the above general formula, $R^{1a}$ or $R^{1b}$ may possesses at least 7 carbon atoms.

In some implementations of composite polymeric materials of the above general formula, $R^{1a}$ and $R^{1b}$ may be insulating resistive tails are independently selected from the group consisting of saturated hydrocarbon, saturated halogenated hydrocarbon, partially halogenated hydrocarbon, aryl chain, and cycloalkyl, and X—RR'R"; wherein X is selected from C, O, N, and S, and R, R', and R" are independently selected from H and $C_{5-50}$, wherein one or more of R, R', and R" is $C_{5-50}$. In some such implementations, the insulating resistive tails may be selected independently from the group consisting of non-aromatic carbocycles and non-aromatic heterocycles.

In some implementations of composite polymeric materials of the above general formula, all insulating resistive tails may be rigid.

In some implementations of composite polymeric materials of the above general formula, the composite polymeric material may have structure 78 as shown below:

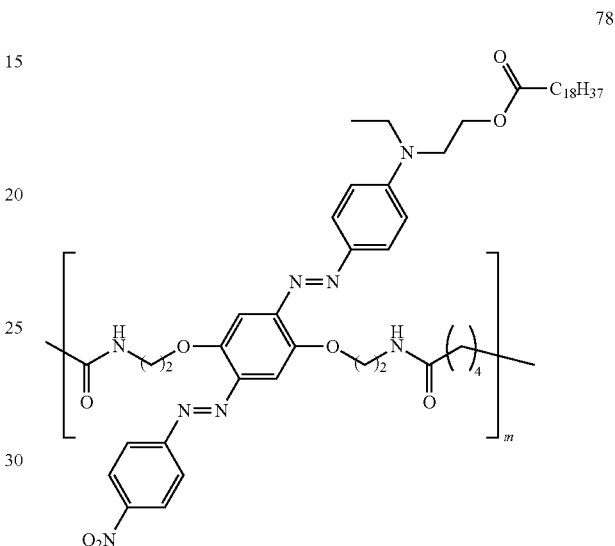

78 wherein m ranges from 1-300.

Additional aspects of the present disclosure include composite polymeric materials of the following general formula:

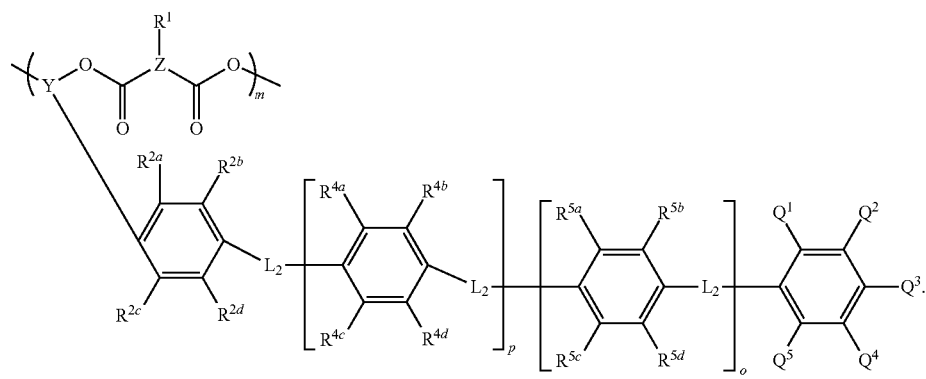

In the foregoing general formula $R^1$, $R^{2a}$, $R^{2b}$, $R^{2c}$, $R^{2d}$, $R^{4a}$, $R^{4b}$, $R^{4c}$, $R^{4d}$, $R^{5a}$, $R^{5b}$, $R^{5c}$, $R^{5d}$ are independently selected from —H, —OH, -Ak, -Ak-$X_j$, —OAk, or —OAk-$X_j$, $L_2$ is a heteroatom bridge in conjugation with the ring system containing $R^{2a}$, $R^{2b}$, $R^{2c}$, $R^{2d}$, $Q^1$, $Q^2$, $Q^3$, $Q^4$, $Q^5$; wherein $R^{2a}$, $R^{2b}$, $R^{2c}$, $R^{2d}$, $Q^1$, $Q^2$, $Q^3$, $Q^4$, $Q^5$ are each independently selected from —H and any electron withdrawing or electron donating group, wherein Ak is alkyl, X is any halogen, wherein o is 0-10, p is 0-1 when o is less than or equal to one and 1 when o is greater than 1, wherein $R^1$ is an insulating resistive tail; wherein Z is substituted or unsubstituted hydrocarbon cyclic or chain linkage, Y is any hydrocarbon chain which may be interrupted by a hetero atom at the point of attachment.

In some implementations of composite polymeric materials of the above general formula, the composite polymeric material may have structure 79 as shown below:

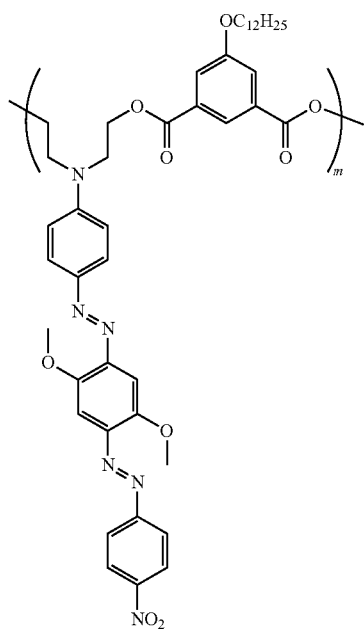

79 wherein m ranges from 1-300.

In some implementations of composite polymeric materials of the above general formula, $R^1$ may possess at least 7 carbon atoms.

In some implementations of composite polymeric materials of the above general formula, $R^1$ may be an insulating resistive tail selected from the group consisting of saturated hydrocarbon, saturated halogenated hydrocarbon, partially halogenated hydrocarbon, aryl chain, and cycloalkyl, and X—RR'R"; wherein X is selected from C, O, N, and S, and R, R', and R" are independently selected from H and $C_{5-50}$, wherein one or more of R, R', and R" is $C_{5-50}$.

In some implementations of composite polymeric materials of the above general formula, $R^1$ may be a rigid insulating resistive tail. In some such implementations, the rigid insulating resistive tail may be selected from the group consisting of non-aromatic carbocycles and non-aromatic heterocycles.

In some implementations of composite polymeric materials of the above general formula, $Q_1$, $Q_2$, $Q_3$, $Q_4$ and $Q_5$ may each be independently selected from —$NO_2$, —$NH_3^+$ and —NRR'R"$^+$ (quaternary nitrogen salts) with counterion $Cl^-$ or $Br^-$, —CHO (aldehyde), —CRO (keto group), —$SO_3H$ (sulfonic acids), —$SO_3R$ (sulfonates), $SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, —$CCl_3$, —CN, —$O^-$ (phenoxides) with counter ion $Na^+$ or $K^+$, —$NH_2$, —NHR, —$NR_2$, —OH, OR (ethers), —NHCOR (amides, from amine side), —OCOR (esters, from alcohol side), alkyls, —$C_6H_5$, vinyls, wherein R and R' and R" are radicals selected from the list comprising hydrogen, alkyl (methyl, ethyl, isopropyl, tert-butyl, neopentyl, cyclohexyl etc.), allyl (—CH2-CH=CH2), benzyl (—CH2C6H5) groups, phenyl (+substituted phenyl) and other aryl (aromatic) groups. In some such implementations, one or more of $Q^1$, $Q^2$, $Q^3$, $Q^4$, and $Q^5$ may be —$NO_2$.

By way of example, and not by way of limitation, according to aspects of the present disclosure, a metadielectric film may include a polymer matrix and at least one material of any of the four general formulae discussed above or any specific implementations mentioned above or discussed further below.

In some embodiments, the metadielectric layer may be comprised of a mixture or YanLi materials selected from at least one YanLi material of the four general formulae discussed above or a mixture of any specific implementations mentioned above.

Alternatively, in some embodiments the metadielectric layer may be comprised of the aforementioned YanLi materials and the aforementioned oligomers, compounds, polymers, monomers or polymers of the backbone units of said YanLi materials, one or more plasticizers (phthalates or non-phthalates), or any combination thereof. Use of non-ionic plasticizers can improve the metadielectric layer's resistivity through smoothing out electric field lines. This phenomenon occurs when the plasticizers fill voids and/or assists in supramolecular alignment. Additionally, plasticizers can improve the material's mechanical properties by reducing brittleness of the material during and post processing.

In one embodiment, the composite polymer comprises more than one type of resistive tails. In another embodiment, the composite polymer comprises more than one type of ordered resistive tails. In yet another embodiment, the composite polymer comprises at least one resistive tail or at least one type of ordered resistive tails.

In order that the invention may be more readily understood, reference is made to the following examples, which are intended to be illustrative of the invention, but are not intended to limit the scope.

In one embodiment, a liquid or solid composite polymer is placed between the first and second electrodes. A solid chromophore is, for example, pressed into a pellet and placed between the first electrode and the second electrode. The chromophore can be ground into a powder before pressing.

In another embodiment, at least one type of YanLi polymer or YanLi oligomer may be dissolved or suspended in a solvent. The resultant material can be spin coated, extruded via slot die, roll-to-roll coated, or pulled and dried to form a dielectric film.

In another embodiment, a composite oligomer may be dissolved or suspended in a polymer. This is termed a "guest-host" system where the oligomer is the guest and the polymer is the host. Polymer hosts include, but are not limited to, poly(methyl methacrylate), polyimides, polycarbonates and poly(ε-caprolactone). These systems are cross-linked or non-cross-linked. In some instances, it may be beneficial to use tailless composite oligomers.

In another embodiment, a composite oligomer may be attached to a polymer. This is termed a "side-chain polymer" system. This system has the advantages over guest-host systems because high composite oligomer concentrations are incorporated into the polymer with high order and regularity and without phase separation or concentration gradients. Side chain polymers include, but are not limited to, poly[4-(2,2-dicyanovinyl)-N-bis(hydroxyethyl)aniline-alt-(4,4'-methylenebis(phenylisocyanate))]urethane, poly[4-(2,2-dicyanovinyl)-N-bis(hydroxyethyl)aniline-alt-(isophoronediisocyanate)]urethane, poly(9H-carbazole-9-ethyl acrylate), poly(9H-carbazole-9-ethyl methacrylate), poly(Disperse Orange 3 acrylamide), poly(Disperse Orange 3 methacrylamide), poly(Disperse Red 1 acrylate), poly(Disperse Red 13 acrylate), poly(Disperse Red 1 methacrylate), poly(Disperse Red 13 methacrylate), poly[(Disperse Red 19)-alt-(1,4-diphenylmethane urethane)], poly(Disperse Red 19-p-phenylene diacrylate), poly(Disperse Yellow 7 acrylate), poly(Disperse Yellow 7 methacrylate), poly[(methyl methacrylate)-co-(9-H-carbazole-9-ethyl acrylate)], poly[(methyl methacrylate)-co-(9-H-carbazole-9-ethyl methacrylate)], poly[methyl methacrylate-co-(Disperse Orange 3 acrylamide)], poly[methyl methacrylate-co-(Disperse Orange 3 methacrylamide)], poly[(methyl methacrylate)-co-(Disperse Red 1 acrylate)], poly[(methyl methacrylate)-co-(Disperse Red 1 methacrylate)], poly[(methyl methacrylate)-co-(Disperse Red 13 acrylate)], poly[(methyl methacrylate)-co-(Disperse Red 13 methacrylate)], poly[methyl methacrylate-co-(Disperse Yellow 7 acrylate)], poly[methyl methacrylate-co-(Disperse Yellow 7 methacrylate)], poly [[(S)-1-(4-nitrophenyl)-2-pyrrolidinemethyl]acrylate], poly[((S)-(–)-1-(4-nitrophenyl)-2-pyrrolidinemethyl)acrylate-co-methyl methacrylate], poly [[(S)-1-(4-nitrophenyl)-2-pyrrolidinemethyl]methacrylate] and poly[((S)-(–)-1-(4-nitrophenyl)-2-pyrrolidinemethyl)methacrylate-co-methyl methacrylate]. These systems are cross-linked or non-cross-linked.

In another embodiment, composite oligomers may be embedded in matrices such as oxides, halides, salts and organic glasses. An example of a matrix is inorganic glasses comprising the oxides of aluminum, boron, silicon, titanium, vanadium and zirconium.

According to aspects of the present disclosure, the polymers that make up a YanLi dielectric may be aligned, partially aligned or unaligned. The composite polymer is preferably aligned for optimal geometric configuration of polarizing units as this results in higher capacitance values in the capacitor. One method of alignment is to apply a DC electric field to the composite polymer at a temperature at which the polarizable units can be oriented. This method is termed "poling." Poling is generally performed near the glass transition temperature of polymeric and glassy systems. One possible method of poling is corona poling. Other methods of alignment could be roll-to-roll, Meyer bar, dip, slot die, and air knife coating of solutions and liquid crystal solutions of said side-chain polymers or composite oligomers.

In some instances, the side-chain polymer or composite oligomers may form liquid crystals in solution or solvent and with or without external influence. Non-limiting examples of liquid crystals include lyotropic and thermotropic liquid crystals. Non-limiting examples of external influences include heat, electric field, mechanical disturbances (e.g. vibration or sonication), and electromagnetic radiation. Said liquid crystals are supramolecular structures comprised of said side-chain polymers or composite oligomer in solution or solvent and are ordered and aligned or partially ordered or partially aligned. Such liquid crystal materials may be coated onto a substrate, e.g., by roll-to-roll, Meyer bar, dip, slot die, or air knife coating in a process that includes mechanical ordering of the liquid crystals, and drying of the liquid crystal solution or evaporation of the solvent such that the liquid crystals form a crystalline or semi-crystalline layer or film of metadielectric material. Alternatively, such liquid crystal materials may be extruded as a film such that the liquid crystals form a crystalline or semi-crystalline film of metadielectric material. In some instances, extrusion of such liquid crystal materials may be coextruded as a multilayer film Such multilayer films may include alternating layers of conducting layers and insulating layers, wherein the insulating layers may be the aforementioned crystalline or semi-crystalline layer of metadielectric material.

Preferred polymer embodiments are polyester, polyalkylacrylate (preferably methacrylic and acrylic), polyamide, and polyaramid. This resistive tail may be attached to the polarizable side chain or may be its own independent side chain interspersed in any pattern or random assortment with the polarizable side chains or a mixture thereof. These species can be represented by one of the following formula.

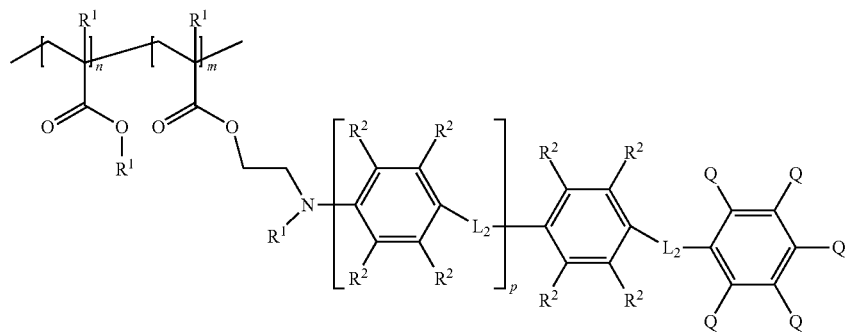

-continued
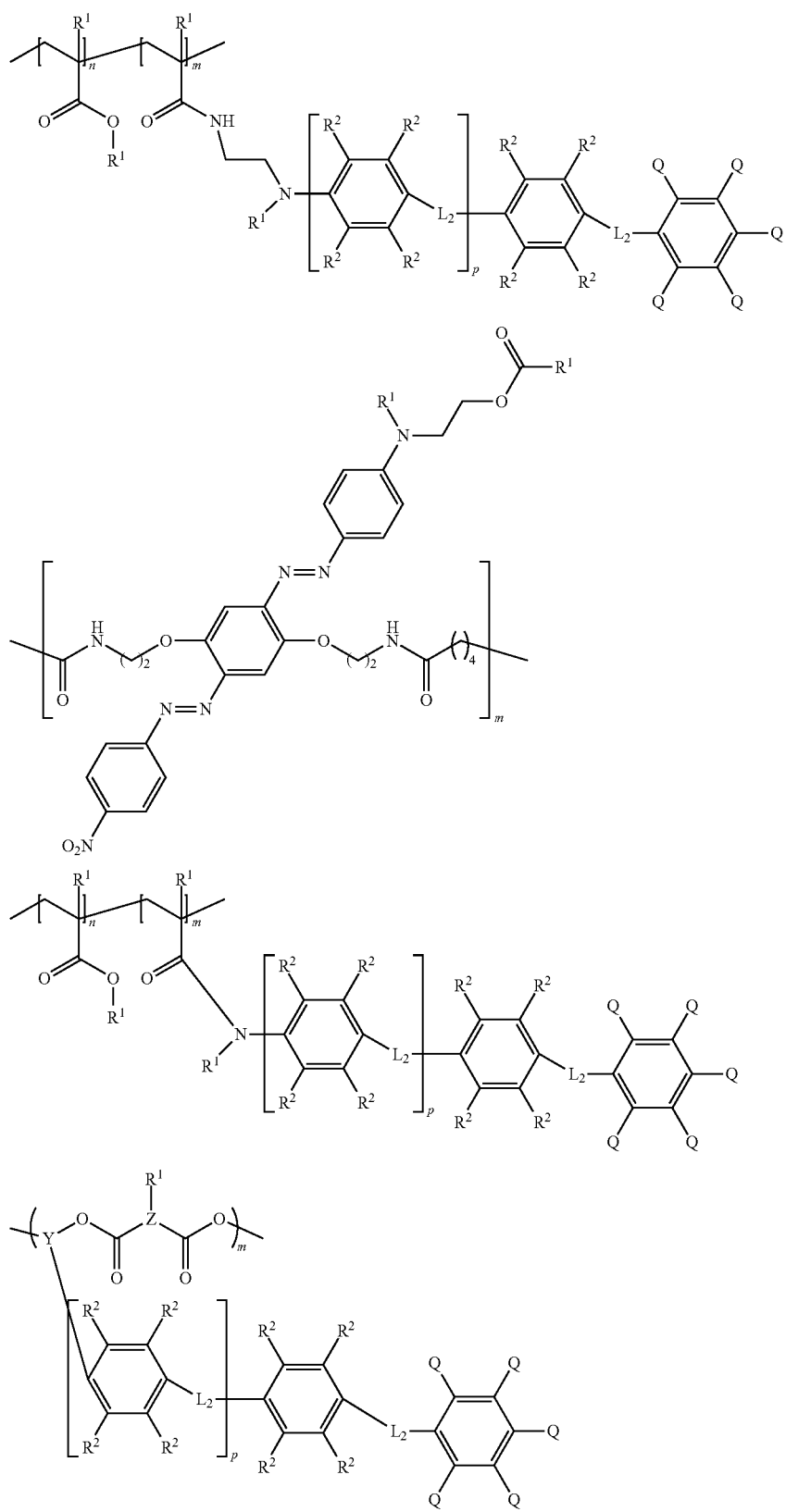

-continued

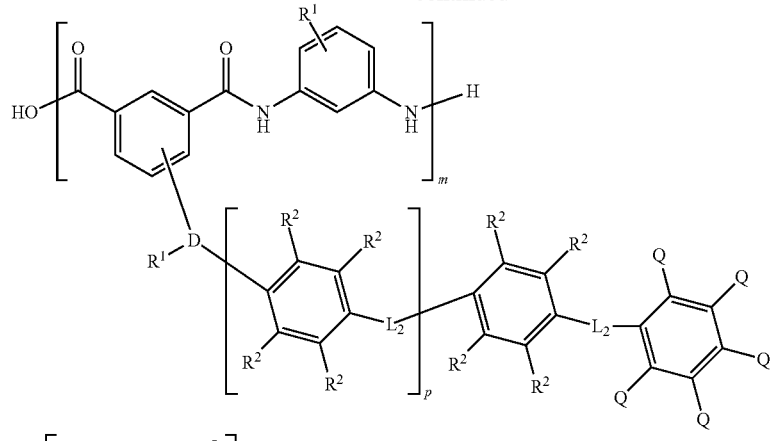

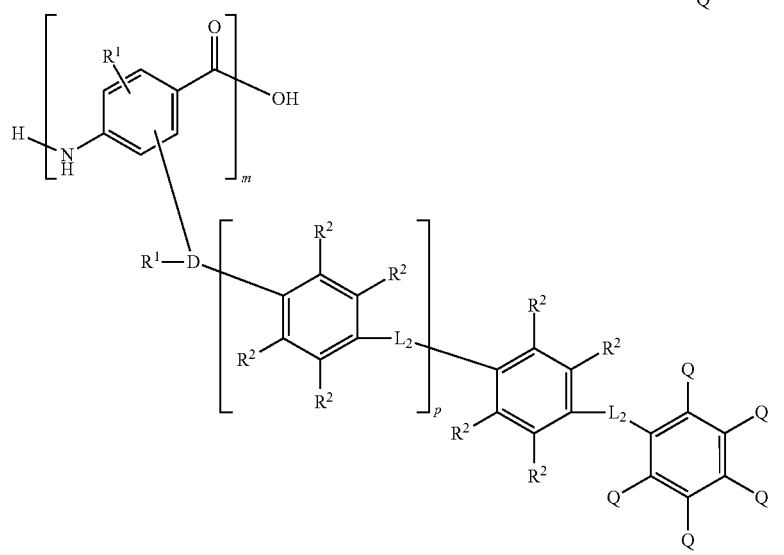

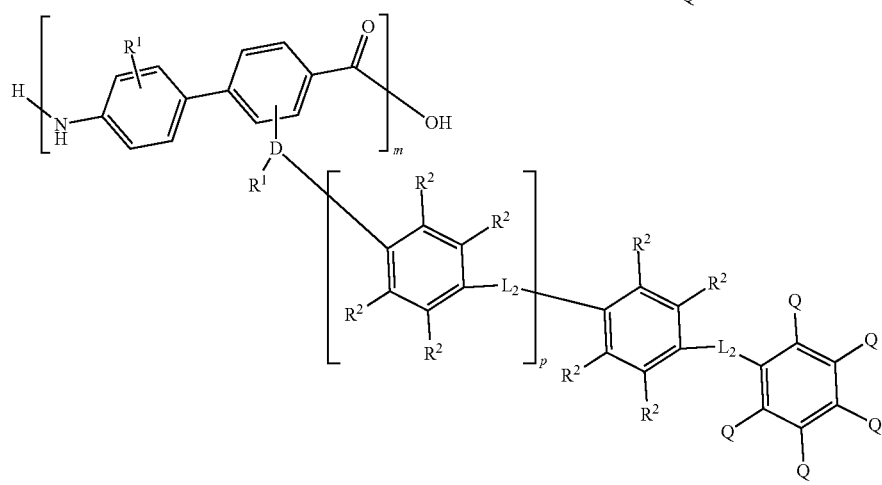

Wherein, each instance of $R^1$ is independently selected from —H, —OH, -Ak, alkoxy, —OAk-$X_o$, or -Ak-$X_o$, each instance of $R^2$ is independently selected from —H, —OH, —OAk, or —OAk-$X_o$, D is any hydrocarbon chain which may be interrupted by hetero atoms at the point of backbone attachment and side chain attachment, $L_2$ is a heteroatom bridge in conjugation with the ring system of the side chain (e.g. azo-bridge, alkene bridge, and alkyne bridge), each instance of Q is independently selected from any electron donating or electron withdrawing group or H, Z is substituted or unsubstituted hydrocarbon cyclic or chain linkage, Y is any hydrocarbon chain which may be interrupted by a hetero atom at the point of attachment to the side chain, Ak is alkyl, X is any halogen, n is 0-150, m is 1-300, o is 1-51, p is 0-10, q is 0-4, and r is 0-4, with the provisio that at least one instance of $R^1$ must be a resistive tail. Preferred, but not limiting, embodiments of resistive tails include hydrocarbon and halohydrocarbon chains, non-aromatic hydrocarbocycles, and non-aromatic heterocycles. In some embodiments, it may be preferable for the resistive tails to be ridged. In such embodiments, rigid resistive tails maybe non-aromatic carbocycles or non-aromatic heterocycles.

The conjugated aromatic ring system may be made further polarizable by adding a variety of functional groups to various cyclic positions of the structure. Incorporating electron donors and electron acceptors is one way to enhance the polarizability. Electrophilic groups (electron acceptors) are selected from —$NO_2$, —$NH_3^-$ and —$NR_3^+$ (quaternary nitrogen salts), counterion $Cl^-$ or $Br^-$, —CHO (aldehyde), —CRO (keto group), —$SO_3H$ (sulfonic acids), —$SO_3R$ (sulfonates), $SO_2NH_2$ (sulfonamides), —COOH (carboxylic acid), —COOR (esters, from carboxylic acid side), —COCl (carboxylic acid chlorides), —$CONH_2$ (amides, from carboxylic acid side), —$CF_3$, —$CCl_3$, —CN, wherein R is radical selected from the list comprising alkyl (methyl, ethyl, isopropyl, tert-butyl, neopentyl, cyclohexyl etc.), allyl (—$CH_2$—CH=$CH_2$), benzyl (—$CH_2C_6H_5$) groups, phenyl (+substituted phenyl) and other aryl (aromatic) groups. Nucleophilic groups (electron donors) are selected from —$O^-$ (phenoxides, like —ONa or —OK), —$NH_2$, —NHR, —$NR_2$, —NRR', —OH, OR (ethers), —NHCOR (amides, from amine side), —OCOR (esters, from alcohol side), alkyls, —$C_6H_5$, vinyls, wherein R and R' are radicals independently selected from the list comprising alkyl (methyl, ethyl, isopropyl, tert-butyl, neopentyl, cyclohexyl etc.), allyl (—CH2-CH=CH2), benzyl (—CH2C6H5) groups, phenyl (+substituted phenyl) and other aryl (aromatic) groups. Preferred electron donors include, but are not limited to, amino and phosphino groups and combinations thereof. Preferred electron acceptors include, but are not limited to, nitro, carbonyl, oxo, thioxo, sulfonyl, malononitrile, isoxazolone, cyano, dicyano, tricyano, tetracycano, nitrile, dicarbonitrile, tricarbonitrile, thioxodihydropyrimidinedione groups and combinations thereof. More conjugated bridges include, but are not limited to, 1,2-diphenylethene, 1,2-diphenyldiazene, styrene, hexa-1,3,5-trienylbenzene and 1,4-di(thiophen-2-yl)buta-1,3-diene, alkenes, dienes, trienes, polyenes, diazenes and combinations thereof.

Existence of the electrophilic groups (acceptors) and the nucleophilic groups (donors) in the aromatic polycyclic conjugated molecule promotes increase of electronic polarizability of these molecules. Under the influence of external electric field electrons are displaced across the polarizable unit to compensate the electric field. The nucleophilic groups (donors) and the electrophilic groups (acceptors) add to the electron density of the polarizable unit, which increases polarizability of such molecules and ability to form compensating electric field counter in the presence of an electric field. Thus a distribution of electronic density in the molecules is non-uniform. The presence of the polarizable units leads to increasing of polarization ability of the disclosed material because of electronic conductivity of the polarizable units.

Increasing the number of phenyl rings 'p' can increase the linear polarizability ($\alpha$) and the nonlinear polarizability ($\beta$) of the conjugated side chain, as seen in the graphs '$\alpha$ vs p' (depicted in FIG. 4A) and '$\beta$ vs p' (depicted in FIG. 4B), and corresponding Table 1 below, which lists comparative values of $\alpha$ and $\beta$ for chromophores having different numbers of phenyl rings. However, increasing the number of conjugated aromatic rings reduces the side chains solubility. Addition of alkoxy groups to at least one of the side chain rings can improve solubility of the choromophores while maintaining high non-linear polarization or slightly improving it. One preferential embodiment is placement of two methoxy groups on a ring that is separated by one conjugated bridge and ring from an electron donating group.

TABLE 7

Impact of number of rings on polarizability

| p | $\alpha$ | $\beta$ |
|---|---|---|
| 2 | 427 | 16067 |
| 3 | 900 | 71292 |
| 4 | 1343 | 121801 |
| 5 | 1699 | 148208 |
| 6 | 2103 | 161156 |

Ionic groups may increase polarization of the disclosed YanLi material when zwitterionic groups are covalently attached to YanLi polymer sidechains. The polarizable units can be nonlinearly polarizable and may be comprised of an aromatic polycyclic conjugated molecule with at least one dopant group, the polarizable units and are placed into a resistive dielectric envelope formed by resistive substituents. In some instances, the resistive substituents provide solubility of the organic compound in a solvent and act to electrically insulate supramolecular structures comprised of YanLi polymers from neighboring supramolecular structures of YanLi polymers. Additionally, said resistive substituents may act to electrically insulate intra-polymer side chains from one another. A non-centrosymmetric arrangement of the dopant group(s) can lead to a strong nonlinear response of the compound's electronic polarization in the presence of an electric field. Additionally, an anisometric molecule or polarizing unit can lead to a strong nonlinear response of the compound's electronic polarization in the presence of an electric field. Resistive substituents (e.g. resistive tails described above) increase the electric strength of these polarizable compounds and breakdown voltage of the dielectric layers made on their basis.

Specific, but non-limiting embodiments are shown in the following table, wherein co-polymer variants are preferentially alternating more or less one-to-one, or more-or-less randomly. Di-block co-polymer embodiments being less preferential to alternating monomers one-to-one and random or near random arrangements.

TABLE 8
Examples of YanLi Polymers
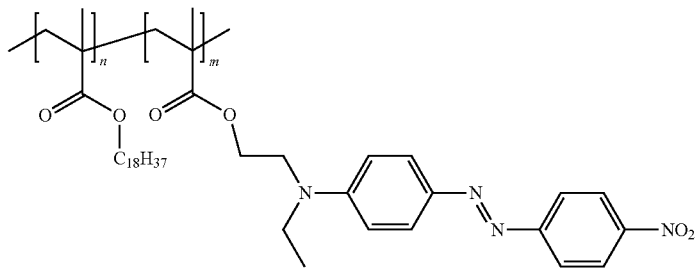
80
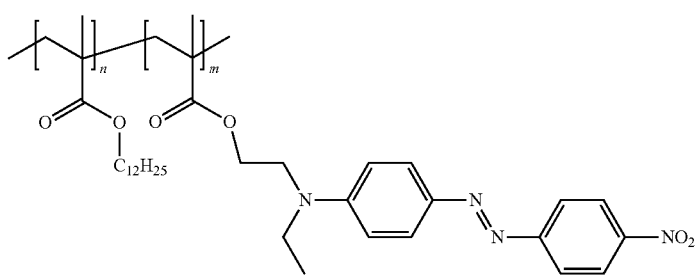
81
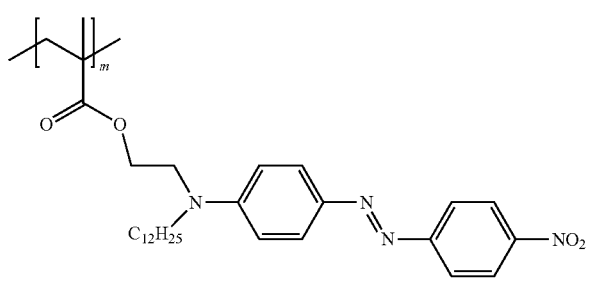
82
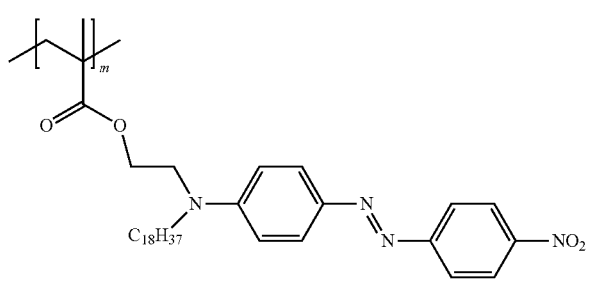
83
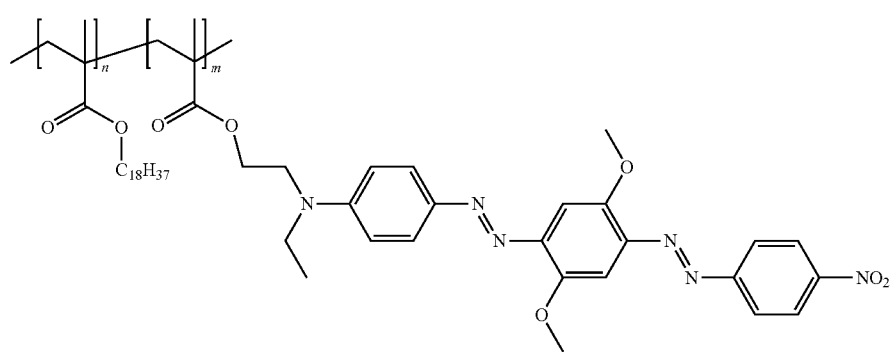
84

TABLE 8-continued
Examples of YanLi Polymers
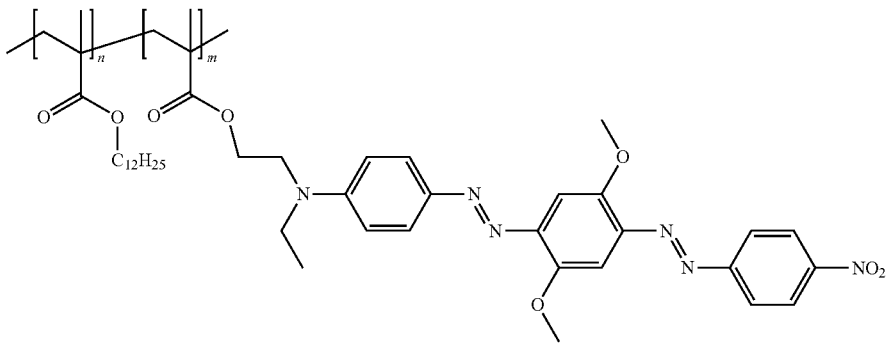
85
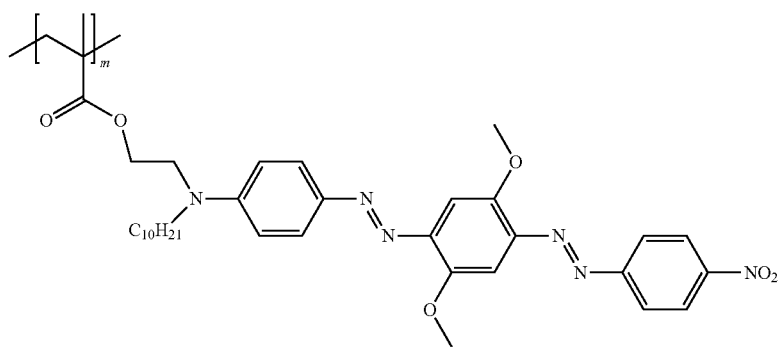
86
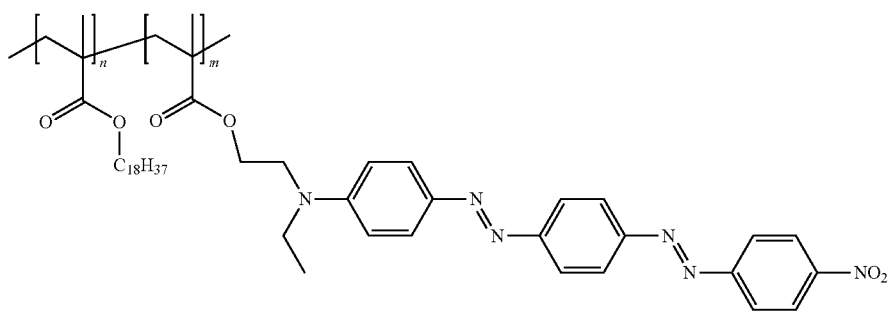
87
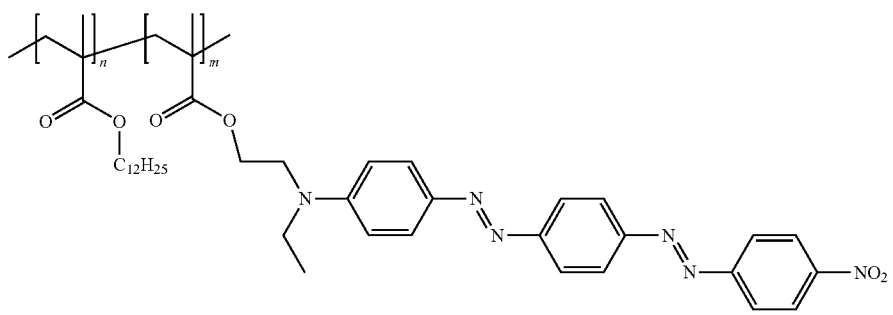
88

TABLE 8-continued
Examples of YanLi Polymers
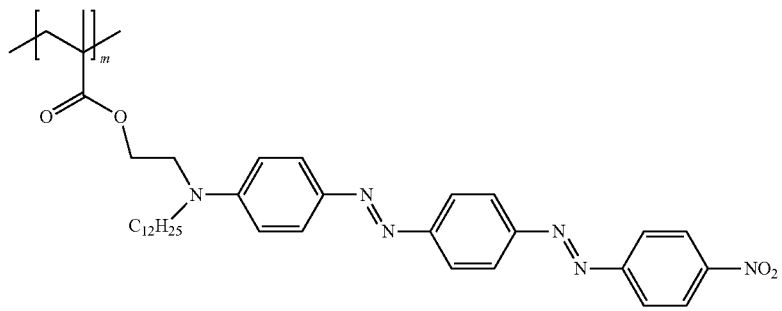
89
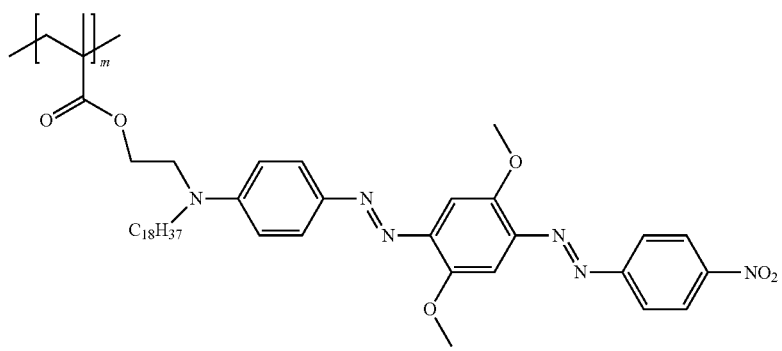
90
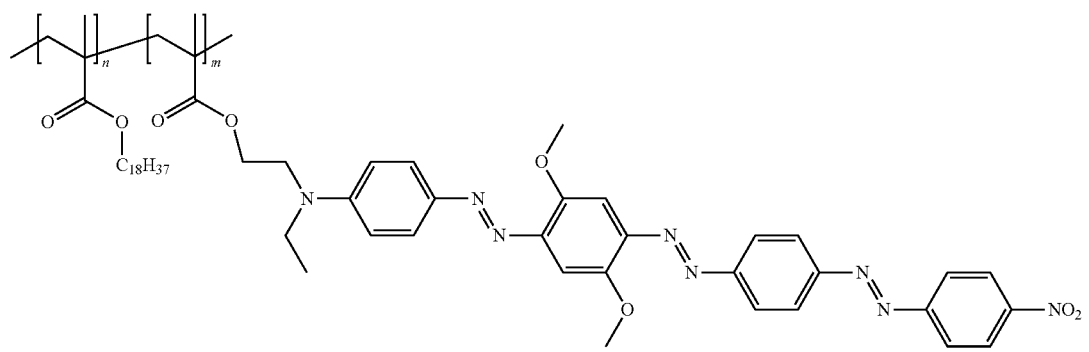
91
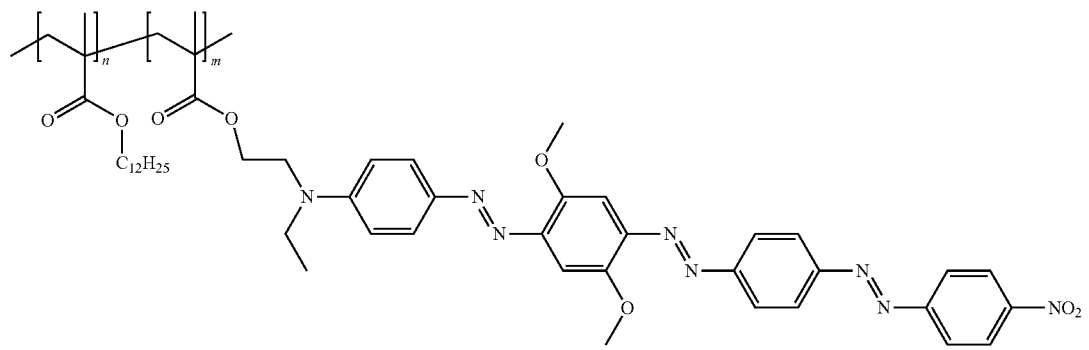
92

TABLE 8-continued
Examples of YanLi Polymers
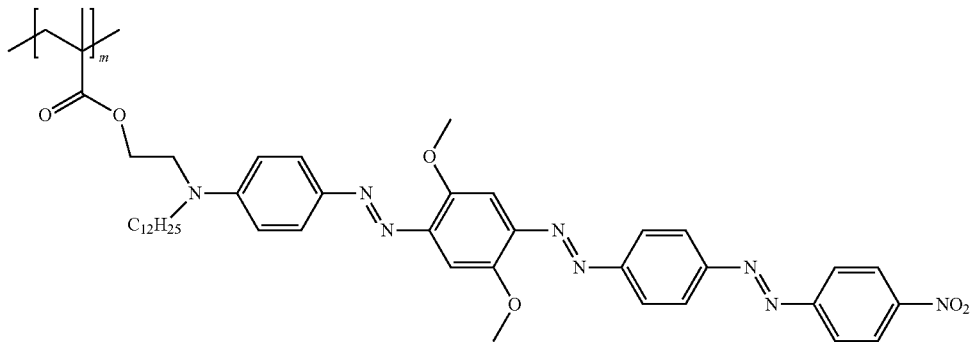
93
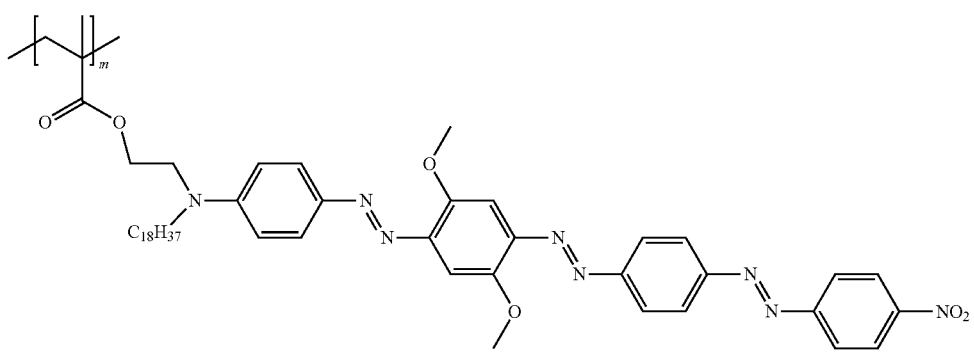
94
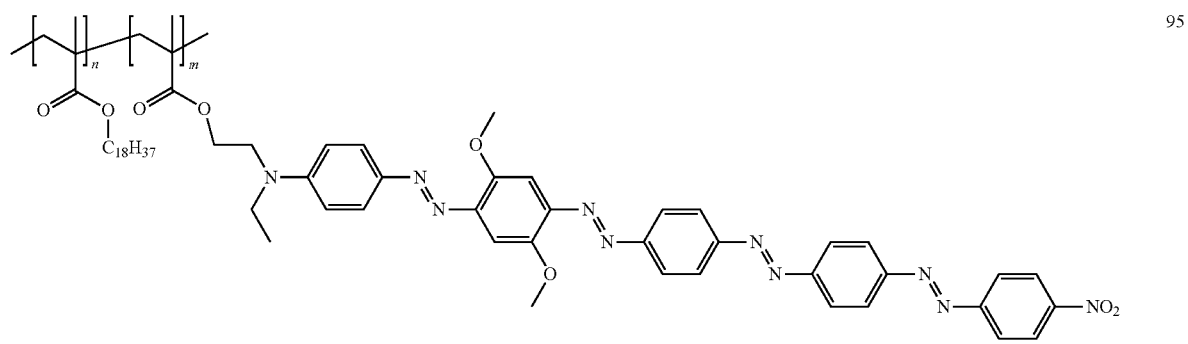
95
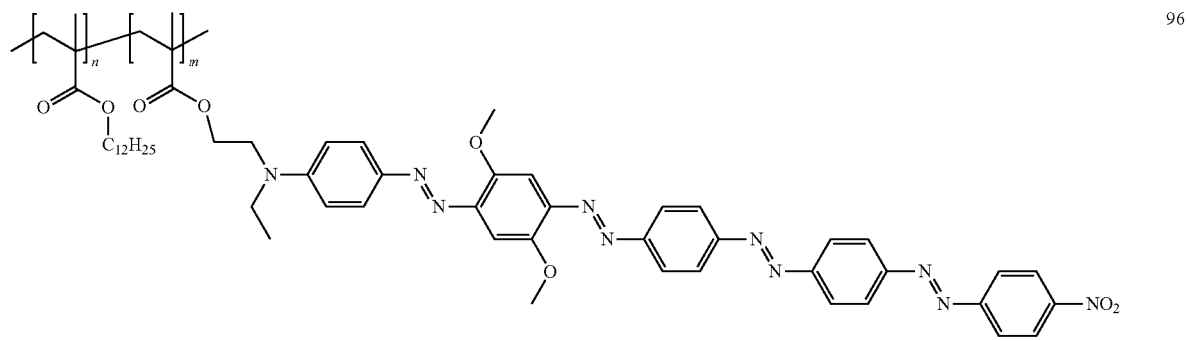
96

TABLE 8-continued
Examples of YanLi Polymers
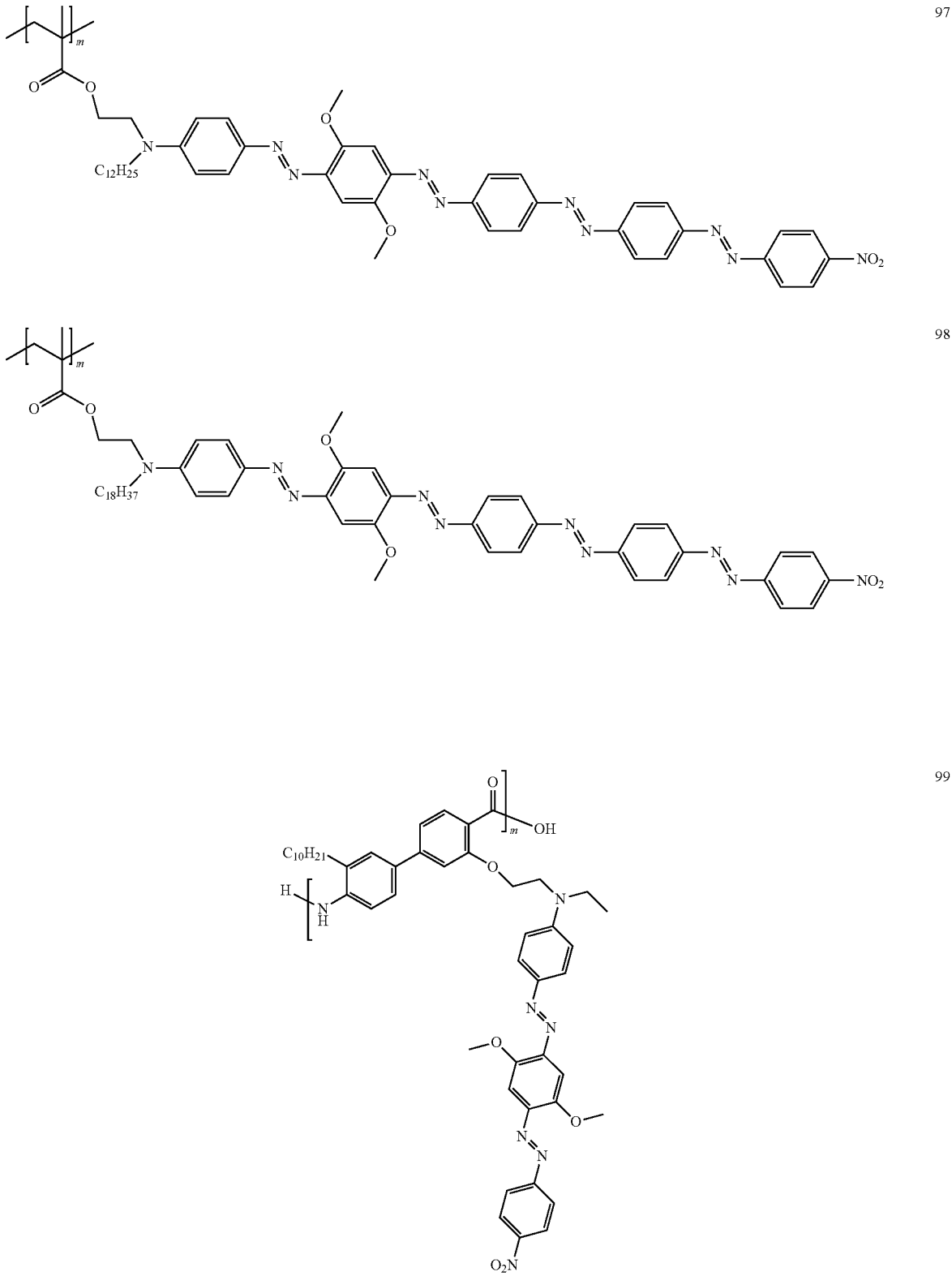

TABLE 8-continued
Examples of YanLi Polymers
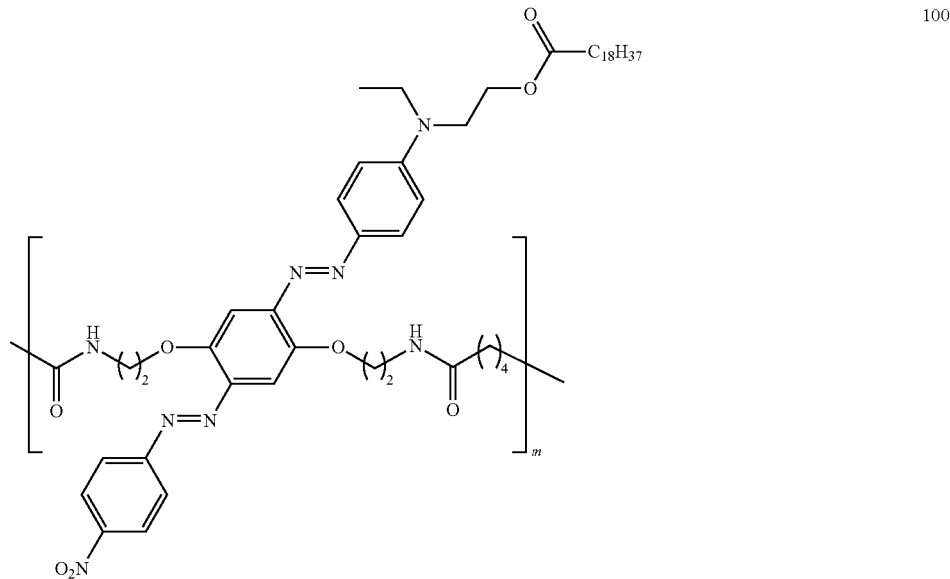
100
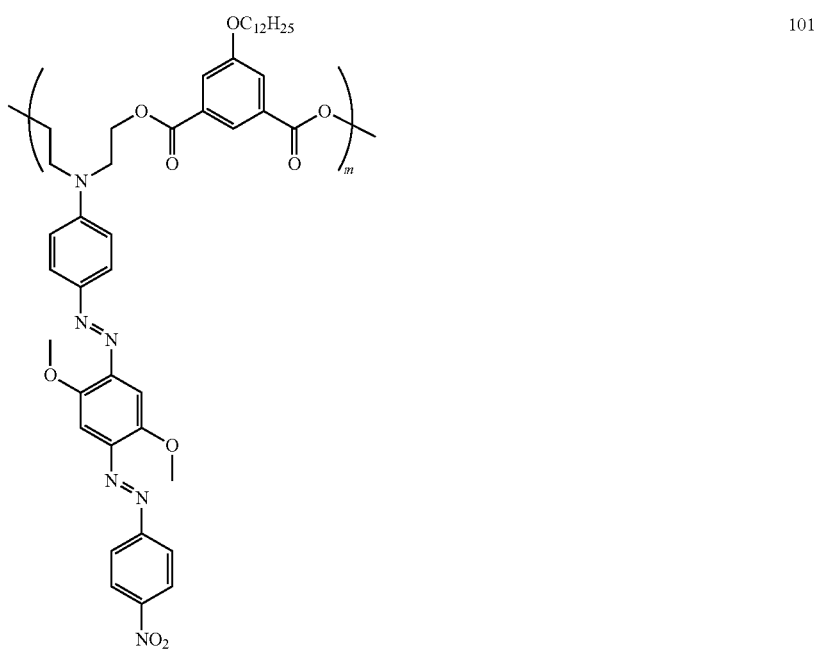
101

Additional specific examples of YanLi polymers include the following:
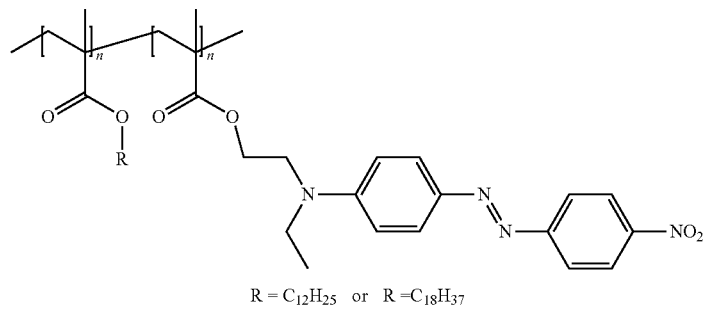
R = C₁₂H₂₅  or  R = C₁₈H₃₇
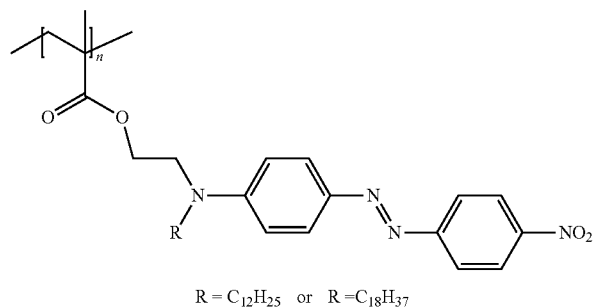
R = C₁₂H₂₅  or  R = C₁₈H₃₇
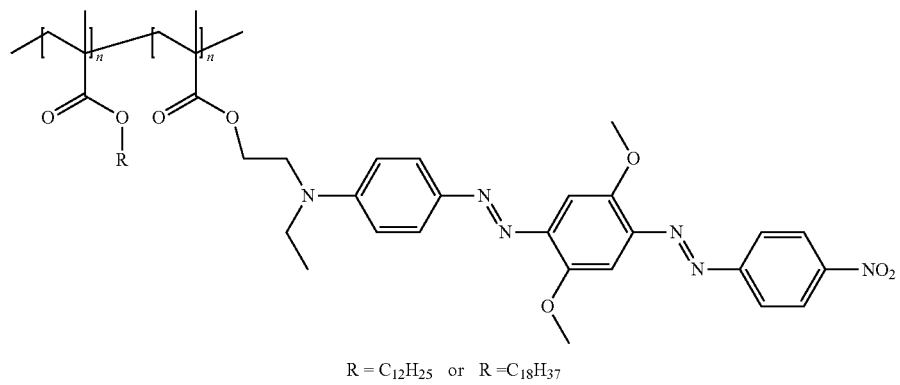
R = C₁₂H₂₅  or  R = C₁₈H₃₇
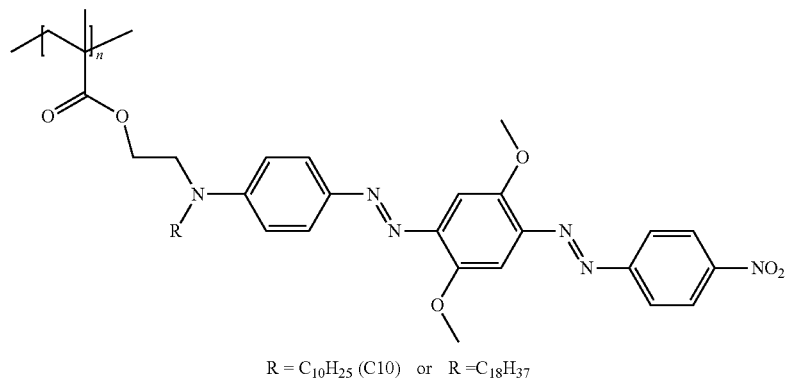
R = C₁₀H₂₅ (C10)  or  R = C₁₈H₃₇

-continued
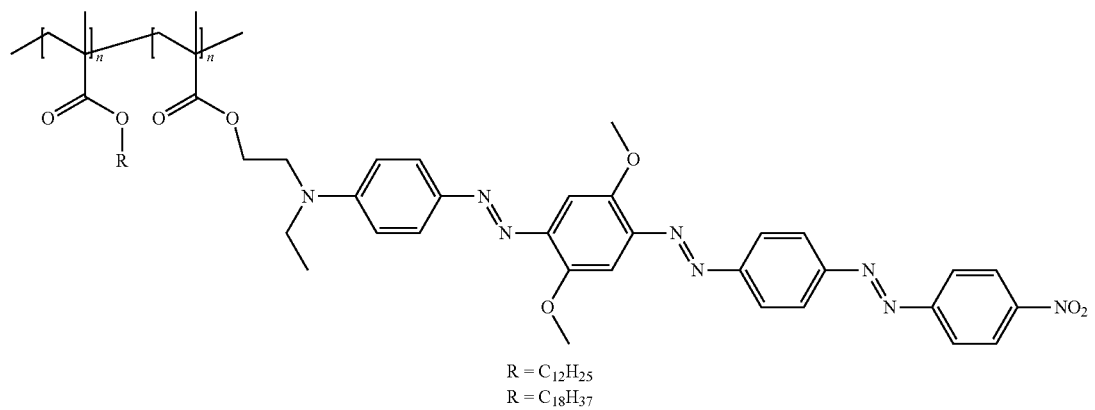
R = C₁₂H₂₅
R = C₁₈H₃₇
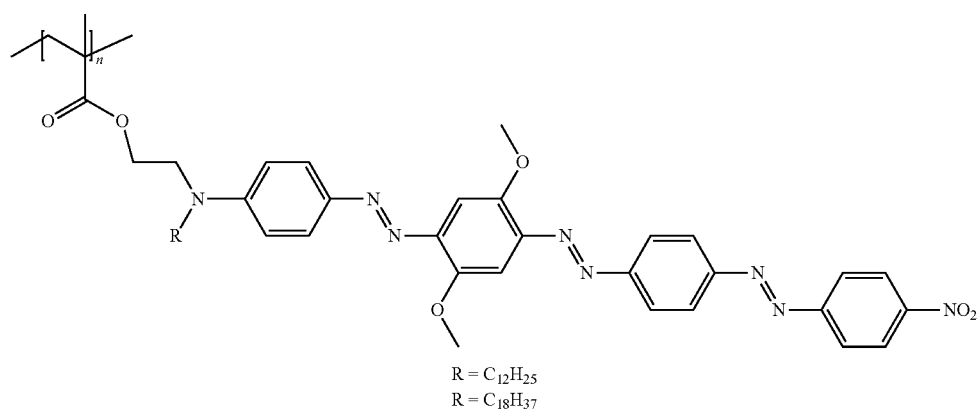
R = C₁₂H₂₅
R = C₁₈H₃₇
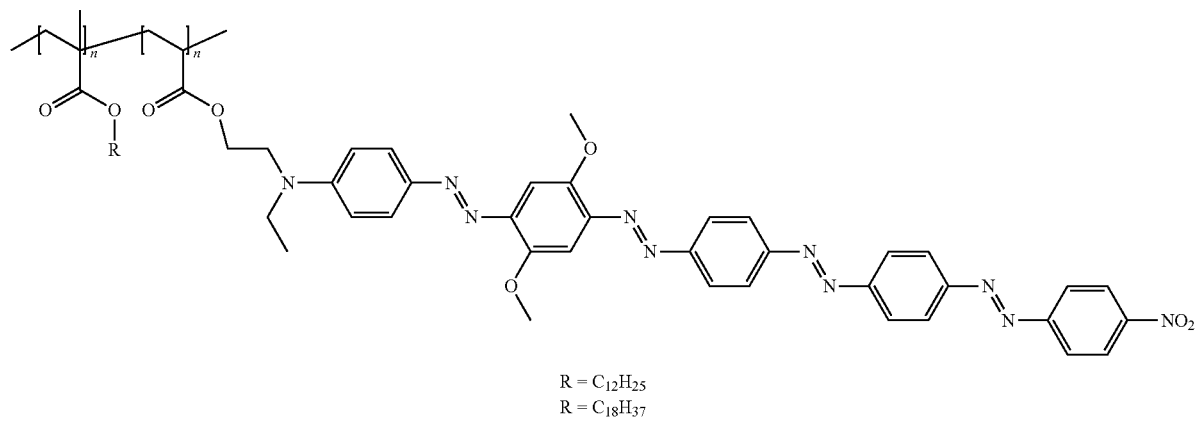
R = C₁₂H₂₅
R = C₁₈H₃₇
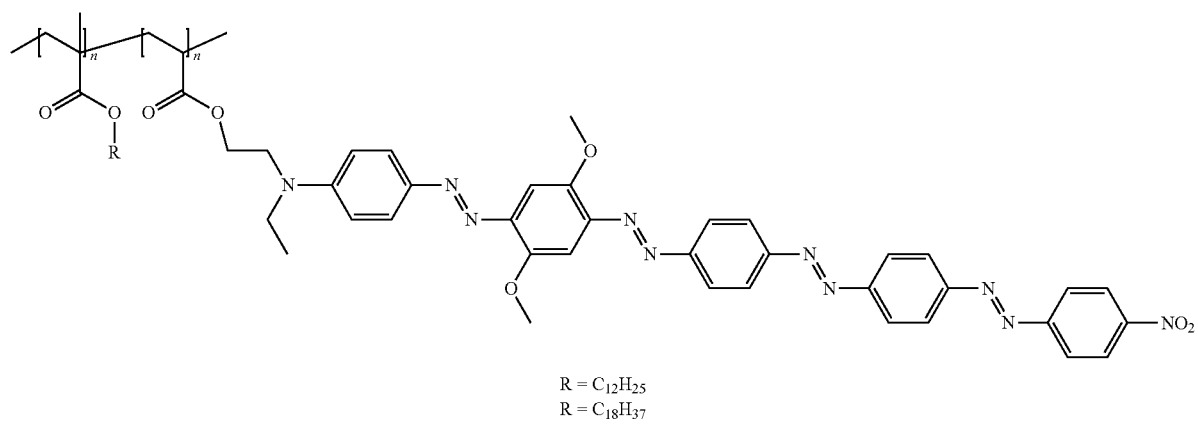
R = C₁₂H₂₅
R = C₁₈H₃₇

In many embodiments the composite polymer may include a repeating backbone linked to a polarizable unit in the form of one or more azo-dye chromophores. The azo-dye chromophores may consist of phenyl groups in conjugated connection via a conjugated bridge of two heteroatoms (e.g. an azo-bridge), such that there are "n" phenyl groups and "n-1" conjugated bridges where n is an integer between 2 and 16. Side chains may be added to the final backbone product or incorporated into individual monomers that are then polymerized.

These chromophores impart high polarizability due to delocalization of electrons. This polarizability may be enhanced by dopant groups. The composite polymer may further include resistive tails that will provide insulation within the material. In some embodiments, the resistive tails are can be substituted or unsubstituted carbon chains ($C_nX_{2n+1}$, where "X" represents hydrogen, fluorine, chlorine, or any combination thereof). In some embodiments, the resistive tails may be rigid fused polycyclic aryl groups in order to limit the motion of the side chains, potential stabilizing van der waals interactions between side chains while simultaneously making the material more stable by eliminating voids. In some embodiments, the resistive tails may be rigid in order to limit voids within the material. The synthetic scheme for demonstrative, but not exclusive, species are shown below and are expected to be adaptable to the claimed variations.

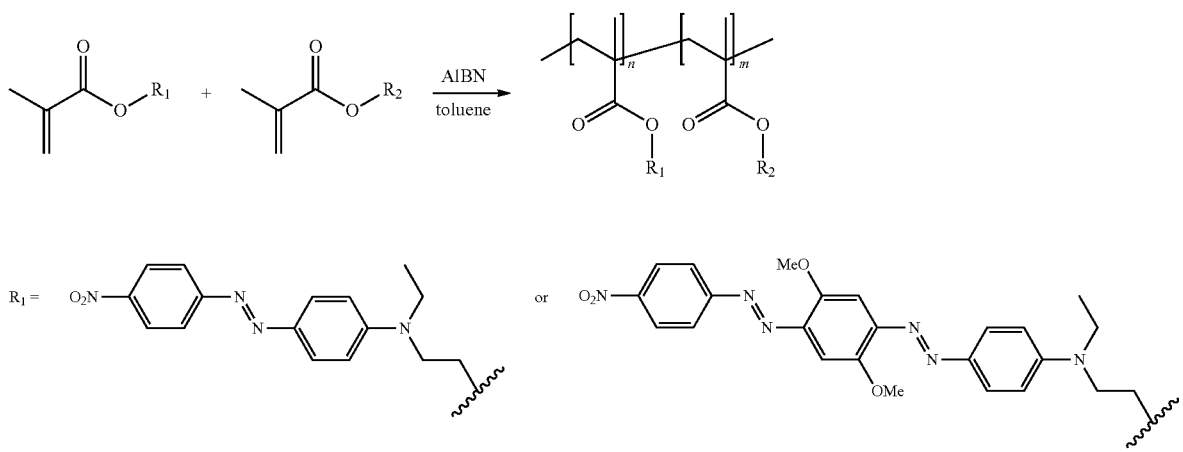

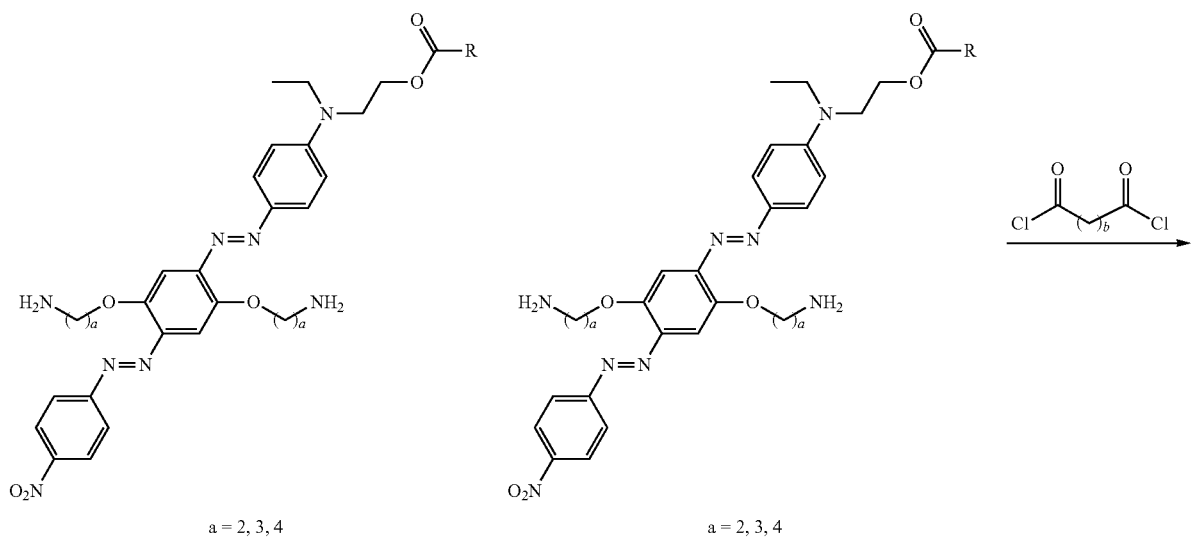

-continued

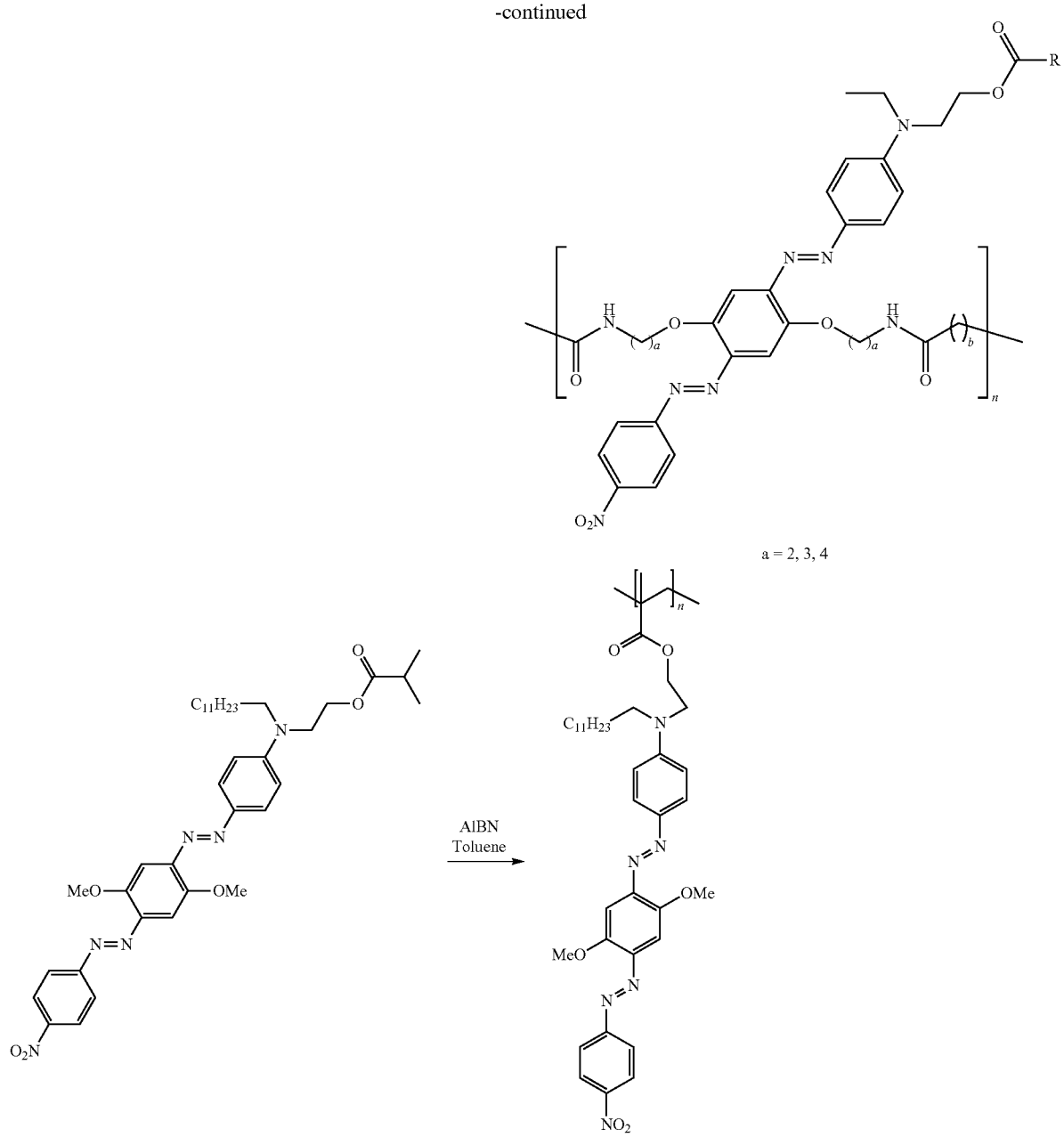

a = 2, 3, 4

No technical complications are expected in adapting these syntheses to monomers bearing both chromophore and resistive tail, as in structures 80, 81, 84, 87, 88, 91, 92, and 96 from Table 8.

Examples of suitable chromophores include, but are not limited to, Disperse Red-1, Black Hole Quencher-1, and Black Hole Quencher-2. In many of the embodiments it may not be necessary for all monomer units to bear a chromophore, and in some it may be desirable to possess other side chains or sites within the repeating backbone that impart other qualities to the material such as stability, ease of purification, flexibility of finished film, etc.

For embodiments where the chromophores are incorporated as side chains, the resistive tails may be added before the side chains are attached to a finished polymer, after side chains have been chemically added to a finished polymer, or incorporated into the polymer during synthesis by incorporation into monomer units.

For embodiments where the chromophore is part of the backbone the tails may be attached to the finished composite polymer or incorporated into monomer units and added during composite synthesis.

Non-limiting examples of suitable tails are alkyl, haloalkyl, cycloakyl, cyclohaloalkyl, and polyether. Syntheses of eight different YanLi polymers described herein will be further explained below.

Example 6: Synthesis of Polymer 1

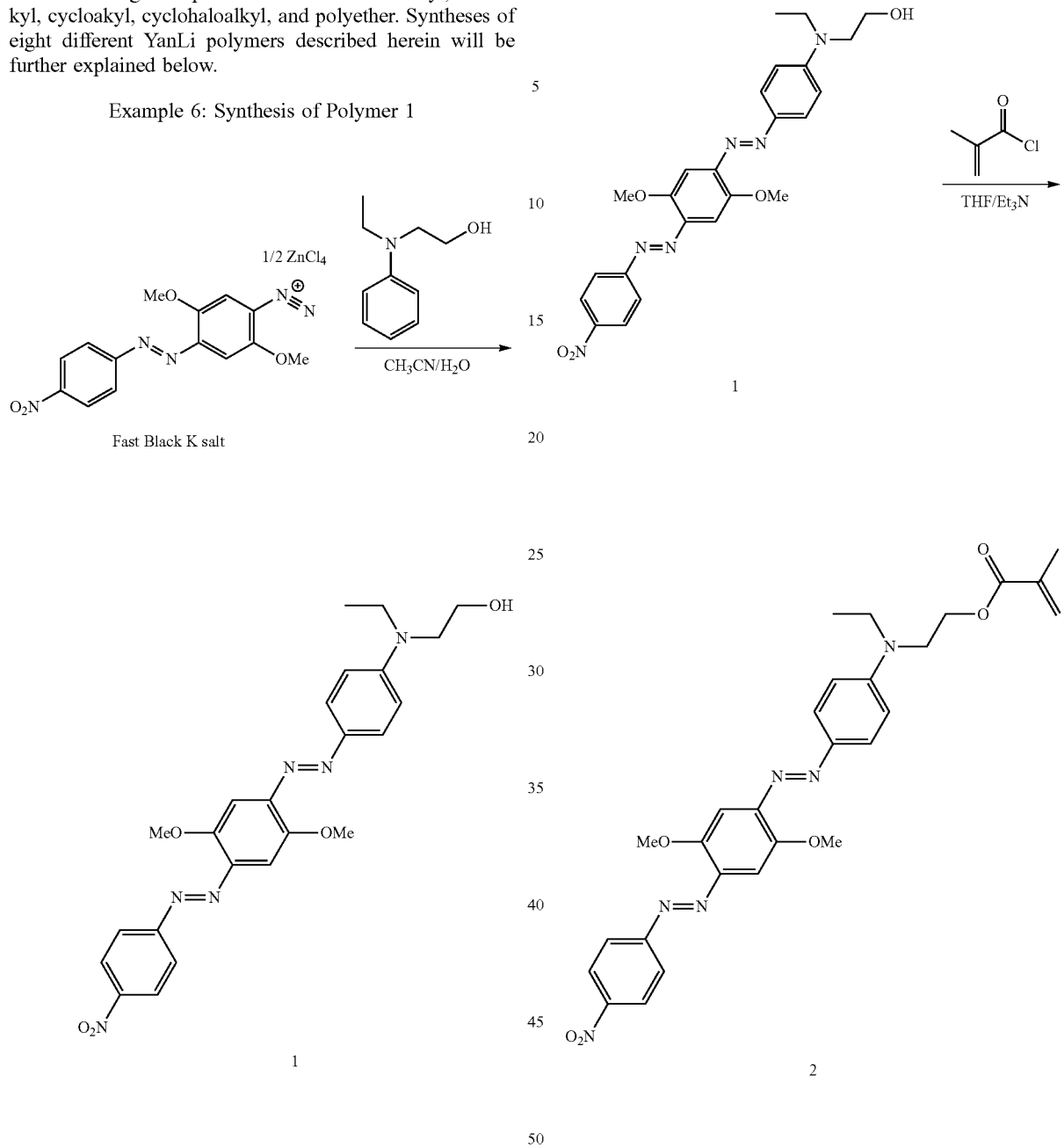

First compound 1—2-((4-((E)-(2,5-dimethoxy-4-((E)-(4-nitrophenyl) diazenyl)phenyl) diazenyl)phenyl)(ethyl) amino)ethan-1-ol was synthesized from Fast Black K Salt (2,5-Dimethoxy-4-(4-nitrophenylazo)benzenediazonium chloride zinc double salt. Fast Black K Salt (25%, 30 g) was dissolved in 250 mL acetonitrile and 250 mL NaOAc buffer solution (pH=4) and the resulting solution was stirred for 1 hour and then sonicated for 15 min, followed by vacuum filtration. The filtrate was dropwise added to a solution of 2-(ethyl(phenyl)amino)ethan-1-ol (4.1 g in 65 mL acetonitrile) at 0° C. The resultant solution was stirred at room temperature for 16 hours and the precipitate was filtered out and washed with mix solvent of acetonitrile/water (1:1) and dried under vacuum. The product was obtained as a black powder.

2-((4-((E)-(2,5-dimethoxy-4-((E)-(4-nitrophenyl)diazenyl)phenyl)diazenyl)phenyl)(ethyl) amino)ethyl methacrylate (Compound 2) is then synthesized from compound 1. To the solution of compound 1 (5.0 g) and triethylamine (4.4 mL) in 70 mL THF (anhydrous) at 0° C., was dropwise added a solution of methacryloyl chloride (3.1 mL) in THF (anhydrous, 10 mL). The resulting solution was warmed up to room temperature and was stirred overnight at room temperature. The reaction solution was filtered and THF was used to wash the insoluble; the filtrate was concentrated under vacuum and diluted in dichloromethane. The diluted solution was washed with water and the solvent was removed under vacuum. The crude product was purified with column chromatography and 3.2 g pure product was isolated as a black powder.

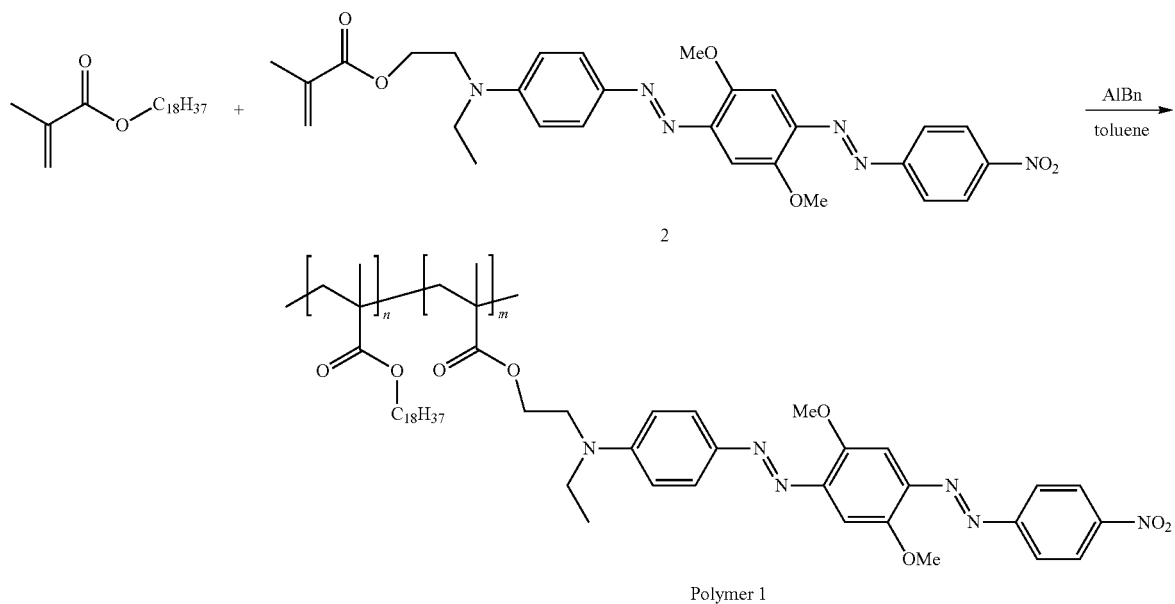

Polymer 1

Polymer 1 was then formed from compound 2 as follows. Compound 2 (2.0 g), stearylmethacrylate (1.2 g) and AIBN (160 mg) were dissolved in anhydrous toluene (12 mL) in a sealed flask and the resulting solution was heated to 85° C. for 18 hours and then cooled to room temperature. The polymer was obtained by precipitating in isopropanol.

Example 7: Synthesis of Polymer 2

Polymer 2 was synthesized using (E)-2-(ethyl(4-((4-nitrophenyl)diazenyl)phenyl)amino)ethyl methacrylate (compound 3). Compound 3 was synthesized from Disperse Red-1 (2-[N-ethyl-4-[(4-nitrophenyl)diazenyl]anilino]ethanol or $C_{16}H_{18}N_4O_3$) and methacryloyl chloride using preparation procedure of compound 2.

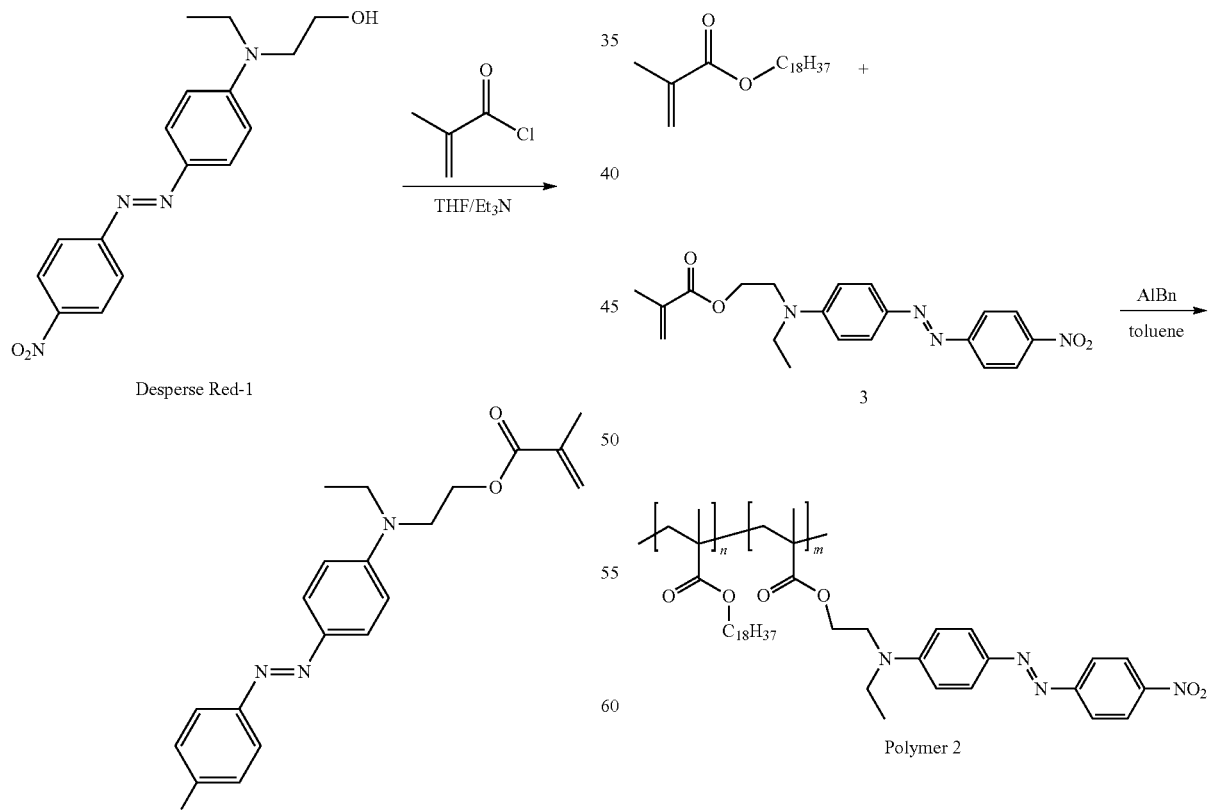

Polymer 2.

Polymer 2 was synthesized from compound 3 and stearylmethacrylate using preparation procedure of polymer 1.

Example 8: Synthesis of Polymer 3

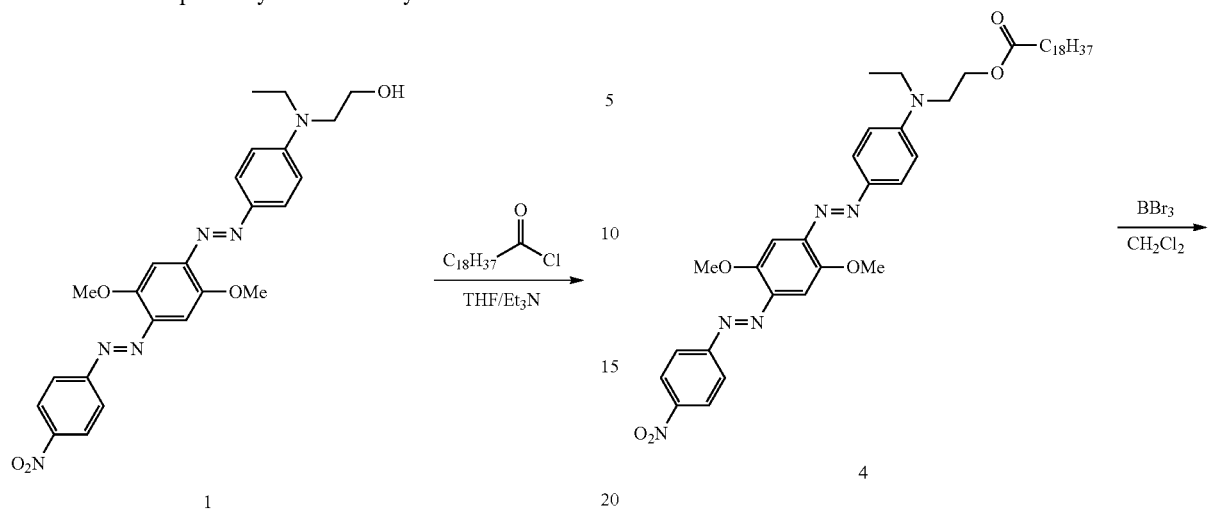

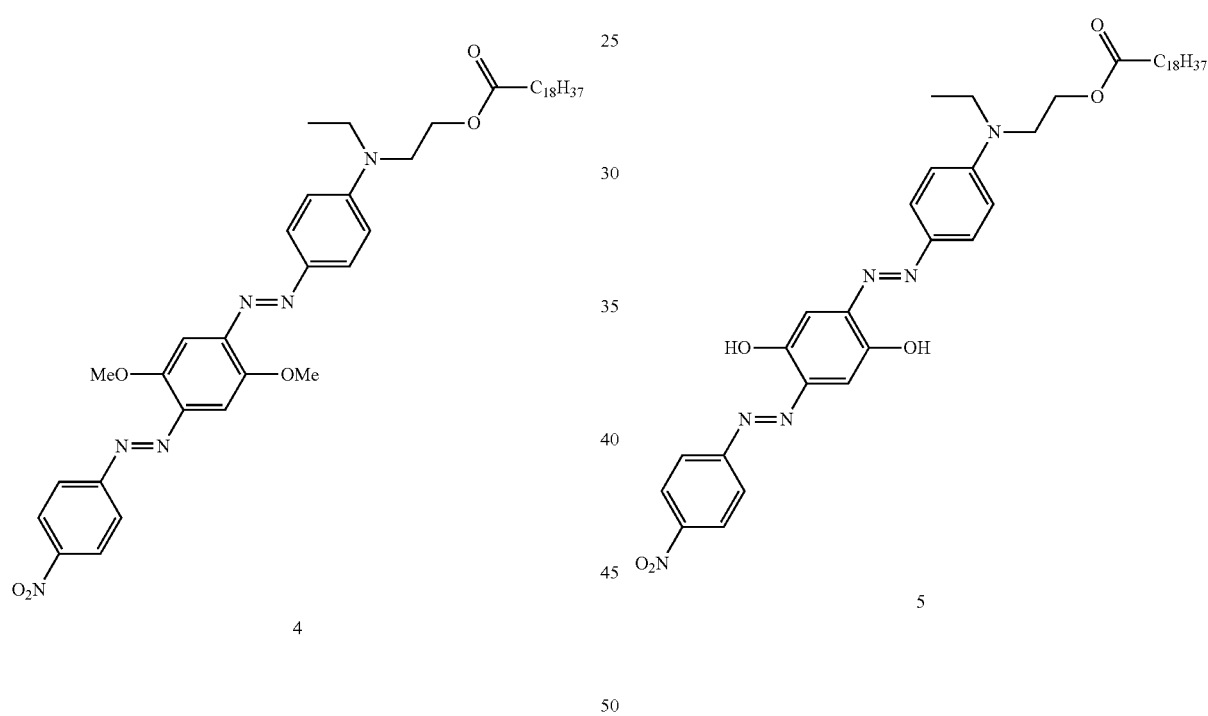

Polymer 3 was synthesized using 2-((4-((E)-(2,5-dimethoxy-4-((E)-(4-nitrophenyl)diazenyl)phenyl)diazenyl)phenyl) (ethyl)amino) ethyl nonadecanoate (compound 4), which was synthesized from compound 1 described above: To a solution of compound 1 (0.5 g) and triethylamine (0.46 mL) in 15 mL THF at 0° C., was dropwise added a solution of stearoyl chloride (1.12 mL) in THF. The resulting solution was warmed up to room temperature and was stirred overnight at room temperature. The reaction solution was filtered and THF was used to wash the insoluble; the filtrate was concentrated under vacuum and residue was taken in dichloromethane. The crude product solution was washed with water and the solvent was removed under vacuum. The crude product was purified with column chromatography.

Compound 4 was then used to synthesize 2-((4-((E)-(2, 5-dimethoxy-4-((E)-(4-nitrophenyl)diazenyl)phenyl)diazenyl)phenyl)(ethyl) amino)ethyl nonadecanoate (compound 5). Specifically, compound 4 (1.0 g) was dissolved in dichloromethane (30 mL) and cooled to −78° C.; $BBr_3$ (0.72 g) was slowly added into the solution. The resulting reaction mixture was slowly warmed to room temperature and was kept at room temperature with stirring for 12 hours. Sodium bicarbonate aqueous solution was injected in the reaction mixture at 0° C. and diluted with dichloromethane. The solution was washed with water and brine, and then concentrated under vacuum. The product was purified via flash column chromatography.

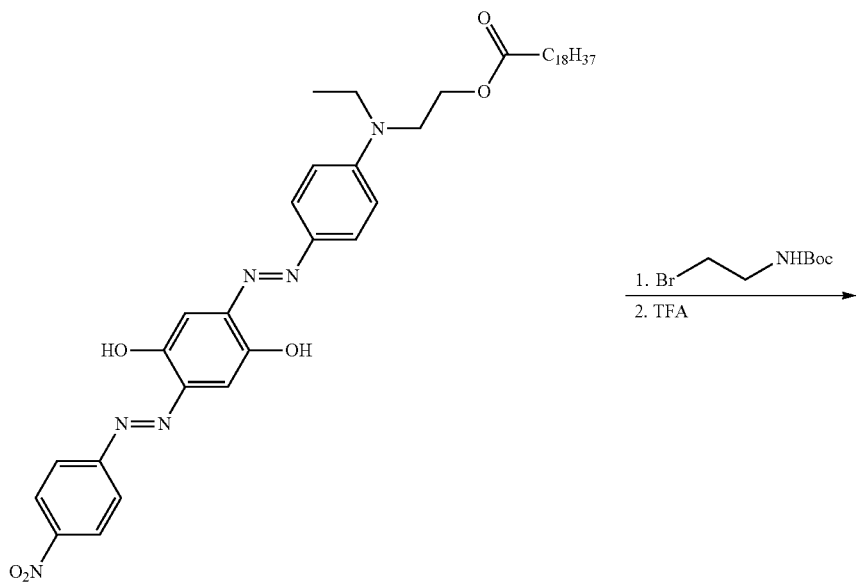

5

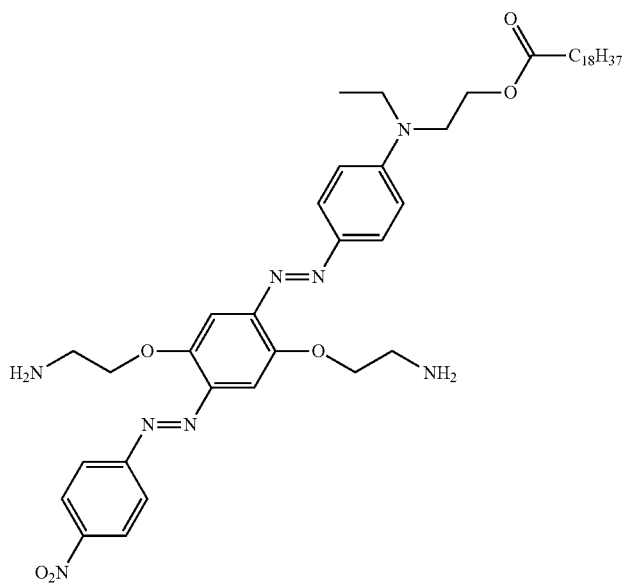

6

Compound 5 was then used to synthesize compound 6 (2-((4-((E)-(2,5-bis(2-aminoethoxy)-4-((E)-(4-nitrophenyl)diazenyl)phenyl)diazenyl)phenyl) (ethyl)amino)ethyl nonadecanoate). Compound 5 (0.73 g), $K_2CO_3$ (1.38 g) and tert-butyl (2-bromoethyl)carbamate (0.44 g) were added to dimethylformamide (DMF) (15 mL), and the resulting mixture was stirred at 65° C. overnight. $H_2O$ (400 mL) was added to the reaction mixture and the aqueous layer was extracted with EtOAc (200 mL×2). The combined organic layer was washed with $H_2O$ (100 mL×2) and brine (50 mL), dried over $Na_2SO_4$, filtered, and concentrated under reduced pressure. The crude product was purified by silica column chromatography. The pure product was dissolved in dichloromethane (10 mL) and TFA (trifluoroacetic acid) (3 mL) and the solution was stirred at room temperature for 2 hours. Then excess reagent and solvent were removed under vacuum. The resulting crude product was neutralized by $NaHCO_3$ solution, extracted with $CH_2Cl_2$ (3×50 mL), dried over $MgSO_4$ and evaporated. The crude product (compound 6) was purified by silica column chromatography.

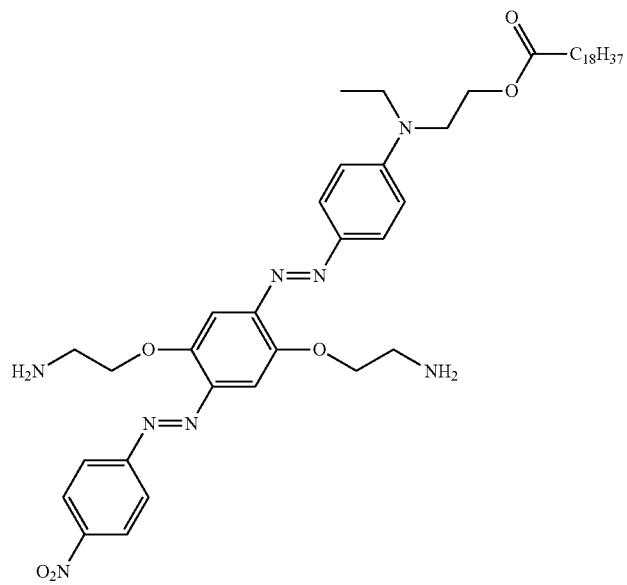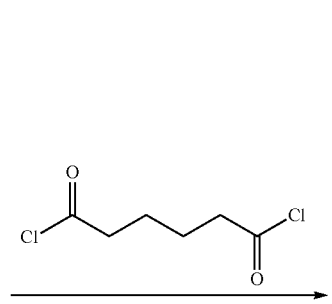
6
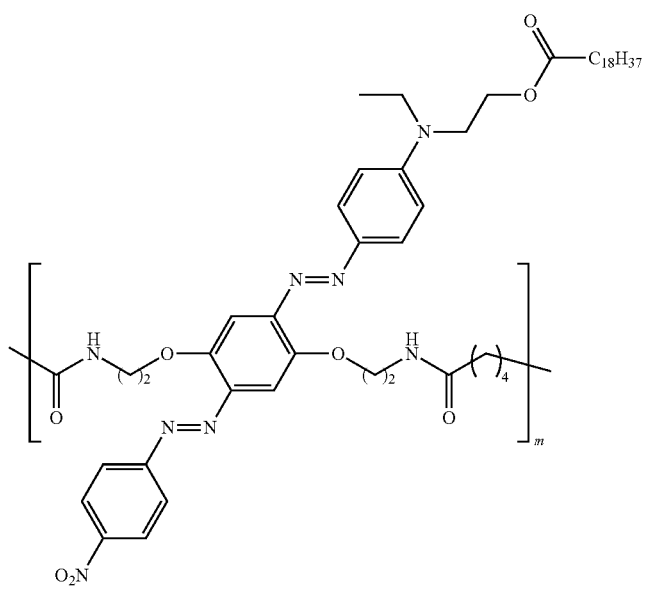
Polymer 3

Polymer 3.

To the solution of compound 6 (4.1 g) in CH$_2$Cl$_2$ (15 mL), was slowly added adipoyl dichloride (0.9 g) at 0° C. After the addition, the solution was allowed to warm to room temperature and stir for 2 hours. The resulting solution was concentrated and dropwise added into isopropanol to precipitate the polymer 3.

Example 9: Synthesis of Polymer 4

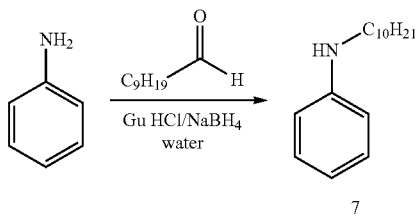

The synthesis of polymer 4 begins by synthesizing N-decylaniline (compound 7).

To a solution containing GuHCl (10 mg, 5 mol %) in H$_2$O (4 mL), was added decanal (2 mmol) and aniline (2.2 mmol) and the mixture vigorously stirred for 15 min at room temperature. After, NaBH$_4$ (20 mg, 2.1 mmol) was added, the mixture was stirred for additional 10 min. The reaction mixture was extracted with CH$_2$Cl$_2$, dried over Na$_2$SO$_4$, concentrated under vacuum and the crude mixture was purified by column chromatography on silica gel to afford the pure products.

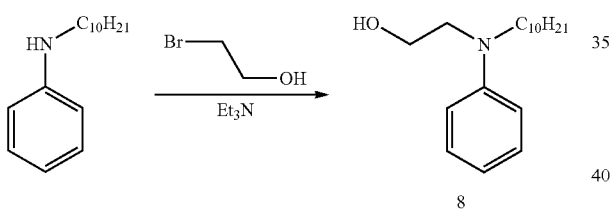

2-(Decyl(phenyl)amino)ethan-1-ol (compound 8) is Then Synthesized from Compound 7

To a solution of 7 (470 mg, 2.00 mmol) in toluene (5 ml) was added triethylamine (405 mg, 4.00 mmol) and 2-bromoethanol (501 mg, 4.01 mmol), and the mixture was refluxed for 2 h. The resulting mixture was diluted with saturated NH$_4$Cl and extracted with ethyl acetate. The extract was washed with brine, dried over anhydrous MgSO4, filtered, and concentrated in vacuo. The crude product was purified by silica gel chromatography to give 8.

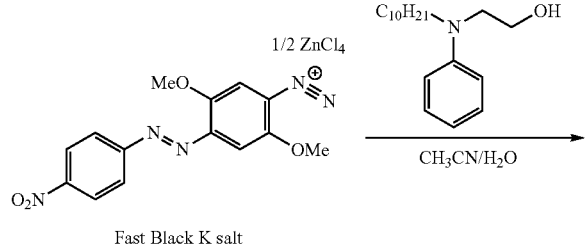

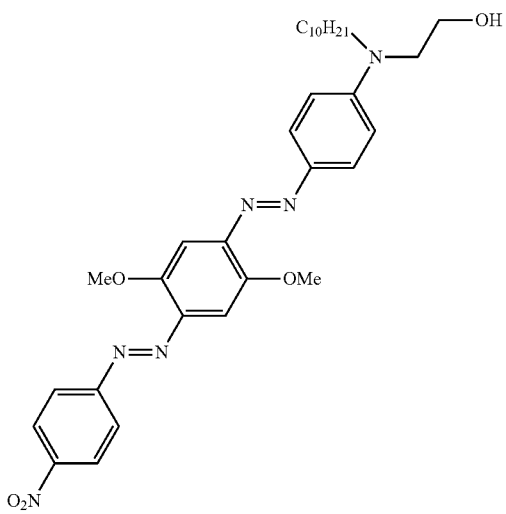

2-(Decyl(4-((E)-(2,5-dimethoxy-4-((E)-(4-nitrophenyl)diazenyl)phenyl)diazenyl) phenyl) amino)ethan-1-ol (Compound 9) was Then Synthesized from Fast Black K Salt and Compound 8

Fast Black K Salt (25%, 30 g) was dissolved in 250 mL acetonitrile and 250 mL NaOAc buffer solution (pH=4) and the resulting solution was stirred for 1 hour and then sonicated for 15 min, followed by vacuum filtration. The filtrate was dropwise added to a solution of compound 8 (6.8 g in 65 mL acetonitrile) at 0° C. The resultant solution was stirred at room temperature for 16 hours and the precipitate was filtered out and washed with mix solvent of acetonitrile/water (1:1) and dried under vacuum. The product was obtained as a black powder.

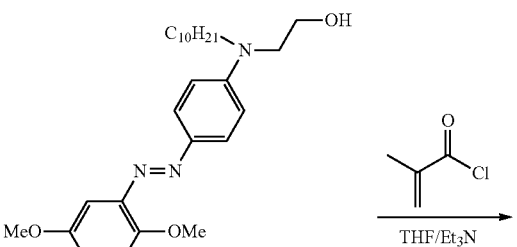

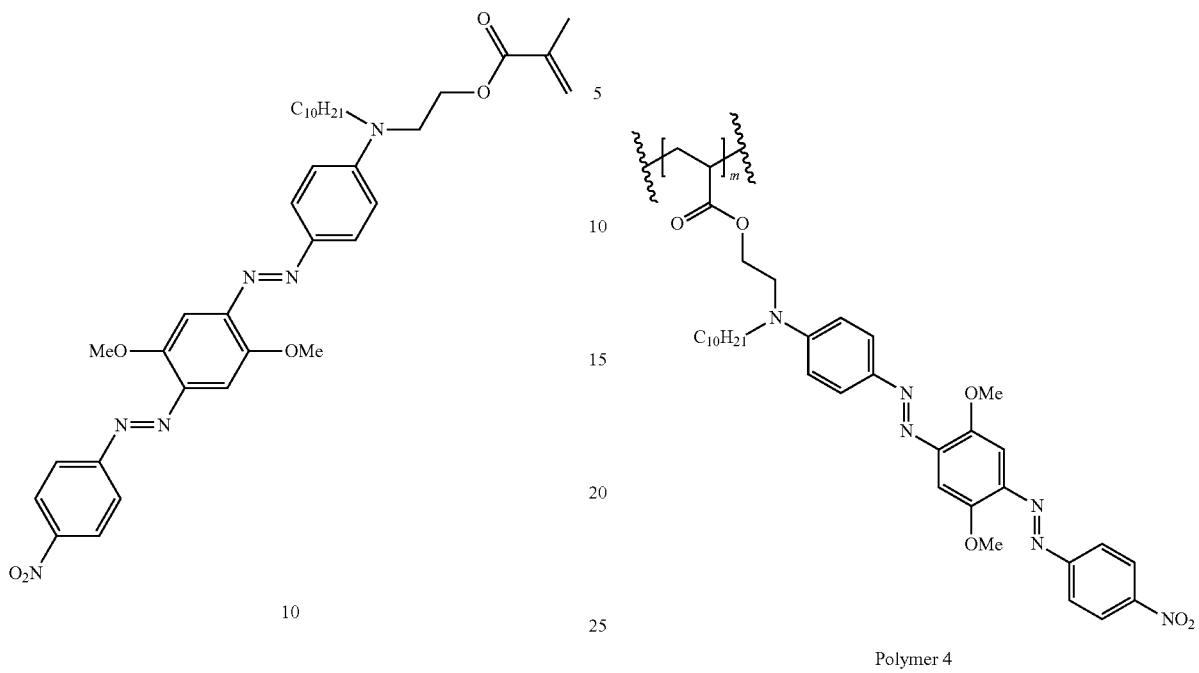

10

2-(decyl(4-((E)-(2,5-dimethoxy-4-((E)-(4-nitrophenyl)diazenyl)phenyl)diazenyl) phenyl) amino)ethyl methacrylate (Compound 10)

To the solution of compound 9 (5.0 g) and triethylamine (3.5 mL) in 70 mL THF (anhydrous) at 0° C., was dropwise added a solution of methacryloyl chloride (2.5 mL) in THF (anhydrous, 10 mL). The resulting solution was warmed up to room temperature and was stirred overnight at room temperature. The reaction solution was filtered and THF was used to wash the insoluble; the filtrate was concentrated under vacuum and diluted in dichloromethane. The diluted solution was washed with water and the solvent was removed under vacuum. The crude product was purified with column chromatography and 3.3 g pure product (compound 10) was isolated as a black powder.

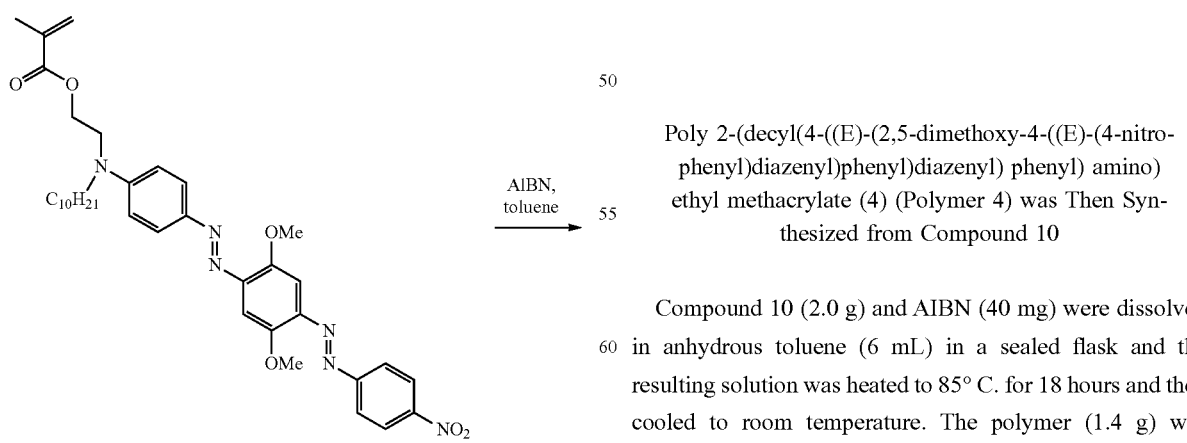

Polymer 4

Poly 2-(decyl(4-((E)-(2,5-dimethoxy-4-((E)-(4-nitrophenyl)diazenyl)phenyl)diazenyl) phenyl) amino) ethyl methacrylate (4) (Polymer 4) was Then Synthesized from Compound 10

Compound 10 (2.0 g) and AIBN (40 mg) were dissolved in anhydrous toluene (6 mL) in a sealed flask and the resulting solution was heated to 85° C. for 18 hours and then cooled to room temperature. The polymer (1.4 g) was obtained by precipitating and washing in 2-isopropanol.

Certain preferred implementations meet one of the following formulae.

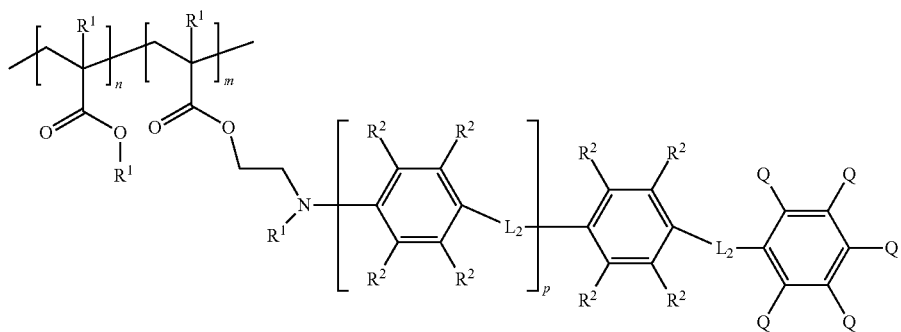

Wherein, each instance of $R^1$ is independently selected from —H, —OH, -Ak, —OAk, —OAk-$X_o$, or -Ak-$X_o$, or alkoxy; each instance of $R^2$ is independently selected from H, —OH, —OAk, —OAk-$X_o$, or Ak; $L_2$ is a heteroatom bridge in conjugation with the ring system of the side chain (e.g. azo-bridge or —N=N—, alkene bridge or —HC=CH—, and alkyne or —C≡C— bridge), each instance of Q is independently selected from any electron withdrawing group or H, Ak is alkyl or branched alkyl or aryl, X is any halogen, n is 0-150, m is 1-300, o is 1-51, p is 0-10, with the provisio that at least one instance of $R^1$ must be a resistive tail. Preferred, but not limiting, embodiments of resistive tails include hydrocarbon and halohydrocarbon chains, non-aromatic hydrocarbocycles, and non-aromatic heterocycles. In some embodiments, it may be preferable for the resistive tails to be ridged. In such embodiments, rigid resistive tails maybe non-aromatic carbocycles or non-aromatic heterocycles.

Other embodiments of the invention possess a polyester backbone where resistive tail and Polarizable Unit are each simultaneously side chains to the same monomer. A sample scheme for polyester embodiments is depicted below.

Example 10: Synthesis of Polymer 5

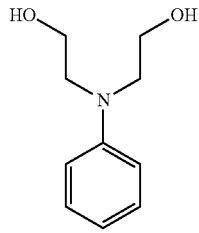

N-Phenyldiethanolamine

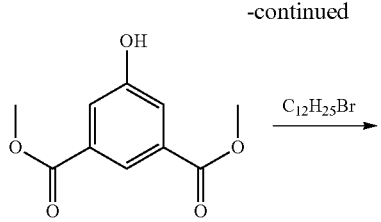

-continued

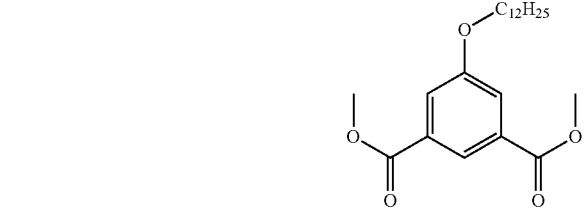

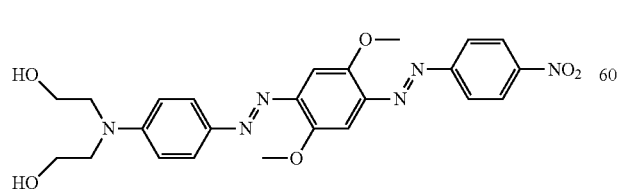

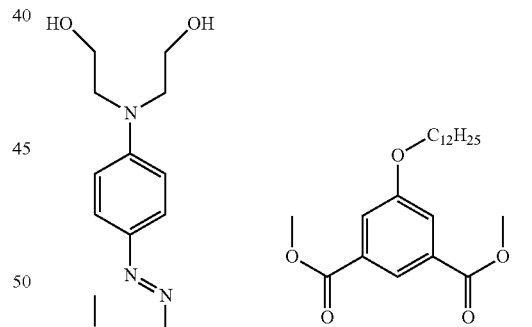

Example 11: Synthesis of Polymer 6

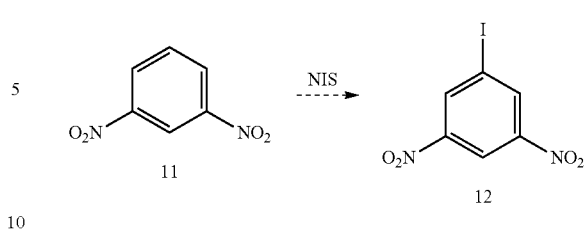

Synthesis of 12: Add 1,3-dinitrobenzene (11) in a round bottom flask with concentrated sulfuric acid (0.5M) with 1.1 equiv. of $I_2$. Connect to reflux condenser and place reaction vessel in an oil bath heated to 150° C. When the reaction is complete, pour mixture onto ice and filter product. Wash solid with sodium bicarbonate until neutralized and dissolve in dichloromethane until dissolved. Wash with aqueous sodium thiosulfate (10%) solution to remove $I_2$ and organic solution with magnesium sulfate before filtering. Remove organic solvent under vacuum, recrystallize, and filter to isolate 12.

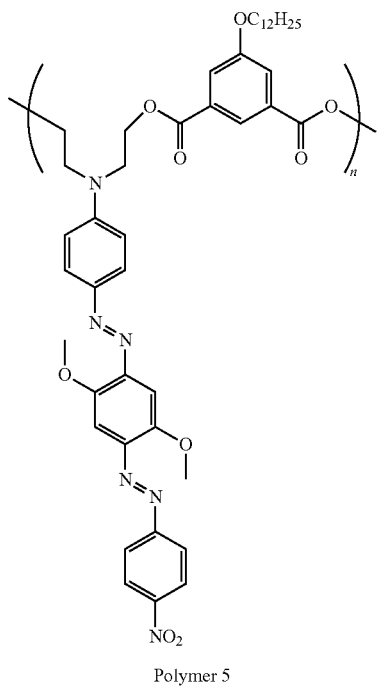

Polymer 5

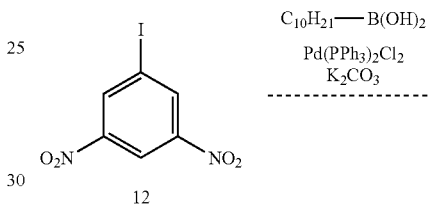

Synthesis of 13: Add 12 (1 equiv.), dodecane boronic acid (1.2 equiv), $Pd(PPh_3)_2Cl_2$ (0.05 equiv), and potassium carbonate (2 equiv.) into a reaction vessel. Evacuate and backfill with $N_2$ three times. Add a degassed mixture of toluene and water (10:1) and heat to 80° C. When the reaction is complete, slowly add 1 M aqueous solution of HCl until the aqueous layer is acidic. Extract with dichloromethane (3×) and dry organic fractions with $MgSO_4$ before filtering. Concentrate the crude reaction mixture and filter through celite before recrystallizing Filter to isolate product 13.

This scheme should be widely adaptable to accommodate a variety of backbones and polarizable units. Such species would meet the following formula.

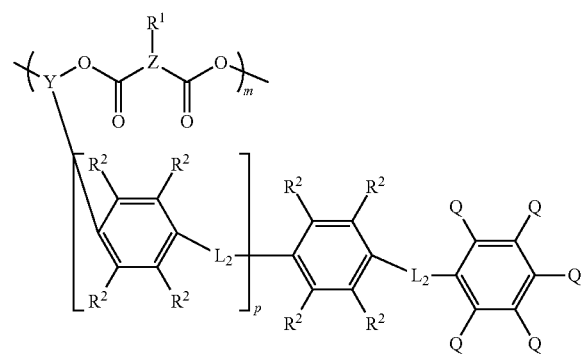

Where each instance of $R^1$ is independently selected from any alkyl group, each instance of $R^2$ is independently selected from —H, —OH, —OAk, or —OAk-$X_o$, $L_2$ is a heteroatom bridge in conjugation with the ring system of the side chain (e.g. azo-bridge or —N=N—, alkene bridge or —HC=CH—, and alkyne or —C≡C— bridge), each instance of Q is independently selected from any electron donating or electron withdrawing group, Z is substituted or unsubstituted hydrocarbon cyclic or chain linkage, Y is any hydrocarbon chain which may be interrupted by a hetero atom at the point of attachment, m is 1-300, o is 1-51, p is 0-10. Preferred embodiments include m between 60 and 270, and p between 1 and 4.

Other embodiments of the invention possess alternative backbones where resistive tail and Polarizable Unit are each simultaneously side chains to the same monomer. A sample scheme for polyaramid embodiments is depicted below.

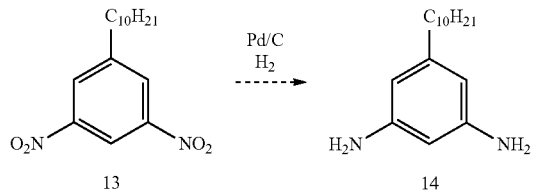

Synthesis of 14: Add 3 (1 equiv) to reaction flask with palladium on carbon (0.1 equiv). Evacuate and backfill with $N_2$ before adding ethanol (0.1 M). Fill a balloon and needle with $H_2$ gas and connect to reaction vessel and heat to 80° C. When the reaction is completed, filter through celite making sure the palladium on carbon does not dry. Remove solvent under reduced pressure and recrystallize to purify product 14.

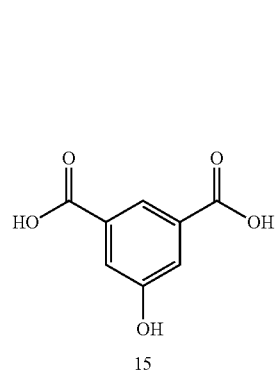
15
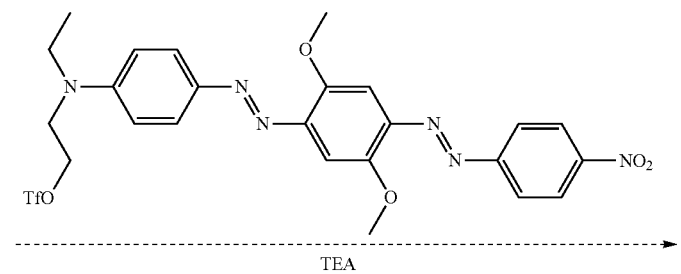
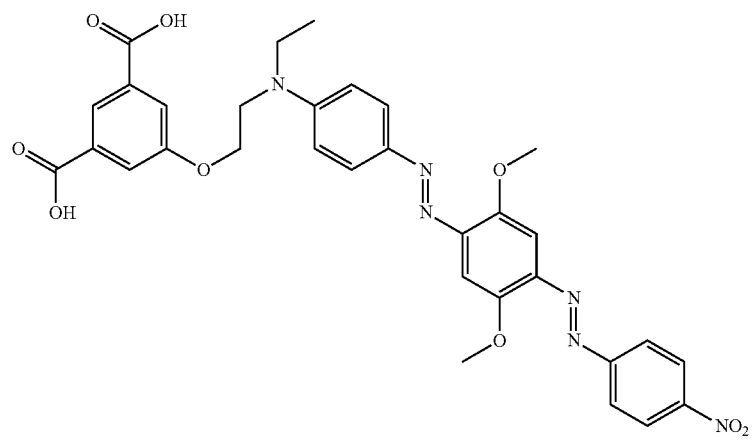
16

Synthesis of 16: Add 15 (1 equiv.) into a round bottom flask and dissolve in solution of dichloromethane/triethylamine (5:1, 0.1 M). Add a solution of 10 (1.1 equiv, 0.5 M) in dichloromethane to the solution of 15. When the reaction is complete, wash with 1M aqueous HCl until acidic and extract with dichloromethane (3 times). Dry organic fractions with MgSO$_4$, filter, and concentrate under vacuum. Purify through crystallization or SiO$_2$ column chromatography to isolate 16.

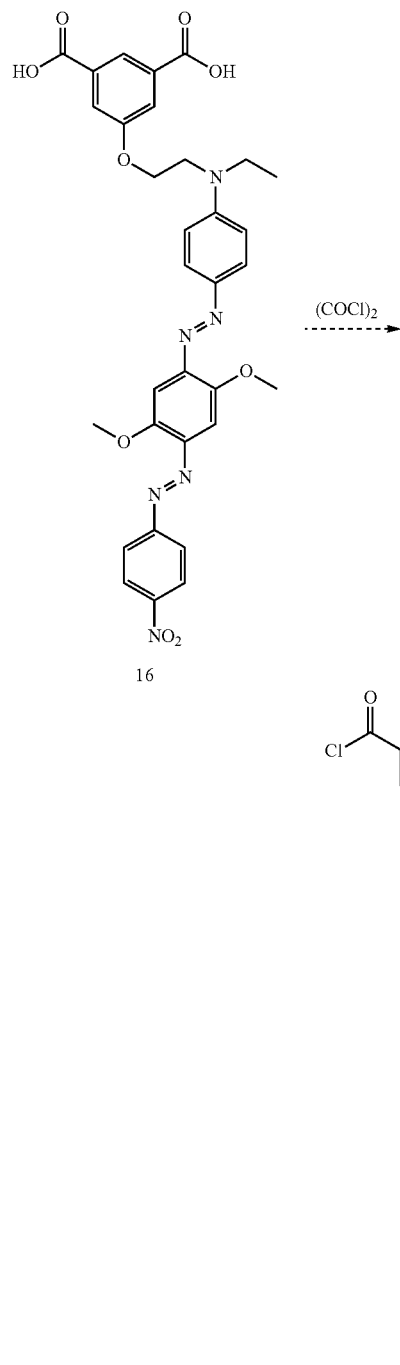

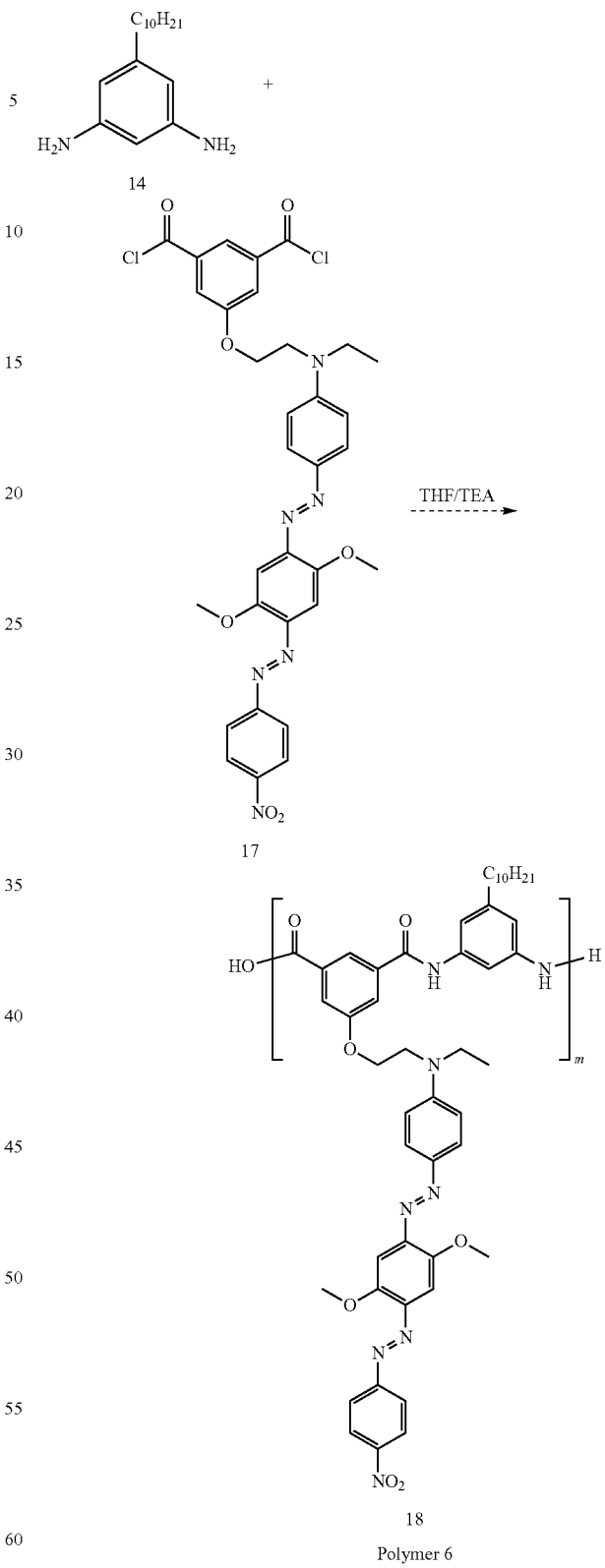

Synthesis of 17: Dissolve 16 (1 equiv.) in dichloromethane (0.1 M) and add oxalyl chloride (2.1 equiv) with a drop of dimethylformamide as catalyst. Let reaction stir at room temperature until bubbling stops. Remove solvent under vacuum to isolate 7.

Synthesis of 18: Add 14 (1.0 equiv.) and 17 (1.0 equiv.) to a reaction vessel before adding a mixture of anhydrous tetrahydrofuran and triethylamine (5:1, 0.1 M). When the reaction is complete, concentrate under reduced pressure and precipitate to isolate 18.

The scheme for Polymer 6 should be widely adaptable to accommodate a variety of backbones and polarizable units. Such species would meet the following formula.

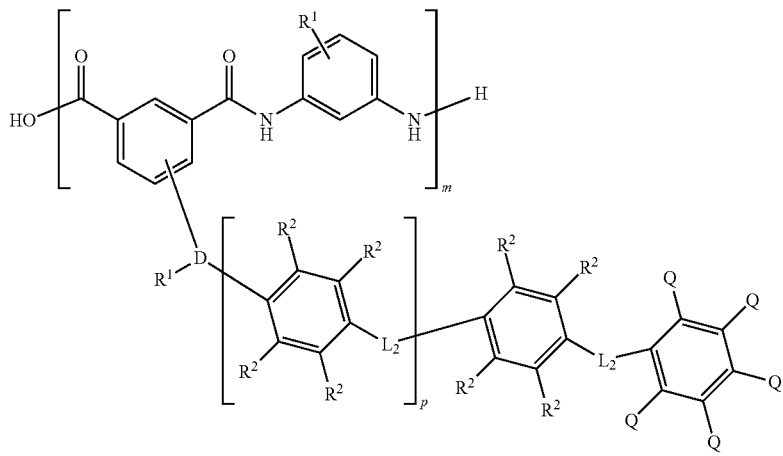

Where each instance of $R^1$ is independently selected from any alkyl or alkoxyl group or —H, each instance of $R^2$ is independently selected from —H, —OH, —OAk, or —OAk-$X_o$, $L_2$ is a heteroatom bridge in conjugation with the ring system of the side chain (e.g. azo-bridge or —N=N—, alkene bridge or —HC=CH—, and alkyne or —C≡C— bridge), Q is selected from any electron withdrawing group, D is any hydrocarbon chain which may be interrupted by hetero atoms at the point of backbone attachment and side chain attachment, m is 1-300, o is 1-51, p is 0-10. Preferred embodiments include m between 60 and 270, and p between 1 and 4.

Examples 12 & 12B: Synthesis of Polymers 7A & 7B

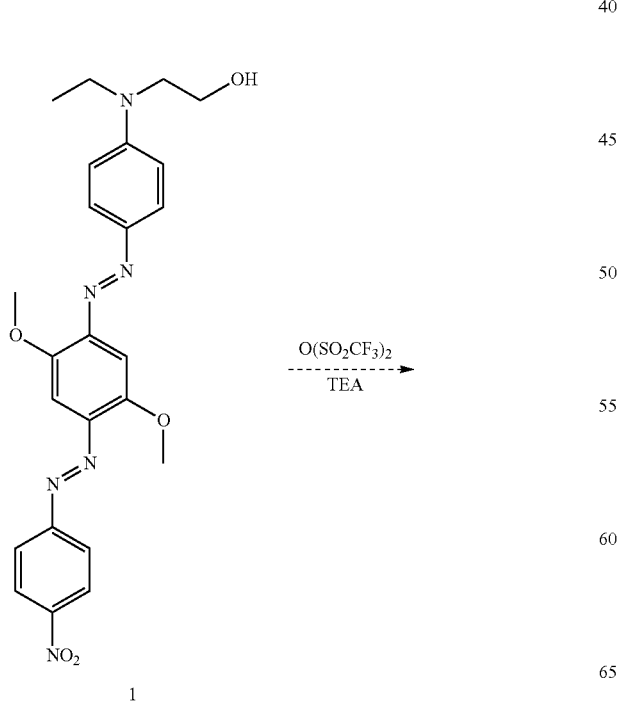

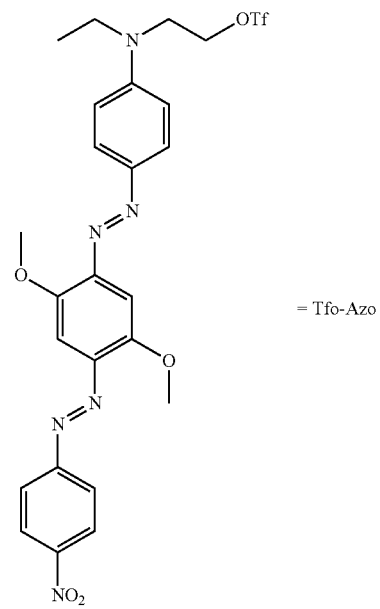

= Tfo-Azo

20

Synthesis of 20: Dissolve 1 (1 equiv.) in a solution of $CH_2Cl_2$ (0.1 M) and triethyl amine (1 equiv.) and let stir for 10 min. Add trifluoromethanesulfonic anhydride (1.1 equiv.) slowly and let stir for 30 min. Wash reaction mixture with aqueous HCl (1M), extract with dichloromethane, and dry with $MgSO_4$. Remove solvent to isolate 20.

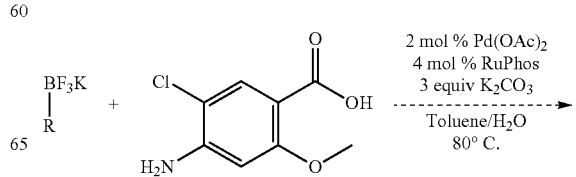

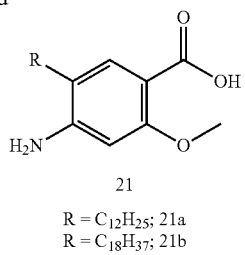

R = C₁₂H₂₅; 21a
R = C₁₈H₃₇; 21b

Synthesis of 21a-21b: Add 4-amino-5-chloro-2-methoxybenzoic acid, alkyl potassium trifluoroborate salt, Pd(OAc)₂ (0.02 equiv.), RuPhos (0.04 equiv.), and K₂CO₃ (3 equiv.) to a reaction flask. Evacuate this flask and backfill with N₂ three times. In a separate flask, combine toluene and water (0.3 M; 10:1) and sparge with N₂ for 60 minutes. Transfer this solution mixture to the reaction flask and place this into a preheated oil bath at 80° C. When the reaction is complete, it should cool to room temperature before carefully adding 1M HCl until the aqueous layer has been acidified. Extract this with CH₂Cl₂ and dry the organic fractions with MgSO₄ before filtering. Remove the organic solvent under reduced pressure and isolate the product by silica gel chromatography to isolate 21a or 21b.

The procedure below is adapted from: Molander G A, Sandrock D L. "Potassium trifluoroborate salts as convenient, stable reagents for difficult alkyl transfers", *Current Opinion In Drug Discovery & Development* 2009; 12(6): pages 811-823;

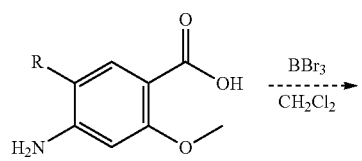

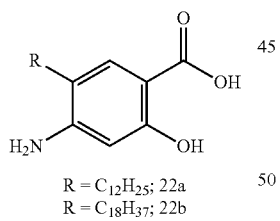

R = C₁₂H₂₅; 22a
R = C₁₈H₃₇; 22b

Synthesis of 22a-22b: Dissolve 21a or 21b in anhydrous CH₂Cl₂ (0.3M) in an oven dried round bottom flask. Cool this solution to 0° C. in an ice bath and add boron tribromide (1M in CH₂Cl₂) slowly. Once addition of BBr₃ is complete, remove the ice bath and let the reaction mixture to warm up to ambient temperature for 12 hours. When the reaction is completed, cool it back to 0° C. and slowly add methanol to quench any excess BBr₃ present. Wash this reaction with distilled water and collect the organic fraction. Dry with MgSO₃, filter, then remove solvent under vacuum. Purify by either recrystallization or silica gel chromatography to isolate 22a or 22b

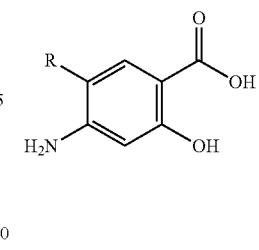

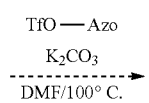

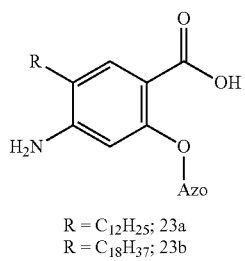

R = C₁₂H₂₅; 23a
R = C₁₈H₃₇; 23b

Synthesis of 23a-23b: Add either 22a or 22b (1 equiv.) and K₂CO₃ (2 equiv) into a round bottom flask and dissolve in solution of anhydrous DMF (0.1 M). Dissolve 20 (1.1 equiv, 0.5 M) in DMF and add this to the previous reaction mixture. Place the reaction mixture in a preheated 100° C. oil bath and stir until the reaction is completed. When the reaction is complete, wash with 1M aqueous HCl until acidic and extract with CH₂Cl₂ (3 times). Dry organic fractions with MgSO₄, filter, and concentrate under vacuum. Purify through crystallization or SiO₂ column chromatography to isolate 23a or 23b.

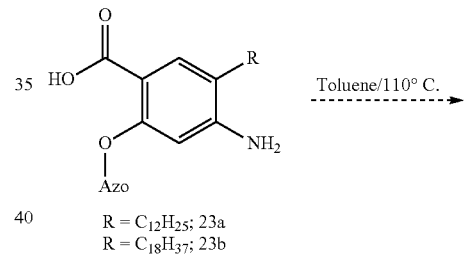

R = C₁₂H₂₅; 23a
R = C₁₈H₃₇; 23b

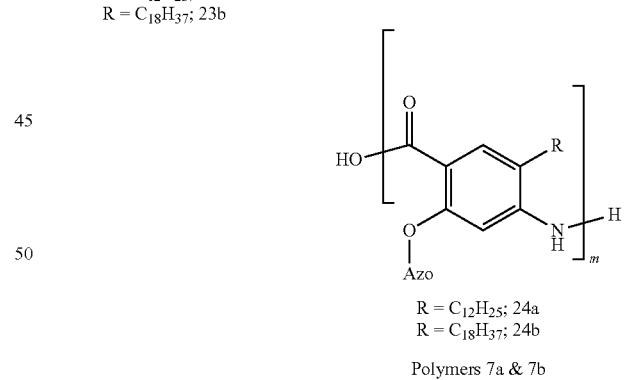

R = C₁₂H₂₅; 24a
R = C₁₈H₃₇; 24b

Polymers 7a & 7b

Synthesis of 24a-24b: Dissolve monomers 23b or 23b in toluene (0.4 M) in a round bottom flask equipped with a Dean Stark trap to remove water formed during the reaction and stir at 110° C. in a preheated oil bath. When the reaction is complete, purify the polymer through precipitation and isolate through filtration or centrifugation.

The scheme for Polymers 7a and 7b should be widely adaptable to accommodate a variety of backbones and polarizable units. Such species would meet the following formula.

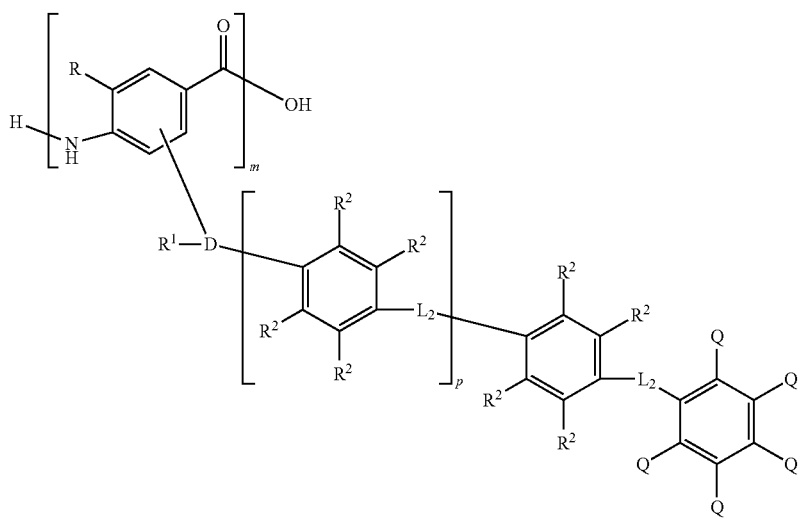

Where each instance of $R^1$ is independently selected from —H or any alkyl or alkoxyl group, each instance of $R^2$ is independently selected from —H, —OH, —OAk, or —OAk-$X_o$, $L_2$ is a heteroatom bridge in conjugation with the ring system of the side chain (e.g. azo-bridge or —N=N—, alkene bridge or —HC=CH—, and alkyne or —C≡C— bridge), Q is selected from any electron withdrawing group, D is any hydrocarbon chain which may be interrupted by hetero atoms at the point of backbone attachment and side chain attachment, m is 1-300, o is 1-51, p is 0-10. Preferred embodiments include m between 60 and 270, and p between 1 and 4.

Example 13: Synthesis of Polymer 8

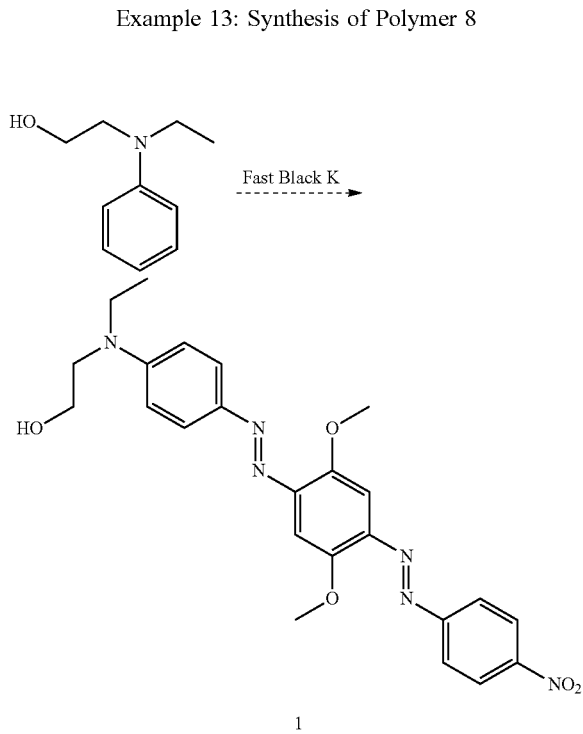

Synthesis of 1: Dissolve Fast Black K Salt in acetonitrile and NaOAc buffer solution (pH=4) and stir the resulting solution for 1 hour, followed by vacuum filtration. Add the filtrate dropwise to a solution of 2-(ethyl(phenyl)amino) ethan-1-ol at 0~5° C. Stir the solution at room temperature for 16 hours before filtering the precipitate and wash with a mixture of acetonitrile/water (1:1) and dried under vacuum.

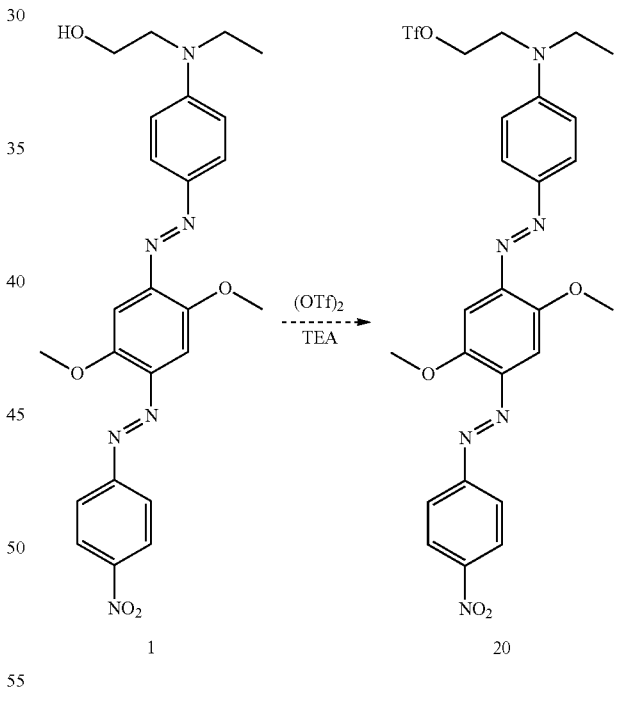

Synthesis of 20: Dissolve 1 (1 equiv.) in a solution of dichloromethane (0.1 M) and triethyl amine (1 equiv.) and let stir for 10 min. Add trifluoromethanesulfonic anhydride (1.1 equiv.) slowly and let stir for 30 min. Wash reaction mixture with aqueous HCl (1M), extract with dichloromethane, and dry with MgSO$_4$. Remove solvent to isolate 20.

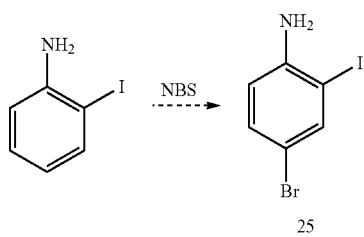

Synthesis of 25: Add 1-iodo-2-aminobenzene to a round bottom flask dissolved in dichloromethane (0.1 M) with 1.1 equiv. of N-bromosuccinimide. Let the reaction stir at room temperature for one hour. When the reaction is complete, wash with aqueous HCl (1 M) and extract with dichloromethane. Dry using $MgSO_4$, filter, and remove organic solvent under reduced pressure to isolate 25.

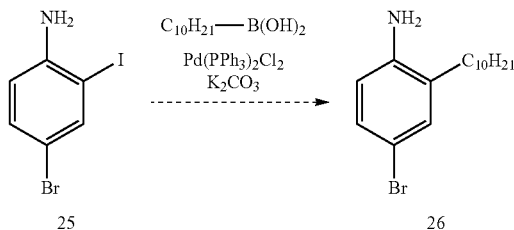

Synthesis of 26: Add 25 (1 equiv.), dodecane boronic acid (1.2 equiv), $Pd(PPh_3)_2Cl_2$ (0.05 equiv), and potassium carbonate (2 equiv.) into a reaction vessel. Evacuate and backfill with $N_2$ three times. Add a degassed mixture of toluene and water (10:1) and heat to 80° C. When the reaction is complete, slowly add 1 M aqueous solution of HCl until the aqueous layer is acidic. Extract with dichloromethane (3×) and dry organic fractions with $MgSO_4$ before filtering. Concentrate the crude reaction mixture and filter through celite before recrystallizing Filter to isolate product 26.

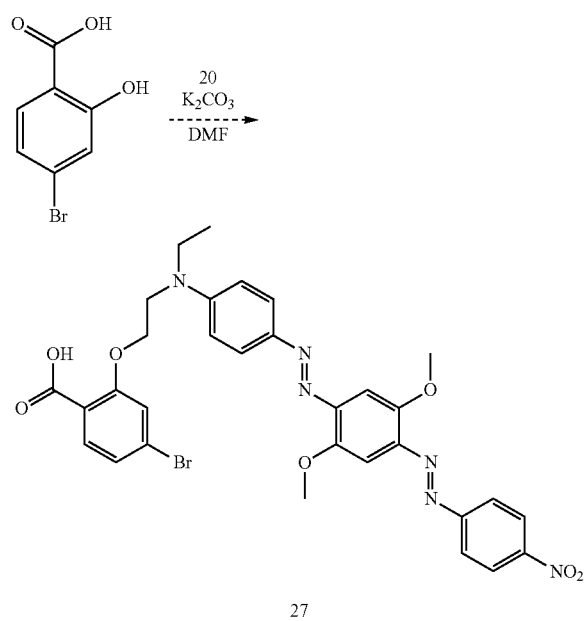

Synthesis of 27: Add 4-bromosalicylic acid (1 equiv.) into a round bottom flask with potassium carbonate (1.5 equiv.) and dissolve in solution of dimethylformamide (0.1 M) and heat the reaction to 100° C. for 2 hours. When the reaction is complete, wash with 1M aqueous HCl until acidic and extract with dichloromethane (3 times). Dry organic fractions with $MgSO_4$, filter, and concentrate under vacuum. Purify through crystallization or $SiO_2$ column chromatography to isolate 27.

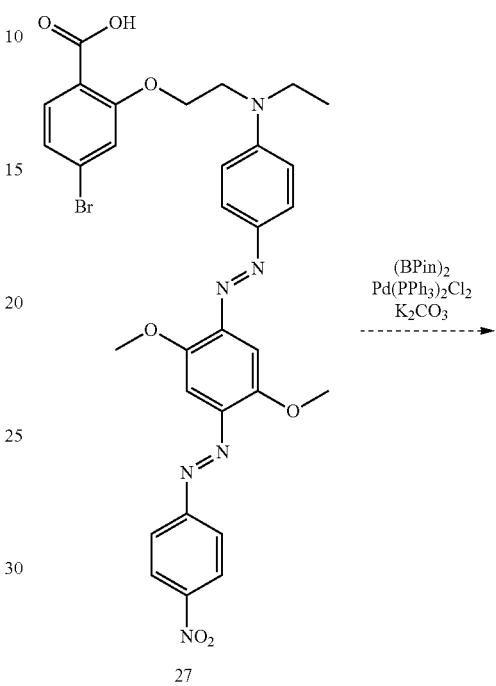

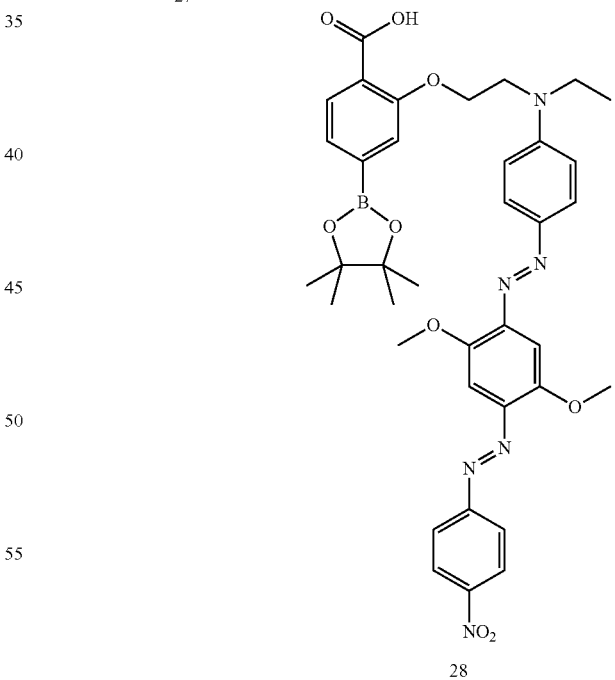

Synthesis of 28: Add 27 (1 equiv.), bispinacolborane (1.5 equiv), $Pd(PPh_3)_2Cl_2$ (0.05 equiv), and potassium carbonate (2 equiv.) into a reaction vessel. Evacuate and backfill with $N_2$ three times. Add a degassed mixture of toluene and water (10:1) and heat to 80° C. When the reaction is complete, slowly add 1 M aqueous solution of HCl until the aqueous layer is acidic. Extract with dichloromethane (3×) and dry organic fractions with MgSO₄ before filtering. Concentrate the crude reaction mixture and filter through celite before recrystallizing Filter to isolate product 28.

Synthesis of 29: Add 28 (1 equiv.), 26 (1 equiv), Pd(PPh₃)₄ (0.05 equiv), and potassium carbonate (2 equiv.) into a reaction vessel. Evacuate and backfill with N₂ three times. Add a degassed mixture of toluene and water (10:1) and heat to 80° C. When the reaction is complete, slowly add 1 M aqueous solution of HCl until the aqueous layer is acidic. Extract with dichloromethane (3×) and dry organic fractions with MgSO₄ before filtering. Concentrate the crude reaction mixture and filter through celite before recrystallizing. Filter to isolate product 29.

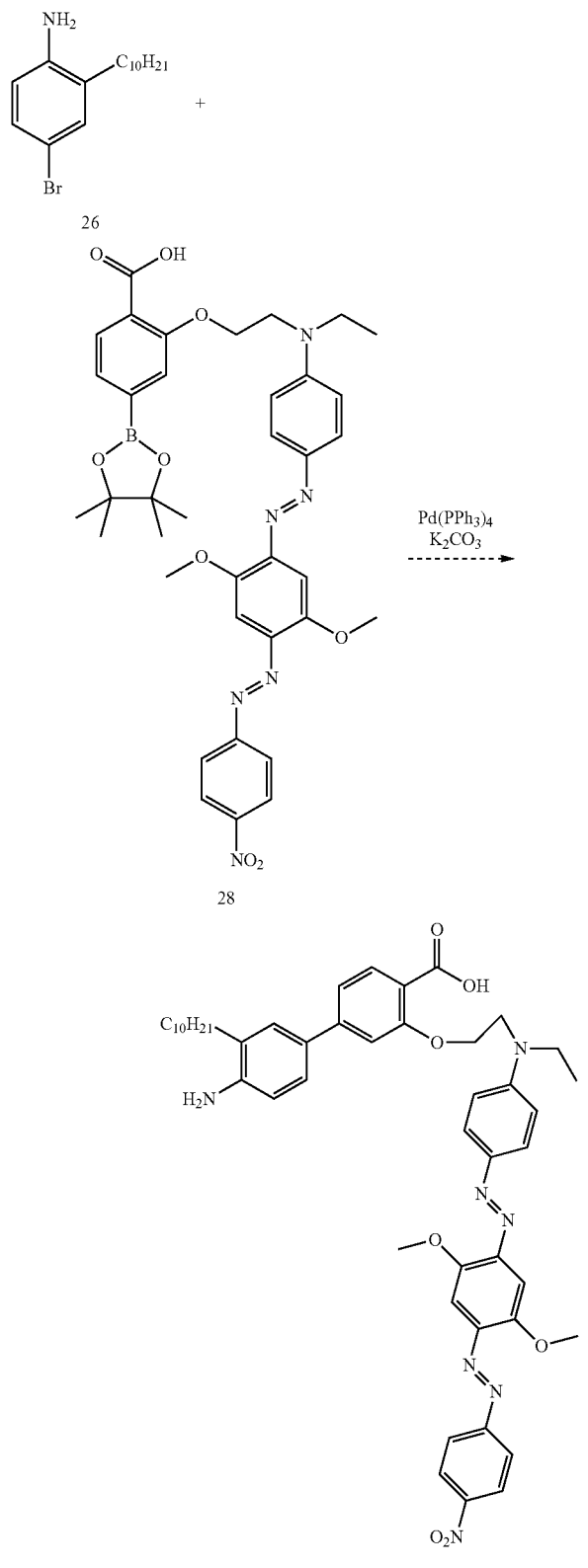

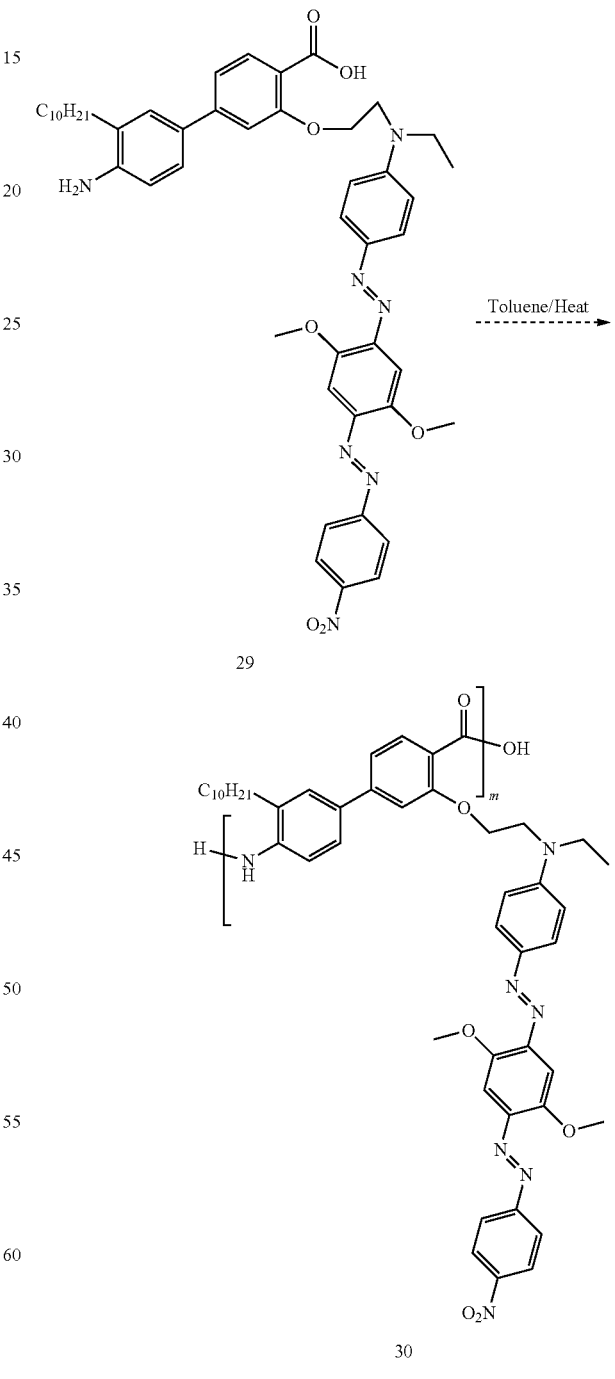

Synthesis of 30: Add 29 (1.0 equiv.) to a reaction vessel before adding toluene and (0.1 M). Connect the reaction vessel to a and dean-stark apparatus and reflux condenser and heat to 150° C. When the reaction is complete, concentrate the crude reaction mixture under reduced pressure and precipitate polymer into hexane to isolate 30.

The scheme for Polymer 8 should be widely adaptable to accommodate a variety of backbones and polarizable units. Such species would meet the following formula.

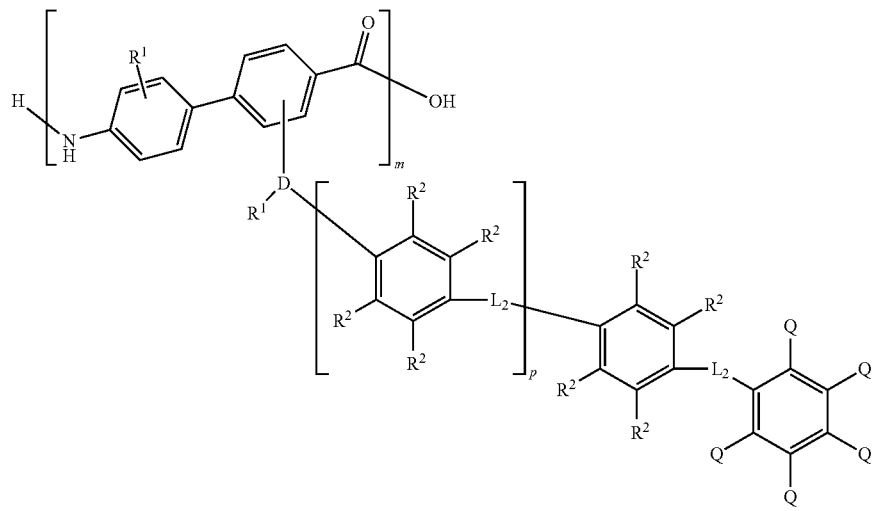

Where each instance of $R^1$ is independently selected from —H or any alkyl or alkoxyl group, each instance of $R^2$ is independently selected from —H, —OH, —OAk, or —OAk-$X_o$, $L_2$ is a heteroatom bridge in conjugation with the ring system of the side chain (e.g. azo-bridge or —N=N—, alkene bridge or —HC=CH—, and alkyne or —C≡C— bridge), Q is selected from any electron withdrawing group, D is any hydrocarbon chain which may be interrupted by hetero atoms at the point of backbone attachment and side chain attachment, m is 1-300, o is 1-51, p is 0-10. Preferred embodiments include m between about 60 and 270, and p between 1 and 4.

composite organic compound characterized by polarizability and resistivity has a general structural formula:

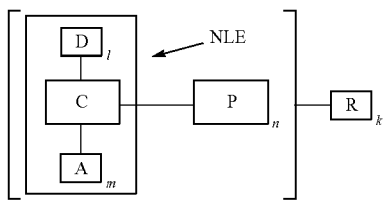

C is a chromophore fragment comprising an aromatic substituent independently selected from the group consisting of six-membered aromatic rings, five-membered heteroaromatic rings, fused ring systems containing at least one six-membered aromatic ring, and fused ring systems containing at least one five-membered heteroaromatic ring having one heteroatom selected from the group consisting of O, N, S and Se, C has the general structure:

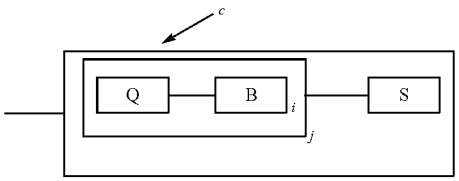

each Q comprises an aromatic substituent independently selected from the group consisting of six-membered aromatic rings, five-membered heteroaromatic rings, fused ring systems of at least one six-membered aromatic ring, and fused ring systems of at least one five-membered heteroaromatic ring having one heteroatom selected from the group consisting of O, N, S and Se, B comprises a conjugated functional group, the value of i for each B is an integer between zero and three, inclusively, and j is from one to nine, inclusive; and R, D, A, and B may independently be attached to a member of a heteroaromatic ring alpha to a heteroatom, and when Q is an aromatic ring, B is attached to a member of said aromatic ring para to R or another B, and D and A can independently be ortho, meta, or para to B on Q.

D comprises an electron donating group capable of releasing electrons into said conjugated aromatic system; l is an integer between zero and three, inclusively, A comprises an electron accepting group capable of pulling electrons from said conjugated aromatic system; m is an integer between zero and three, inclusively, R is selected from the group consisting of straight-chained or branched alkyl, alkoxy, alkylthio, alkylamino, and fluoro-alkyl group containing from one to thirty carbon atoms attached to said composite organic compound wherein R may independently be attached to C and P by an alkyl moiety or connecting group, k is the number of R groups attached to the composite organic compound wherein R may independently be attached to C and P by an alkyl moiety or a connecting group, the value of k is an integer between 0 and 15, inclusively, S comprises a heteroaromatic substituent selected from the group consisting of five-membered heteroaromatic rings having one heteroatom selected from the group consisting of O, N, S and Se, fused ring systems containing at least one five-membered heteroaromatic ring having one heteroatom selected from the group consisting of O, S and Se, fused ring systems containing at least one five-membered heteroaromatic ring having two to four N heteroatoms, fused ring systems containing all five-membered heteroaromatic rings having one heteroatom selected from the group consisting of O, N, S and Se, pyrimidine and purine, so that S is tricyanovinylated at a ring position alpha to a heteroatom;

P is a polycyclic conjugated molecular fragments having two-dimensional flat form and self-assembling by pi-pi stacking in a column-like supramolecule, n is the number of the polycyclic conjugated molecular fragments which is equal to 0, 2, or 4.

Example 14

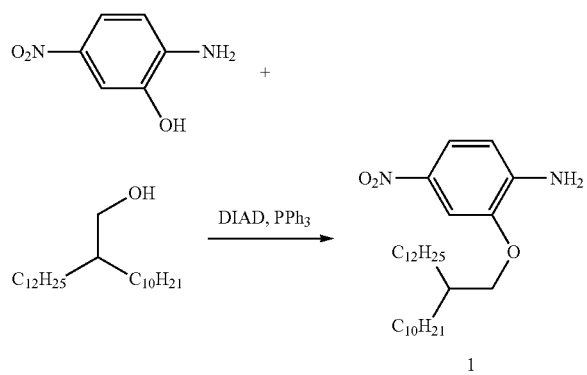

2-decyl-1-tetradecanol (1 equiv.), PPh$_3$ (2 equiv.), and DIAD (2.3 equiv.) were dissolved in THF and stirred in an ice bath. Then, 2-amino-5-nitrophenol was added and the reaction was allowed to warm to ambient temperature and stirred for 24 h. The reaction mixture was diluted with hexanes and filtered through diatomaceous earth. The filtrate was concentrated and purified on silica gel to give 1.

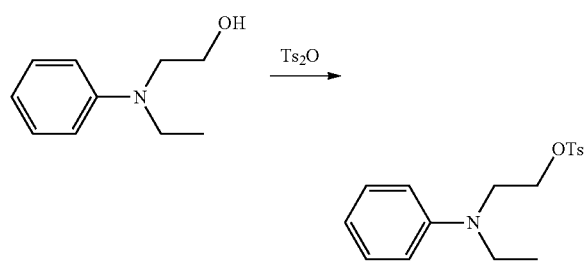

2-(N-ethylanilino)ethanol (1 equiv.), NaH (2 equiv.), and tosyl chloride (1.2 equiv.) were dissolved in DMF and stirred at room temperature for 18 h. The solution was processed through an aqueous workup. The organics were dried over MgSO$_4$ and the solvents were removed en vacuo.

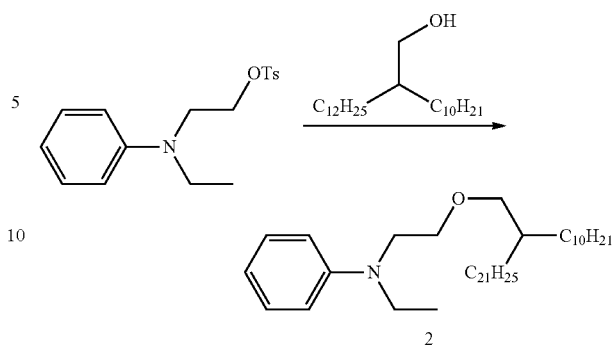

2-decyl-1-tetradecanol (1 equiv.), NaH (2 equiv.), and tosylated 2-(N-ethylanilino)ethanol (1 equiv.) were dissolved in THF and stirred at room temperature for 18 h. The solution was processed through an aqueous workup. The organics were dried over MgSO$_4$ and the solvents were removed en vacuo to give 2.

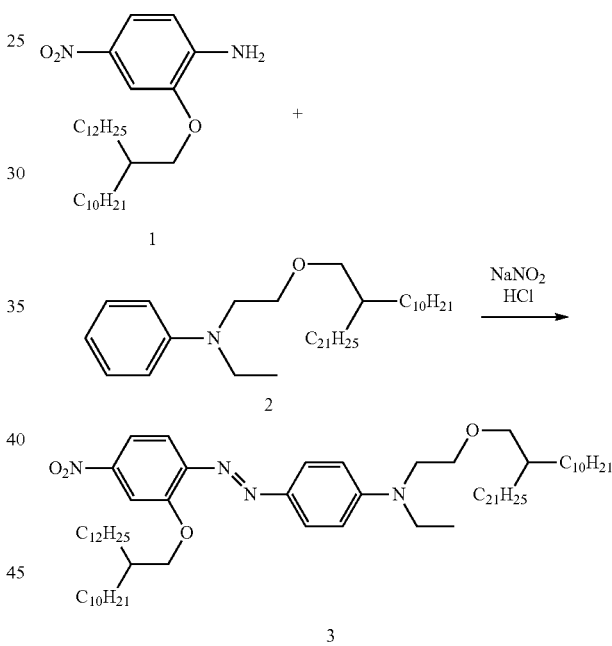

Compound 1 (20 mmol) was dissolved in a solution of 35% hydrochloric acid and the mixture was stirred in an ice bath. Subsequently, a water solution of sodium nitrite (20 mmol) was added slowly and the resulting solution was stirred in the ice bath for 30 min, a solution of 2 (24 mmol) in distilled ethanol was added dropwise and stirred for 1 h. After pH of the resulting solution was adjusted to 7.0 with potassium carbonate, the reaction was stirred for another 30 min. The red solution was diluted with CH$_2$Cl$_2$ and washed with brine and deionized water. The crude product was purified by recrystallization.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein can be employed in practicing the invention. Any feature, whether preferred or not, may be combined with any other feature. It is to be understood that the above described embodiment of the invention is illustrative only and that modifications thereof may occur to those skilled in the art. Accordingly, this invention is not to be regarded as limited to the embodiment disclosed herein, but is to be limited only as defined by the appended claims.

What is claimed is:

1. A plasma electric propulsion device comprising:
an engine configured to heat and/or ionize and/or accelerate a propellant due to action of an electric field and/or magnetic field; and
a capacitive energy storage device coupled to the engine as a power source for the engine, wherein the capacitive energy storage device, comprises:
a first electrically conductive electrode,
a second electrically conductive electrode; and
at least one metadielectric layer located between the first electrically conductive electrode and the second electrically conductive electrode, wherein the at least one metadielectric layer comprises at least one organic compound, the at least one organic compound comprising:
i) at least one electrically resistive substituent and
ii) at least one polarizable unit,
wherein the at least one organic compound is selected from the list consisting of compounds with rigid electro-polarizable organic units, composite organic polarizable compounds, composite electro-polarizable organic compounds, composite non-linear electro-polarizable compounds, Sharp polymers, Furuta polymers, YanLi polymers, and any combination thereof;
wherein the at least one electrically resistive substituent i) is selected from alkyl, aryl, substituted alkyl, substituted aryl, fluorinated alkyl, chlorinated alkyl, branched alkyl, branched fluorinated alkyl, branched chlorinated alkyl groups, and any combination thereof, and wherein the aryl group is selected from substituted and unsubstituted phenyl, benzyl groups, naphthyl groups, siloxane, and polyethylene glycol as linear or branched chains;
wherein the at least one electrically resistive substituent is $C_XQ_{2X+1}$, where $X \geq 1$ and each instance of Q is selected from hydrogen (Fl), fluorine (F), or chlorine (Cl), and wherein the at least one electrically resistive substituent is selected from the group consisting of single chain, branched chain, and polycyclic species, and
wherein the at least one polarizable unit ii) is independently selected from intramolecular and intermolecular polarizable units.

2. The plasma electric propulsion device according to claim 1, wherein the engine is an electrostatic propulsion engine configured to accelerate propellant by direct application of an electrostatic electric field to ionized particles.

3. The plasma electric propulsion device according to claim 1, wherein the engine is an electromagnetic propulsion engine configured to accelerate the propellant under combined action of electric and magnetic fields.

4. The plasma electric propulsion device according to claim 1, wherein the at least one organic compound is selected from chromophores, tictoids, anisometric conjugated aromatic ring systems, rylene fragments, phenyl groups, naphthyl groups, anthryl groups, and any combination thereof.

5. The plasma electric propulsion device according to claim 1, wherein the at least one organic compound of the at least one metadielectric layer comprises domain structures selected from any combination of nematic structures, chematic structures, and chiral nematic structures.

6. The plasma electric propulsion device according to claim 1, wherein the at least one metadielectric layer has an effective breakdown strength of at least 0.1 V/nm.

7. The plasma electric propulsion device according to claim 1, wherein the at least one polarizable unit of the at least one organic compound is rigid, wherein the at least one polarizable unit is selected from an aromatic polycyclic conjugated molecule and an electro-conductive oligomer.

8. The plasma electric propulsion device according to claim 7, wherein a distribution of the intramolecular or intermolecular rigid polarizable units of the at least one organic compound in the at least one metadielectric layer at least partially compensates an electric field applied between the first electrically conductive electrode and second electrically conductive electrode.

9. The plasma electric propulsion device according to claim 7, wherein the at least one organic compounds form supramolecular structures selected from the list comprising two-dimensional flat form, rod-like, column-like, disc-like forms, and any combination thereof; and wherein the at least one polarizable units are oriented in the at least one metadielectric layer such that poles of the at least one polarizable units are oriented more or less perpendicular to the first electrically conductive electrode and second electrically conductive electrode of the energy storage device.

10. The plasma electric propulsion device according to claim 1, wherein a capacitance of the energy storage device varies non-linearly with voltage.

11. The plasma electric propulsion device according to claim 1, wherein the energy storage device further comprises one or more intermediate layers independently located in following positions: between metadielectric layers, between the at least one metadielectric layer and the first electrically conductive electrode, between the at least one metadielectric layer and the second electrically conductive electrode, wherein the intermediate layer has a permittivity greater than a permittivity of the at least one metadielectric layer and a resistivity less than a resistivity of the at least one metadielectric layer.

12. The plasma electric propulsion device according to claim 11, wherein the energy storage device further comprises at least one tunnel barrier layer independently located between the at least one metadielectric layer and at least one intermediate layer located near one of the first electrically conductive electrode and the second electrically conductive electrode, wherein the permittivity of the tunnel barrier layer is lower than the permittivity of the intermediate layer, and the breakdown voltage of the tunnel barrier layer is higher than the breakdown voltage of the intermediate layer.

13. The plasma electric propulsion device according to claim 7, wherein the aromatic polycyclic conjugated molecule comprises one or more electron donor group and one or more electron acceptor group, wherein the one or more electron donor group and the one or more electron acceptor group are independently selected from —NO2, —NH$_3^+$ and —NR3$^+$, counterion Cl$^-$ or Br$^{-1}$, —CHO, —CRO, —SO$_3$H, —SO$_3$R, —SO$_2$NH$_2$, —COOH, —COOR, —COCl, —CONH$_2$, —CF$_3$, —CCl$_3$, —CN; and wherein the donors are independently selected from —O—, —NH$_2$, —NHR, —NR$_2$, —OH, —OR, —NHCOR, —OCOR, alkyls, —C$_6$H$_5$, vinyls, wherein each instance of R is a radical independently selected from the list comprising alkyl, allyl, benzyl groups, phenyl and other aryl groups, and wherein the at least one polarizable unit form an anisometric molecular structure.

14. The plasma electric propulsion device according to claim 1, wherein the at least one metadielectric layer comprises a material having a high breakdown field (Ebd) in at least one high-field regions where a breakdown field strength (Ebd) is greater than about 1 V/nm and areas of the high-field regions are less than about 1 $\mu m^2$ and/or has volumes less than about 1 $\mu m^3$, and wherein the high-field regions independently comprise composite organic compounds forming nematic crystals, chematic crystals, chiral nematic crystals, lamellar structures, micelle structures, and any combination thereof.

15. The plasma electric propulsion device according to claim 1, wherein the at least one polarizable units forms a crystalline lattice located in a matrix comprising compounds selected from alkyl chains, alkyne chains, polymers, polymers with linear chains, polymers with branched chains, cross-linked polymers of all listed above types, the compounds with cross-linked chains of all listed above types, fluorinated polymers of all listed above types, the compounds with fluorinated chains of all listed above types and the matrix further electrically insulates the intramolecular and intermolecular rigid polarizable units and increases the at least one metadielectric layer's mechanical elasticity during compression and decompression from applying and removing strong electric fields.

16. The plasma electric propulsion device according to claim 15, wherein the matrix has a permittivity is greater than or equal to 10,000 and resistivity greater than or equal to $10^{15}$ Ohm-cm.

17. The plasma electric propulsion device according to claim 15, wherein the matrix further comprises antiferroelectric material.

18. The plasma electric propulsion device according to claim 1, further comprising at least one conductive layer located between adjacent metadielectric layers of the at least one metadielectric layer, wherein the plasma electric propulsion device has a breakdown field (Ebd) value of at least 0.9 V/nm.

19. The plasma electric propulsion device according to claim 1, wherein the at least one metadielectric layer comprised of at least one non-ionic plasticizer configured to increase supramolecular order of the at least one metadielectric layer for increased resistivity and flexibility of the at least one metadielectric layer.

20. The plasma electric propulsion device according to claim 1, having a specific storage energy between about 500 Wh/kg and about 2.5 kWh/kg.

21. The plasma electric propulsion device according to claim 1, having a specific storage greater than or equal to 2.5 kWh/kg.

* * * * *